United States Patent
Suetsuna et al.

(10) Patent No.: US 12,015,306 B2
(45) Date of Patent: Jun. 18, 2024

(54) PLURALITY OF FLAKY MAGNETIC METAL PARTICLES, PRESSED POWDER MATERIAL, AND ROTATING ELECTRIC MACHINE

(71) Applicant: Kabushiki Kaisha Toshiba, Minato-ku (JP)

(72) Inventors: Tomohiro Suetsuna, Kawasaki (JP); Hiroaki Kinouchi, Shinagawa (JP); Naoyuki Sanada, Yokohama (JP); Takahiro Kawamoto, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 749 days.

(21) Appl. No.: 16/536,595

(22) Filed: Aug. 9, 2019

(65) Prior Publication Data
US 2020/0303106 A1   Sep. 24, 2020

(30) Foreign Application Priority Data

Mar. 19, 2019   (JP) .................. 2019-051076

(51) Int. Cl.
*H02K 1/02* (2006.01)
*B22F 1/068* (2022.01)
(Continued)

(52) U.S. Cl.
CPC ............... *H02K 1/02* (2013.01); *B22F 1/068* (2022.01); *B22F 1/08* (2022.01); *B22F 1/10* (2022.01);
(Continued)

(58) Field of Classification Search
CPC ............. H01F 1/14733; H01F 1/14741; H01F 1/22–26; B22F 1/068
See application file for complete search history.

(56) References Cited

U.S. PATENT DOCUMENTS 6,017,490 A    1/2000  Otsuka et al.
10,090,088 B2  10/2018 Suetsuna et al.
(Continued)

FOREIGN PATENT DOCUMENTS

JP    6-256803 A    9/1994
JP   10-212503 A    8/1998
(Continued)

OTHER PUBLICATIONS

Elkem; "Silicone Resin"; Retrieved from internet Apr. 29, 2022; https://www.elkem.com/silicones/technologies/fluids/resin/ (Year: 2022).*

(Continued)

*Primary Examiner* — Alexandra M Moore
*Assistant Examiner* — Austin Pollock
(74) *Attorney, Agent, or Firm* — Oblon, McClelland, Maier & Neustadt, L.L.P.

(57) ABSTRACT

A plurality of flaky magnetic metal particles have an average thickness of 10 nm to 100 μm, each of the particles having a flat surface; a magnetic metal phase containing at least one element selected from the group consisting of Fe, Co, and Ni; and a difference in coercivity on the basis of direction within the surface, the average value of the ratio of the average length within the surface with respect to the thickness being from 5-10,000. The particles include a particle having at least one of a crack in a thickness direction having a depth equivalent to 10% or more of the thickness of the particle and a width shorter than the depth, and a crack in a direction parallel to the surface having a length equivalent to 10% or more of the thickness of the particle and a width shorter than the length.

18 Claims, 28 Drawing Sheets

(51) Int. Cl.
*B22F 1/08* (2022.01)
*B22F 1/10* (2022.01)
*B22F 1/16* (2022.01)
*B22F 3/02* (2006.01)
*B22F 3/24* (2006.01)
*H01F 1/26* (2006.01)

(52) U.S. Cl.
CPC .................. *B22F 1/16* (2022.01); *B22F 3/02* (2013.01); *B22F 3/24* (2013.01); *H01F 1/26* (2013.01); *B22F 2003/248* (2013.01); *B22F 2202/05* (2013.01); *B22F 2301/15* (2013.01); *B22F 2301/35* (2013.01); *B22F 2302/45* (2013.01); *B22F 2303/01* (2013.01); *B22F 2998/10* (2013.01)

(56) References Cited

U.S. PATENT DOCUMENTS

| | | | |
|---|---|---|---|
| 2016/0086700 A1* | 3/2016 | Suetsuna | H01F 1/0063 252/62.56 |
| 2017/0076845 A1 | 3/2017 | Suetsuna et al. | |
| 2017/0117087 A1 | 4/2017 | Ridler et al. | |
| 2017/0209924 A1* | 7/2017 | Suetsuna | B22F 9/04 |
| 2017/0323711 A1* | 11/2017 | Maezawa | H01F 1/14775 |
| 2018/0258513 A1 | 9/2018 | Suetsuna et al. | |
| 2019/0283127 A1 | 9/2019 | Kinouchi et al. | |
| 2020/0043639 A1 | 2/2020 | Suetsuna et al. | |
| 2020/0082963 A1 | 3/2020 | Sustsuna et al. | |

FOREIGN PATENT DOCUMENTS

| | | | |
|---|---|---|---|
| JP | 2005-290233 A | 10/2005 | |
| JP | 2015-175047 A | 10/2015 | |
| JP | 2017-059816 A | 3/2017 | |
| JP | 2018-152449 A | 9/2018 | |
| JP | 2019-161183 A | 9/2019 | |
| JP | 2020-25077 A | 2/2020 | |
| JP | 2020-43268 A | 3/2020 | |
| WO | WO-2016167286 A1 * | 10/2016 | ............ B22F 1/0018 |

OTHER PUBLICATIONS

Halder, N. C., et al., "Separation of particle size and lattice strain in integral breadth measurements", Acta Cryst. (1966) 20, pp. 312-313.

* cited by examiner

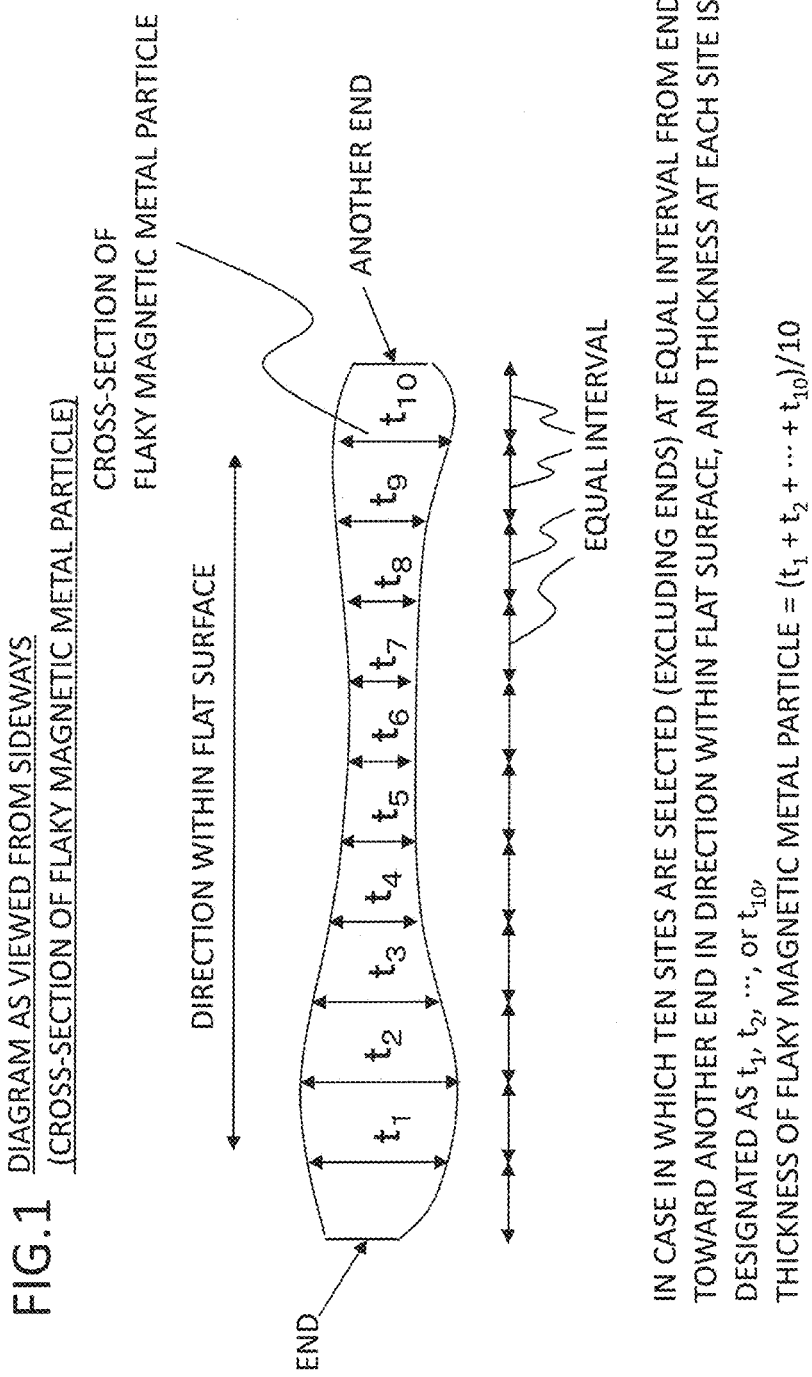

DIAGRAM AS VIEWED FROM TOP (FLAT SURFACE OF FLAKY MAGNETIC METAL PARTICLES)

IN CASE OF TRIANGLE

IN CASE OF QUADRILATERAL

IN CASE OF ROUNDISH SHAPE

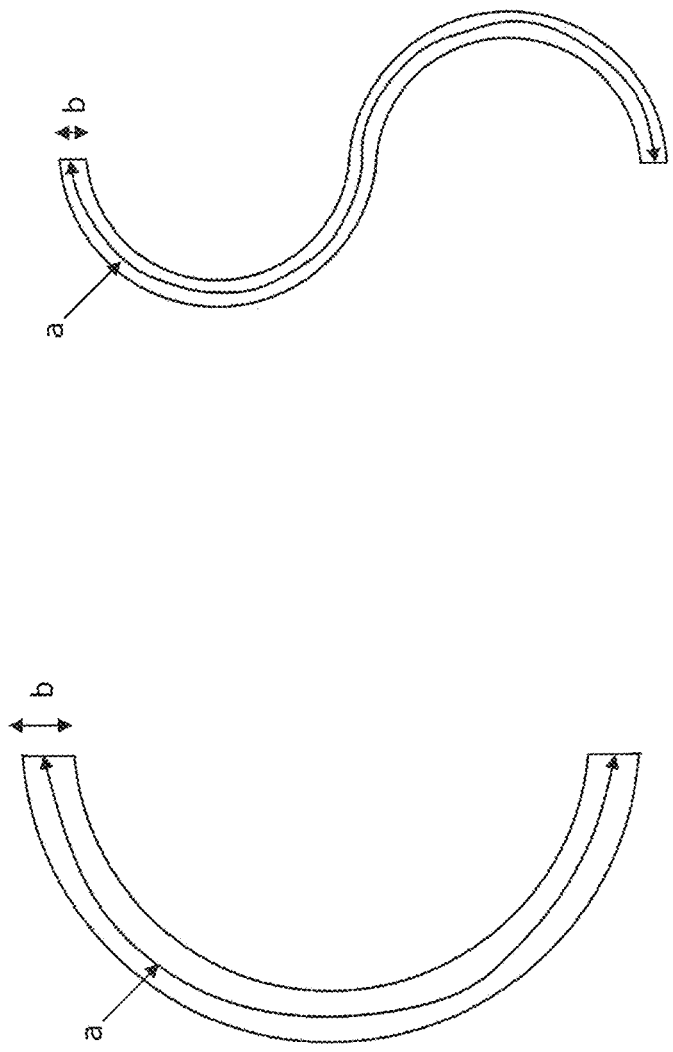
FIG.3 DIAGRAM AS VIEWED FROM TOP (FLAT SURFACE OF FLAKY MAGNETIC METAL PARTICLES)

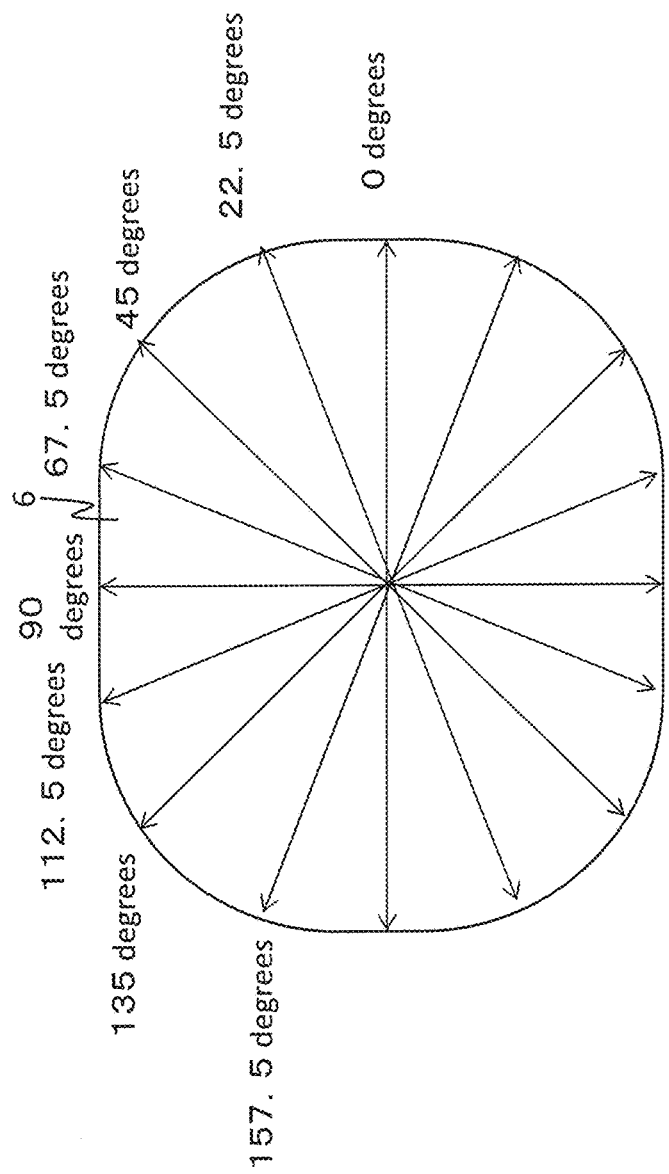

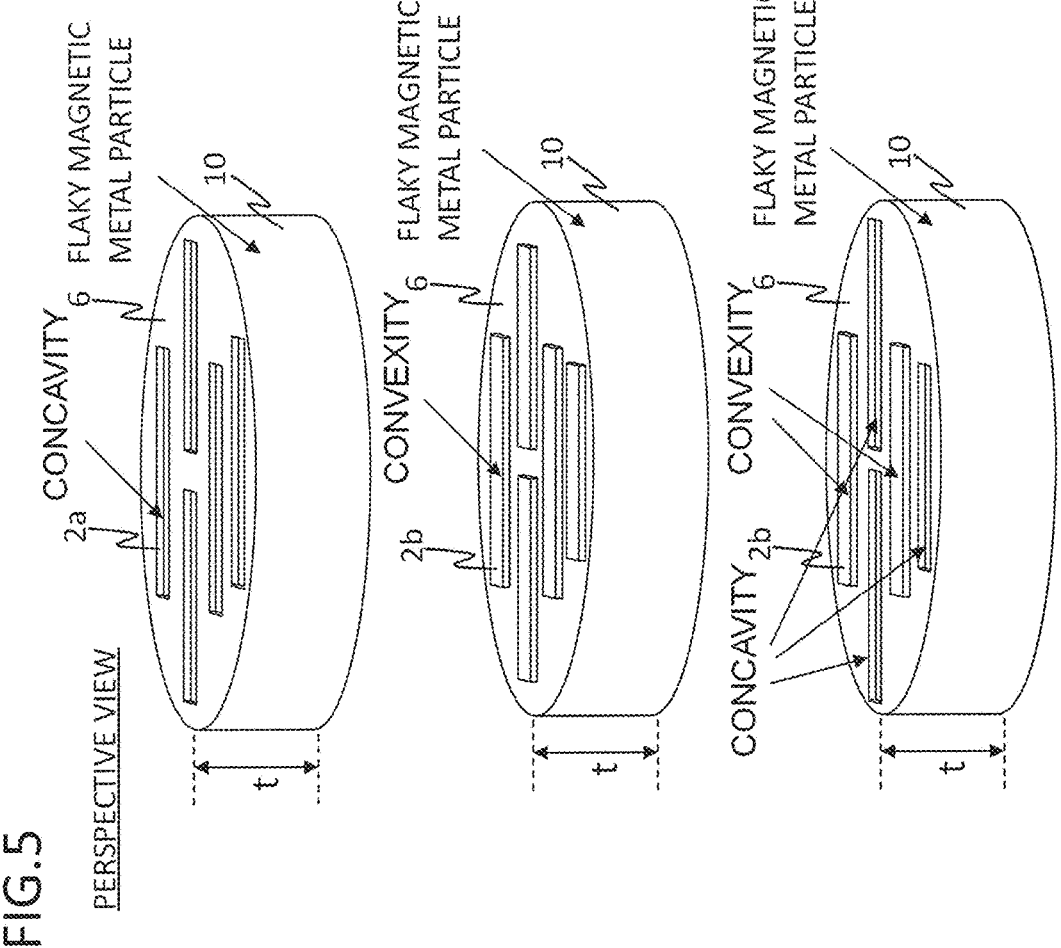

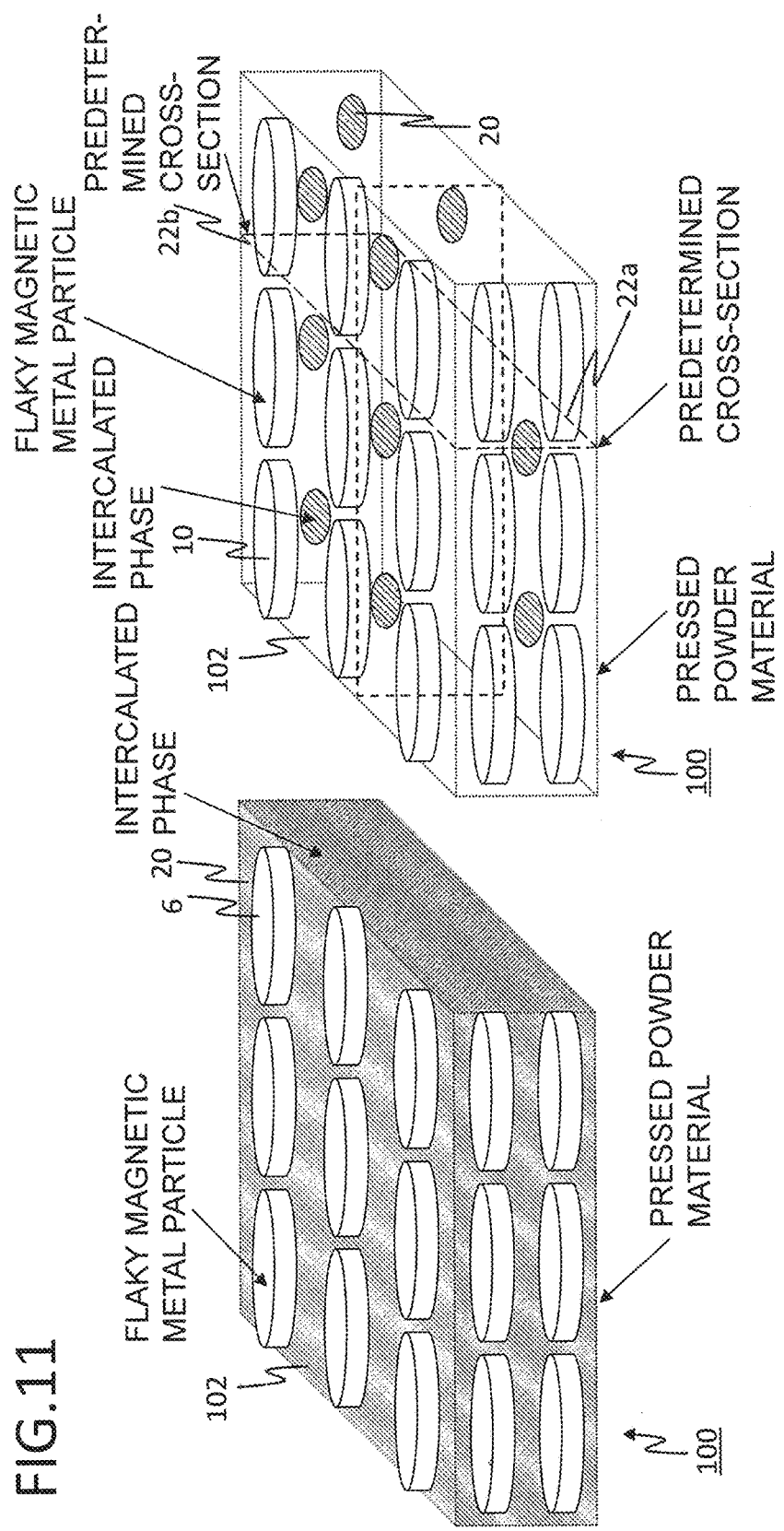

FIG.12
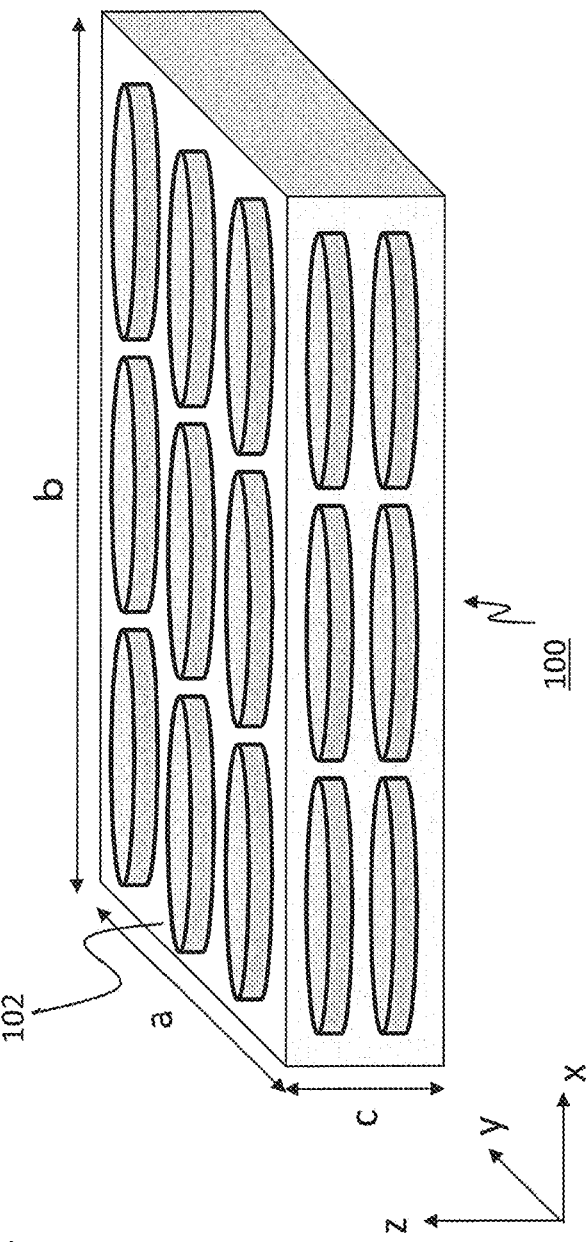
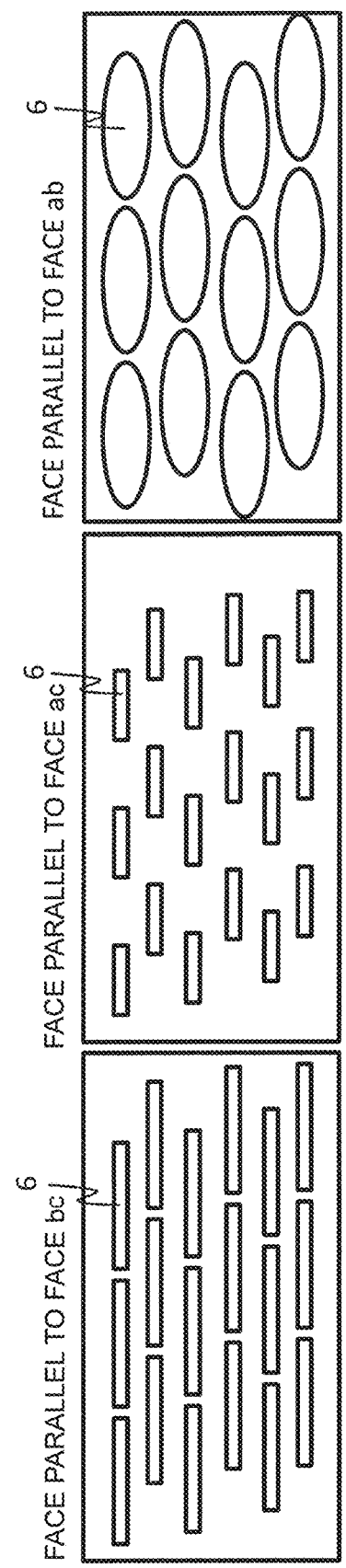

FIG.17
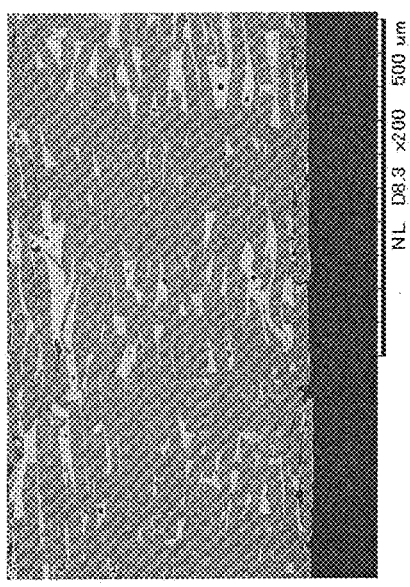
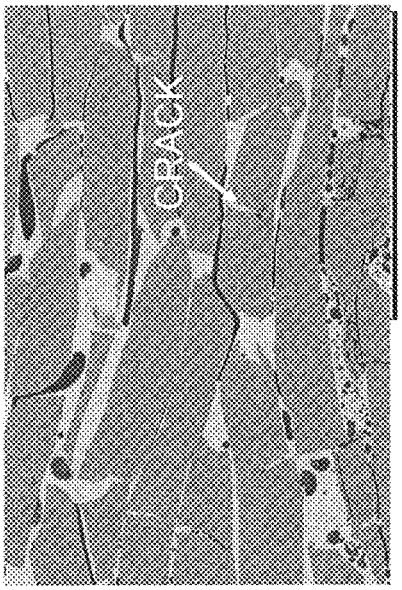
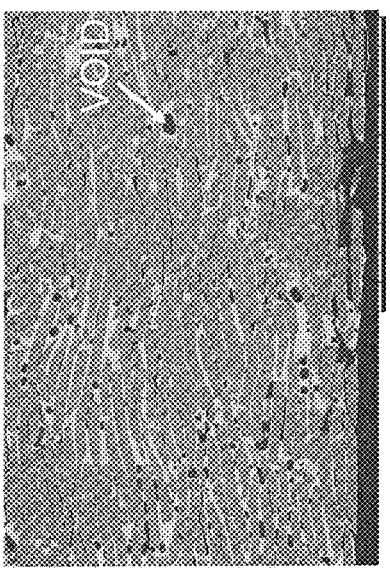

FIG.20
CONTROL SYSTEM BASED ON PLL
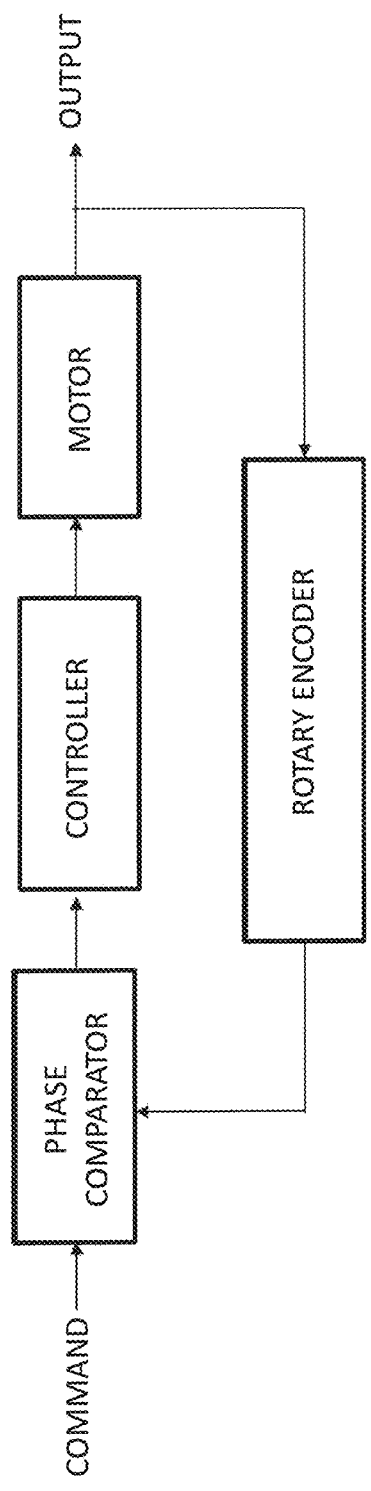
CONTROL SYSTEM BASED ON INVERTER
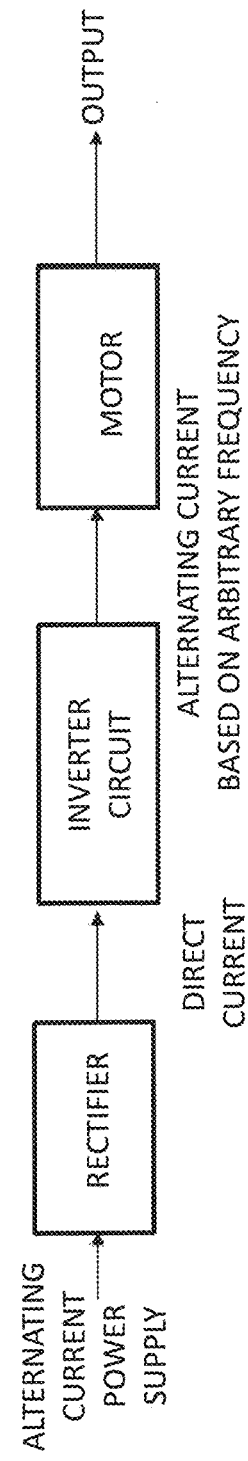

PLURALITY OF FLAKY MAGNETIC METAL PARTICLES, PRESSED POWDER MATERIAL, AND ROTATING ELECTRIC MACHINE

CROSS-REFERENCE TO RELATED APPLICATION

This application is based upon and claims the benefit of priority from Japanese Patent Application No. 2019-051076, filed on Mar. 19, 2019, the entire contents of which are incorporated herein by reference.

FIELD

Embodiments described herein relate generally to a plurality of flaky magnetic metal particles, a pressed powder material, and a rotating electric machine.

BACKGROUND

Currently, soft magnetic materials are applied to the component parts of various systems and devices, such as rotating electric machines (for example, motors and generators), potential transformers, inductors, transformers, magnetic inks, and antenna devices. Thus, soft magnetic materials are regarded as very important materials. In these component parts, the real part of the magnetic permeability (real part of the relative magnetic permeability), $\mu'$, of a soft magnetic material is utilized, and therefore, in the case of actual use, it is preferable to control $\mu'$ in accordance with the working frequency band. Furthermore, in order to realize a highly efficient system, it is preferable to use a material having a loss that is as low as possible. That is, it is preferable that the imaginary part of the magnetic permeability (imaginary part of the relative magnetic permeability), $\mu''$ (corresponding to a loss), is minimized as far as possible. In regard to the loss, the loss factor, tan δ ($=\mu''/\mu' \times 100(\%)$) serves as a criterion, and as $\mu''$ becomes smaller relative to $\mu'$, the loss factor tan δ becomes smaller, which is preferable. In order to attain such conditions, it is preferable to make the core loss for the conditions of actual operation small, that is to say, it is preferable to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses are small, particularly under the operation conditions in which the effective magnetic field applied to the material is large, such as high current and high voltage. To attain this end, it is preferable that the saturation magnetization of a soft magnetic material is as high as possible so as not to bring about magnetic saturation. Furthermore, in recent years, since size reduction of equipment is enabled by increased frequency, increase of the working frequency bands in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for the major portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to the magnetic wedges that are used in some motors, there is a demand for minimizing losses as far as possible. There is the same demand also for systems using transformers. In motors, transformers and the like, the demand for size reduction is also high, along with efficiency enhancement. In order to realize size reduction, it is essential to maximize the magnetic permeability and saturation magnetization of the soft magnetic material as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and particularly above all, in recent years, attention has been paid to the application of soft magnetic materials in power inductance elements that are used in power semiconductor devices. In recent years, the importance of energy saving and environmental protection has been actively advocated, and there have been demands for reduction of the amount of CO, emission and reduction of the dependency on fossil fuels. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants with high efficiency, as environment-friendly power saving systems, has been actively advocated. In such a movement of energy saving, power semiconductor devices play a key role. Power semiconductor devices are semiconductor devices that control high electric power or energy with high efficiency, and examples thereof include individual power semiconductor devices such as an insulated gate bipolar transistor (IGBT), a metal oxide semiconductor field effect transistor (MOSFET), a power bipolar transistor, and a power diode; power supply circuits such as a linear regulator and a switching regulator; and a large-scale integration (LSI) logic circuit for power management to control the above-mentioned devices. Power semiconductor devices are widely used in all sorts of equipment including home electrical appliances, computers, automobiles and railways, and since expansion of the supply of these applied apparatuses, and an increase in the mounting ratio of power semiconductor devices in these apparatuses can be expected, a rapid growth in the market for power semiconductor devices in the future is anticipated.

For example, inverters that are installed in many home electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. Since SiC and GaN have larger band gaps and larger breakdown fields than Si, and the breakdown voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling mechanisms can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required for magnetic materials in this case, high magnetic permeability and low magnetic loss in the driving frequency bands, as well as high saturation magnetization that can cope with a large electric current, are preferable. In a case in which saturation magnetization is high, it is difficult to induce magnetic saturation even when a high magnetic field is applied, and a decrease in the effective inductance value can be suppressed. As a result, the direct current superimposition characteristics of the device are enhanced, and the efficiency of the system is increased.

Furthermore, a magnetic material having high magnetic permeability and low losses at high frequency is expected to be applied to high frequency communication equipment devices such as antenna devices. As a method for achieving size reduction and power saving of antennas, there is a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

Furthermore, examples of other characteristics that are required when magnetic materials are incorporated into the various systems and devices described above include high thermal stability, high strength, and high toughness. Also, in order for the magnetic materials to be applied to complex shapes, a pressed powder body is more preferable than materials having a sheet shape or a ribbon shape. However, generally, when a pressed powder body is used, it is known that characteristics such as saturation magnetization, magnetic permeability, losses, strength, toughness, and hardness are deteriorated. Thus, enhancement of characteristics is preferable.

Next, in regard to existing soft magnetic materials, the types of the soft magnetic materials and their problems will be described.

Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Highly characterized materials ranging from non-directional silicon steel sheets to directional silicon steel sheets can be obtained, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powder bodies that are applicable to complex shapes; however, pressed powder bodies have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powder bodies of Fe-based or Co-based amorphous glass, and MnZn-based ferrite materials. However, all of these materials do not completely satisfy characteristics such as high magnetic permeability, low losses, high saturation magnetization, high thermal stability, high strength, high toughness, and high hardness, and are insufficient.

Examples of existing soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material having high saturation magnetization, high magnetic permeability, low losses, high thermal stability, and excellent mechanical characteristics, is preferable.

BRIEF DESCRIPTION OF THE DRAWINGS

FIG. 1 is a conceptual diagram for illustrating a method for determining the thickness for flaky magnetic metal particles according to a first embodiment.

FIG. 3 is a conceptual diagram for illustrating a method for determining the maximum length and the minimum length in a flat surface in another example of the flaky magnetic metal particles according to the first embodiment.

FIG. 4 is a schematic diagram illustrating the directions used when the coercivity is measured by varying the direction at an interval of 22.5° over the angle of 360° in a flat surface of a flaky magnetic metal particle according to the first embodiment.

FIG. 5 is a schematic perspective view of the flaky magnetic metal particles according to the first embodiment, the particles having concavities or convexities.

FIG. 11 is a set of schematic diagrams of a pressed powder material according to a third embodiment.

FIG. 12 is a set of schematic diagrams illustrating a disposition example of flaky magnetic metal particles in planes parallel to each cross-section according to the third embodiment.

FIG. 17 is a set of scanning electron microscopic photographs of pressed powder materials in the predetermined cross-section of the pressed powder material according to the third embodiment, which are produced by the differences in pressure and temperature of the fifth step.

FIG. 20 is a conceptual diagram of a motor system of a fourth embodiment.

DETAILED DESCRIPTION

Figure 2A:
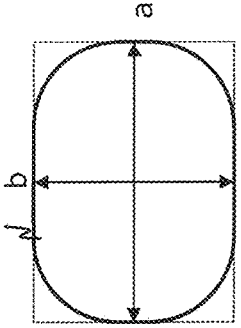
FIGS. 2A to 2C are conceptual diagrams for illustrating a method for determining the maximum length and the minimum length in a flat surface of the flaky magnetic metal particles according to the first embodiment.

In the following description, embodiments will be described using the attached drawings. In the diagrams, an identical or similar reference numeral will be assigned to identical or similar sites.

First Embodiment

A plurality of flaky magnetic metal particles of the present embodiment is a plurality of flaky magnetic metal particles having an average thickness of from 10 nm to 100 μm, each of the flaky magnetic metal particles comprising: a flat surface; a magnetic metal phase containing at least one first element selected from the group consisting of iron (Fe), cobalt (Co), and nickel (Ni); and the difference in coercivity on the basis of direction within the flat surface, the average value of the ratio of the average length in the flat surface with respect to the thickness being from 5 to 10,000, and the flaky magnetic metal particles including a flaky magnetic metal particle having either a crack in the direction of the thickness of the flaky magnetic metal particle, the crack having a depth equivalent to 10% or more of the thickness of the flaky magnetic metal particle and a width shorter than the depth, or a crack in a direction parallel to the flat surface, the crack having a length equivalent to 10% or more of the thickness of the flaky magnetic metal particle and a width shorter than the length, or the flaky magnetic metal particle having both of the cracks.

Flaky magnetic metal particles are flaky particles (or flattened particles) having a flaky shape (or a flattened shape).

A thickness means an average thickness of a single flaky magnetic metal particle. Regarding the method for determining the thickness, the method is not limited as long as it is a method capable of determining the average thickness of one flaky magnetic metal particle. For example, a method of observing a cross-section that is perpendicular to a flat surface of a flaky magnetic metal particle by transmission electron microscopy (TEM), scanning electron microscopy (SEM), or optical microscopy, selecting any arbitrary ten or more sites in the in-plane direction of the flat surface in a cross-section of the flaky magnetic metal particle thus observed, measuring the thicknesses at the various selected sites, and employing the average value of the thicknesses, may be used. Furthermore, a method of selecting ten or more sites in a cross-section of the observed flaky magnetic metal particle from an end toward the other end at an equal interval in a direction within the flat surface (at this time, since the end and the other end are special places, it is preferable not to select the end parts), measuring the thickness at each of the sites thus selected, and employing the average value of the thicknesses, may also be used. FIG. 1 is a conceptual diagram illustrating an example of a method for determining the thickness of a flaky magnetic metal particle according to the first embodiment. In FIG. 1, the method for determining the thickness in this case is specifically illustrated. All of the methods are preferable because when measurement is made at sites as many as possible, average information can be obtained. Meanwhile, in a case in which the contour lines of the cross-section has intense irregularities, or the surface has a rough contour line, and it is difficult to determine the average thickness in an intact state, it is preferable that the contour line is smoothened into an average straight line or curve appropriately according to the circumstance, and then the above-described method is carried out.

Furthermore, the average thickness refers to the average value of the thickness of a plurality of flaky magnetic metal particles, and the average thickness is distinguished from the simple "thickness" described above. When the average thickness is to be determined, it is preferable to employ an average value calculated for twenty or more flaky magnetic metal particles. Furthermore, it is preferable to determine the average thickness for as many flaky magnetic metal particles as possible as the objects of measurement, because average information can be obtained. Furthermore, in a case in which an observation of twenty or more flaky magnetic metal particles cannot be made, it is preferable that an observation of as many flaky magnetic metal particles as possible is made, and an average value calculated for those particles is employed. The average thickness of the flaky magnetic metal particles is preferably from 10 nm to 100 μm more preferably from 10 nm to 1 μm, and even more preferably from 10 nm to 100 nm. Furthermore, it is preferable that the flaky magnetic metal particles include particles having a thickness of from 10 nm to 100 μm, more preferably from 10 nm to 1 μm, and even more preferably from 10 nm to 100 nm. As a result, when a magnetic field is applied in a direction parallel to the flat surface, the eddy current loss can be made sufficiently small, which is preferable. Furthermore, a smaller thickness is preferred because the magnetic moment is confined in a direction parallel to the flat surface, and magnetization is likely to proceed by rotation magnetization. In a case in which magnetization proceeds by rotation magnetization, since magnetization is likely to proceed reversibly, coercivity is decreased, and the hysteresis loss can be reduced thereby, which is preferable.

Figure 2B:
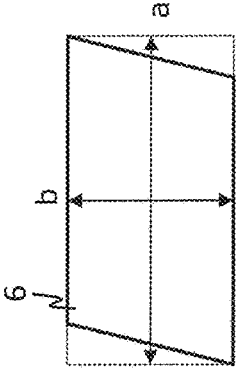
Figure 2C:
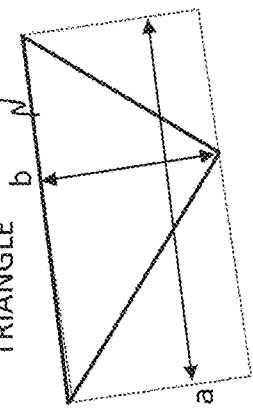

The average length of a flaky magnetic metal particle is defined by the formula: $(a+b)/2$, using the maximum length a and the minimum length b in the flat surface. The maximum length a and the minimum length b can be determined as follows. For example, among rectangles that circumscribe the flat surface, a rectangle having the smallest area is considered. Then, the length of the long side of the rectangle is designated as the maximum length a, and the length of the short side is designated as the minimum length b. FIGS. 2A to 2C are conceptual diagrams for explaining a method for determining the maximum length and the minimum length in the flat surface of a flaky magnetic metal particle according to the first embodiment. FIGS. 2A to 2C are schematic diagrams illustrating the maximum length a and the minimum length b determined by the above-described method by taking several flaky magnetic metal particles as examples. The maximum length a and the minimum length b can be determined, similarly to the case of the average thickness, by observing the flaky magnetic metal particles by TEM, SEM, or with an optical microscope or the like. Furthermore, it is also possible to determine the maximum length a and the minimum length b by performing an image analysis of microscopic photographs with a computer. For all of them, it is preferable to determine the maximum length and the minimum length for twenty or more flaky magnetic metal particles as the objects of measurement. Furthermore, it is preferable to determine the maximum length and the minimum length for as many flaky magnetic metal particles as possible as the objects of measurement, because average information can be obtained. Furthermore, in a case in which it is not possible to observe twenty or more flaky magnetic metal particles, it is preferable that an observation of as many flaky magnetic metal particles as possible is made, and average values obtained for those metal particles are employed. Furthermore, in this case, since it is preferable to determine the maximum length and the minimum length as average values as far as possible, it is preferable to perform an observation or an image analysis in a state in which the flaky magnetic metal particles are uniformly dispersed (in a state in which a plurality of flaky magnetic metal particles having different maximum lengths and minimum lengths is dispersed in a manner as random as possible). For example, it is preferable that an observation or an image analysis is carried out by sufficiently stirring a plurality of flaky magnetic metal particles and adhering the flaky magnetic metal particles onto a tape in that stirred state, or by dropping a plurality of flaky magnetic metal particles from above to fall down and adhering the particles onto a tape. FIGS. 2A to 2C illustrate flaky magnetic metal particles 6.

However, depending on the flaky magnetic metal particles, there are occasions in which when the maximum length a and the minimum length b are determined by the method described above, the method may become a method for determination without any regard to the essence. FIG. 3 is a conceptual diagram for explaining another example of the method for determining the maximum length and the minimum length in a flat surface of a flaky magnetic metal particle according to the first embodiment. For example, in a case similar to FIG. 3, the flaky magnetic metal particles are in a state of being elongatedly curved state; however, in this case, the maximum length and the minimum length of the flaky magnetic metal particles are essentially the lengths of a and b illustrated in FIGS. 2A to 2C. As such, the method for determining the maximum length a and the minimum length b cannot be decided completely uniformly, and basically, there is no problem with a method of "considering a rectangle having the smallest area among the rectangles circumscribing the flat surface, and designating the length of the long side of the rectangle as the maximum length a and the length of the short side as b". However, depending on the shape of the particles, in a case in which the essence is disregarded in this method, the maximum length a and the minimum length b are determined as the maximum length a and the minimum length b, for which the essence is considered, according to the circumstances. The thickness t is defined as the length in a direction perpendicular to the flat surface. The ratio A of the average length within the flat surface with respect to the thickness is defined by the formula: $A=((a+b)/2)/t$, using the maximum length a, minimum length b, and thickness t.

The average value of the ratio of the average length in the flat surface of the flaky magnetic metal particles with respect to a thickness in each of the flaky magnetic metal particles is preferably from 5 to 10,000. This is because the magnetic permeability increases according to the ratio. Furthermore, it is because since the ferromagnetic resonance frequency can be increased, the ferromagnetic resonance loss can be reduced.

Regarding the ratio of the average length in the flat surface with respect to the thickness, an average value is employed. Preferably, it is preferable to employ an average value calculated for twenty or more flaky magnetic metal particles. It is also preferable to determine the average value by taking as many flaky magnetic metal particles as possible as the objects of measurement, because average information can be obtained. In a case in which an observation of twenty or more flaky magnetic metal particles cannot be made, it is preferable that an observation is made for as many flaky magnetic metal particles as possible, and an average value calculated for those particles is employed. In addition, for example, in a case in which there are particle Pa, particle Pb, and particle Pc, and the thicknesses of the particles are referred to as Ta, Tb, and Tc, respectively, while the average lengths in the flat surface are referred to as La, Lb, and Lc, respectively, the average thickness is calculated by the formula: (Ta+Tb+Tc)/3, and the average value of the ratio of the average length in the flat surface with respect to the thickness is calculated by the formula: (La/Ta+Lb/Tb+Lc/Tc)/3.

It is preferable that the flaky magnetic metal particles have the difference in coercivity on the basis of direction within the flat surface. In other words, it is preferable that the flaky magnetic metal particles have the difference in coercivity in a direction-dependent manner within the flat surface. It is more preferable as the proportion of the difference in coercivity is larger, and it is preferable that the proportion is 1% or more. More preferably, the proportion of the difference in coercivity is 10% or more; even more preferably, the proportion of the difference in coercivity is 50% or more; and still more preferably, the proportion of the difference in coercivity is 100% or more. The proportion of the difference in coercivity as used herein is defined by the formula: (Hc(max)−Hc(min))/Hc(min)×100(%), using the maximum coercivity Hc(max) and the minimum coercivity Hc(min) within the flat surface. Furthermore, the coercivity can be evaluated using a vibrating sample magnetometer (VSM) or the like. In the case of having low coercivity, even a coercivity of 0.1 Oe or less can be measured by using a low magnetic field unit. In regard to the direction of the magnetic field to be measured, measurement is made by varying the direction within the flat surface.

Furthermore, the phrase "having the difference in coercivity" implies that when a magnetic field is applied in the direction of 360° within the flat surface and the coercivity is measured, there exist a direction in which maximum coercivity is obtained, and a direction in which minimum coercivity is obtained. For example, when the coercivity is measured by varying the direction at an interval of 22.5° over an angle range of 360° in the flat surface, in a case in which the difference in coercivity is exhibited, that is, there are an angle at which the coercivity becomes larger and an angle at which the coercivity becomes smaller, the concept of "having the difference in coercivity" applies. FIG. 4 is a schematic diagram illustrating the directions used when the coercivity is measured by varying the direction at an interval of 22.5° over an angle range of 360° within the flat surface of a flaky magnetic metal particle according to the first embodiment. By having the difference in coercivity within the flat surface, the minimum coercivity value becomes smaller compared to the case of isotropy with almost no difference in coercivity, which is preferable. In regard to a material having magnetic anisotropy within the flat surface, there is the difference in the coercivity depending on the direction within the flat surface, and the minimum coercivity value becomes small compared to a magnetically isotropic material. As a result, the hysteresis loss is reduced, and the magnetic permeability is increased, which is preferable.

Coercivity may be discussed using the approximation formula: Hc=αHa−NMs (Hc: coercivity, Ha: magnetocrystalline anisotropy, Ms: saturation magnetization, α, N: values varying depending on the composition, texture, shape, or the like) in connection with magnetocrystalline anisotropy. That is, generally, there is a tendency that as the magnetocrystalline anisotropy increases, coercivity is likely to increase, and as the magnetocrystalline anisotropy decreases, coercivity is likely to decrease. However, the α value and the N value in the approximation formula are values that vary significantly depending on the composition, texture, or shape of the material, and even if the magnetocrystalline anisotropy is high, the coercivity may have a relatively small value (in the case in which the α value is small or the N value is large), or even if the magnetocrystalline anisotropy is small (in the case in which the α value is large or the N value is small), the coercivity may have a relatively large value. That is, magnetocrystalline anisotropy is a characteristic intrinsic to a substance, which is defined by the composition of the material; however, coercivity is a characteristic that is not defined only by the composition of the material but can greatly vary depending on the texture, shape, or the like. Furthermore, the magnetocrystalline anisotropy is not a factor that directly affects the hysteresis loss but is a factor that indirectly affects the hysteresis loss; however, coercivity is a factor that directly affects the loop area of a direct current magnetization curve (this area corresponds to the magnitude of the hysteresis loss). Therefore, coercivity is a factor that almost directly determines the magnitude of the hysteresis loss. That is, it can be said that unlike the magnetocrystalline anisotropy, coercivity is a very important factor that affects the hysteresis loss directly and significantly.

Furthermore, even when a flaky magnetic metal particle has magnetic anisotropy including magnetocrystalline anisotropy, it cannot be necessarily said that the difference in coercivity is exhibited depending on the direction of the flat surface of the flaky magnetic metal particle. It is because as described above, coercivity is not a value that is decided uniformly by the magnetocrystalline anisotropy but is a characteristic that varies anyhow depending on the composition, texture, or shape of the material. Also, as described above, the factor that affects the hysteresis loss directly and significantly is not the magnetic anisotropy but is rather coercivity. Thus, a condition that is highly preferable toward characteristics improvement is "having the difference in coercivity on the basis of direction within the flat surface". Thereby, the hysteresis loss is reduced, and the magnetic permeability is also increased, which is preferable.

The ratio a/b of the maximum length a with respect to the minimum length b in the flat surface is preferably 2 or greater on the average, more preferably 3 or greater, even more preferably 5 or greater, and still more preferably 10 or greater. It is preferable that the ratios a/b of the maximum length a with respect to the minimum length b in the flat surface include a ratio value of 2 or greater, more preferably a ratio value of 3 or greater, even more preferably a ratio value of 5 or greater, and still more preferably a ratio value of 10 or greater. Thereby, magnetic anisotropy can be induced easily, which is desirable. When magnetic anisotropy is induced, the difference in coercivity emerges within the flat surface, and the minimum coercivity value becomes smaller compared to magnetically isotropic materials. Thereby, the hysteresis loss is reduced, and the magnetic permeability is enhanced, which is preferable. More preferably, in regard to the flaky magnetic metal particles, it is desirable that either or both of a plurality of concavities and a plurality of convexities described below have their first directions arranged in the maximum length direction. In a case in which the flaky magnetic metal particles are powder-compacted, since the ratio of a to b of the flaky magnetic metal particles is large, the area (or area proportion) in which the flat surfaces of individual flaky magnetic metal particles overlap with one another becomes large, and the strength of the pressed powder body increases, which is preferable.

Furthermore, when the ratio of the maximum length to the minimum length is larger, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity becomes small, and the hysteresis loss can be reduced thereby, which is preferable. On the other hand, from the viewpoint of improving the strength of the flaky magnetic metal particles themselves, it is preferable that the ratio a/b of the maximum length a to the minimum length b in the flat surface is, on the average, 1 or higher and lower than 2, and more preferably, 1 or higher and lower than 1.5. Thereby, fluidity or the packing property of the particles is enhanced, which is desirable. Furthermore, the strength in a direction perpendicular to the flat surface is increased compared to the case of having a large value of the ratio of a to b, and it is preferable from the viewpoint of improving the strength of the flaky magnetic metal particles themselves. Furthermore, when the particles are powder-compacted, there is less chance that the particles are powder-compacted in a bent state, and the stress to the particles is likely to be reduced. That is, strain is reduced, and this leads to reduction of the coercivity and the hysteresis loss. Also, since stress is reduced, thermal stability and mechanical characteristics such as strength and toughness are likely to be enhanced.

Furthermore, a particle having an angle in at least a portion of the contour shape of the flat surface is preferably used. For example, a contour shape such as a square or a rectangle, in other words, a contour shape having an angle of a corner of approximately 90°, is desirable. As a result, symmetry of the atomic arrangement is decreased at the corner parts, the electron orbits are confined, and therefore, magnetic anisotropy can be induced easily to the flat surface, which is desirable.

On the other hand, from the viewpoint of loss reduction or strength improvement, it is desirable that the contour shape of the flat surface is formed by a roundish curve. In an extreme example, it is desirable to employ a round contour shape such as a circle or an ellipse. As a result, abrasion resistance of the particles is enhanced, which is desirable. Furthermore, stress is not likely to be concentrated around the contour shape, the magnetic strain of the flaky magnetic metal particle is reduced, coercivity is decreased, and the hysteresis loss is reduced, which is desirable. Since stress concentration is reduced, thermal stability and mechanical characteristics such as strength and toughness are also likely to be enhanced, which is desirable.

It is also preferable that the magnetic metal phase has a portion having the crystal structure of the body-centered cubic structure (bcc). Thereby, appropriately high magnetic anisotropy can be induced easily, and the above-mentioned magnetic characteristics are enhanced. Therefore, it is preferable. Also with a "crystal structure of a mixed phase of bcc and face-centered cubic (fcc)" partially having the fcc crystal structure, appropriately high magnetic anisotropy can be induced easily, and the above-mentioned magnetic characteristics are enhanced, which is therefore preferable.

It is preferable that the flat surfaces of the flaky magnetic metal particle are crystallographically roughly oriented. The direction of orientation is preferably (110) plane orientation. Thereby, appropriately high magnetic anisotropy can be induced easily, and the above-described magnetic characteristics are enhanced. Therefore, it is preferable. A more preferred direction of orientation is (110) [111] direction. Thereby, appropriately high magnetic anisotropy can be induced easily, and the above-described magnetic characteristics are enhanced, which is therefore preferable. The crystal plane of the flat surface of the flaky magnetic metal particles is such that the peak intensity ratio of a crystal plane other than the (110) (220) plane (for example, (200), (211), (310), or (222)) with respect to (110) as measured by X-ray diffractometry (XRD) is preferably 10% or less, more preferably 5% or less, and even more preferably 3% or less. Thereby, appropriately high magnetic anisotropy can be induced easily, and the above-described magnetic characteristics are enhanced, which is therefore preferable.

In order to have the flat surfaces of the flaky magnetic metal particles (110)-oriented, it is effective to select adequate heat treatment conditions. It is preferable to set the heat treatment temperature to be from 800° C. to 1,200° C., more preferably from 850° C. to 1,100° C., even more preferably from 900° C. to 1,000° C., and still more preferably from 920° C. to 980° C. (near 940° C. is preferred). When the heat treatment temperature is too low or too high, the (110) orientation will not proceed readily, and a heat treatment temperature in the above-described range is most preferred. Furthermore, the heat treatment time is preferably 10 minutes or longer, more preferably 1 hour or longer, and even more preferably about 4 hours. When the heat treatment time is too short or too long, the (110) orientation will not proceed readily, and a heat treatment time of about 4 hours is most preferred. The heat treatment atmosphere is preferably a vacuum atmosphere with a low oxygen concentration, an inert atmosphere, or a reducing atmosphere, and more preferably a reducing atmosphere such as hydrogen ($H_2$), carbon monoxide (CO), or methane ($CH_4$). Thereby, oxidation of the flaky magnetic metal particles is suppressed, and oxidized parts can be reduced, which is therefore preferable. When the heat treatment conditions described above are selected, the (110) orientation can proceed readily, and the peak intensity ratio of a crystal plane other than the (110) (220) plane (for example, (200), (211), (310), or (222)) with respect to the (110) plane as measured by X-ray diffractometry (XRD) can be 10% or less, more preferably 5% or less, and even more preferably 3% or less, for the first time. Furthermore, strain can also be appropriately removed, and a state in which oxidation is suppressed (brought to a reduced state) can also be realized, which is preferable.

Furthermore, the flaky magnetic metal particles have a magnetic metal phase containing at least one first element selected from the group consisting of Fe, Co, and Ni. Meanwhile, the flaky magnetic metal particles contain Fe and Co, and the amount of Co included therein is preferably from 10 atom % to 60 Atom %, and more preferably from 10 Atom % to 40 Atom %, with respect to the total amount of Fe and Co. Thereby, appropriately high magnetic anisotropy is likely to be induced, and the above-described magnetic characteristics are enhanced. Therefore, it is preferable. Furthermore, an Fe—Co system is preferred because high saturation magnetization can be easily realized. Furthermore, when the composition range of Fe and Co falls in the range described above, higher saturation magnetization can be realized, and thus it is preferable. When the composition of the flaky magnetic metal particles and the composition of the attached metals are equal, thermal stability and mechanical characteristics such as strength and hardness can be easily enhanced, and it is preferable.

It is preferable that the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. Thereby, thermal stability and oxidation resistance of the flaky magnetic metal particles can be increased. Among them, Al and Si are particularly preferable because these elements can easily form solid solutions with Fe, Co, and Ni, which are main components of the flaky magnetic metal particles, and Al and Si contribute to enhancements of thermal stability and oxidation resistance.

In order to induce magnetic anisotropy, a method of amorphizing the crystallinity of the flaky magnetic metal particles as far as possible, and inducing magnetic anisotropy in one direction in the plane by means of a magnetic field or strain, may also be used. In this case, it is desirable to employ a composition that can easily amorphize the flaky magnetic metal particles as far as possible. From such a viewpoint, it is preferable that the magnetic metals included in the flaky magnetic metal particles include at least one additive element selected from boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y). An additive element which has a large difference between the atomic radius of the additive element and the atomic radius of at least one first element selected from the group consisting of Fe, Co, and Ni, is preferred. Furthermore, an additive element such that the enthalpy of mixing of at least one first element selected from the group consisting of Fe, Co, and Ni with the additive element increases negatively, is preferred. Also, a multicomponent system that is composed of three or more kinds of elements in total, including the first element and an additive element, is preferred. Since semimetallic additive elements such as B and Si have slow rates of crystallization and are easily amorphized, it is advantageous when the semimetallic additive elements are mixed into the system. From the viewpoint as described above, B, Si, P, Ti, Zr, Hf, Nb, Y, Cu, and the like are preferred, and above all, it is more preferable that the additive element includes anyone of B, Si, Zr, and Y. The total amount of the additive element is preferably such that the additive elements are included altogether in an amount of from 0.001 at % to 80 at % with respect to the total amount of the first element and the additive element. The total amount is more preferably from 5 at % to 80 at %, and even more preferably from 10 at % to 40 at %. As the total amount of the additive element is larger, amorphization proceeds, and it becomes easier to induce magnetic anisotropy, which is preferable (that is, preferable from the viewpoints of low losses and high magnetic permeability). On the other hand, since the proportion of the magnetic metal phase becomes smaller, it is not preferable from the viewpoint that saturation magnetization is reduced. However, depending on the use application (for example, magnetic wedges of a motor), the material can be sufficiently used even in a case in which saturation magnetization is relatively low, and there are occasions in which it is rather preferable that the material specializes in low losses and high magnetic permeability. Meanwhile, magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization (for example, about 0.5 to 1 T), sufficient effects are exhibited. Therefore, it is important to select the composition and the amount of the additive element, depending on the use application.

It is preferable that the flaky magnetic metal particles have high saturation magnetization, and the saturation magnetization is preferably 1 T or greater, more preferably 1.5 T or greater, even more preferably 1.8 T or greater, and still more preferably 2.0T or greater. Thereby, magnetic saturation is suppressed, and magnetic characteristics can be exhibited sufficiently in the system, which is preferable. However, depending on the use application (for example, magnetic wedges of a motor), the flaky magnetic metal particles can be used sufficiently even in a case in which the saturation magnetization is relatively low, and it may be rather preferable that the flaky magnetic metal particles are specialized for low losses. Meanwhile, the magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization, sufficient effects are exhibited. Therefore, it is important to select the composition depending on the use application.

The lattice strain of the flaky magnetic metal particles is preferably from 0.01% to 10%, more preferably from 0.01% to 5%, even more preferably from 0.01% to 1%, and still more preferably from 0.01% to 0.5%. Thereby, appropriately high magnetic anisotropy can be induced easily, and the magnetic characteristics described above are enhanced, which is therefore preferable.

The lattice strain can be calculated by analyzing in detail the line widths obtainable by X-ray diffraction (XRD). That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N. C. Halder, C. N. J. Wagner, Acta Cryst., 20 (1966), 312-313 may be referred to. Here, a Halder-Wagner plot is expressed by the following expression:

$$\frac{\beta^2}{\tan^2\theta} = \frac{K\lambda}{D}\frac{\beta}{\tan\theta\sin\theta} + 16\varepsilon^2,\ \varepsilon = \varepsilon_{max} = \frac{\sqrt{2\pi}}{2}\sqrt{\varepsilon^2}$$

($\beta$: integrated width, K: constant, $\lambda$: wavelength, D: crystal grain size, $\varepsilon^2$: lattice strain (root-mean-square))

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strains is calculated from the ordinate intercept. When the lattice strain obtained by a Halder-Wagner plot of the expression described above (lattice strain (root-mean-square)) is from 0.01% to 10%, more preferably from 0.01% to 5%, even more preferably from 0.01% to 1%, and still more preferably from 0.01% to 0.5%, appropriately high magnetic anisotropy can be induced easily, and the magnetic characteristics described above are enhanced, which is therefore preferable.

The lattice strain analysis described above is a technique that is effective in a case in which a plurality of peaks can be detected by XRD; however, on the other hand, in a case in which the peak intensities in XRD are weak, and there are few peaks that can be detected (for example, when only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy having the composition is produced, and the lattice spacing is calculated by making a measurement). Subsequently, the amount of strain can be determined by determining the difference between the lattice spacing d of the peaks of an analyzed sample and the ideal lattice spacing $d_0$. That is, in this case, the amount of strain is calculated by the expression: $(d-d_0)/d_0 \times 100(\%)$. Thus, in regard to the analysis of the lattice strain, it is preferable to use the two above-described techniques appropriately depending on the state of peak intensity, and depending on cases, it is preferable to evaluate the lattice strain by using the two techniques in combination.

The lattice spacing in the flat surface varies depending on the direction, and the proportion of the difference between the maximum lattice spacing $d_{max}$ and the minimum lattice spacing $d_{min}$ $(=(d_{max}-d_{min})/d_{min} \times 100(\%))$ is preferably from 0.01% to 10%, more preferably from 0.01% to 5%, even more preferably from 0.01% to 1%, and still more preferably from 0.01% to 0.5%. Thereby, appropriately high magnetic anisotropy can be induced easily, and the magnetic characteristics described above are enhanced, which is therefore preferable. Furthermore, the lattice spacing can be conveniently determined by an XRD analysis. When this XRD analysis is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented in the flat surface. Thereby, appropriately high magnetic anisotropy can be induced easily, and the magnetic characteristics described above are enhanced, which is therefore preferable.

It is preferable that the flat surface of a flaky magnetic metal particle has either or both of a plurality of concavities and a plurality of convexities, the concavities and the convexities being arranged in a first direction and each of the concavities and the convexities having a width of 0.1 μm or more, a length of 1 μm or more, and an aspect ratio of 2 or higher. Thereby, magnetic anisotropy is easily induced in the first direction, and the difference in coercivity on the basis of direction within the flat surface is increased, which is preferable. From this point of view, it is more preferable that the width is 1 μm or more and the length is 10 μm or more. The aspect ratio is preferably 5 or higher, and more preferably 10 or higher. Furthermore, by including such concavities or convexities, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles), and thereby, thermal stability and mechanical characteristics such as strength and hardness are enhanced. Therefore, it is preferable.

Figure 6:
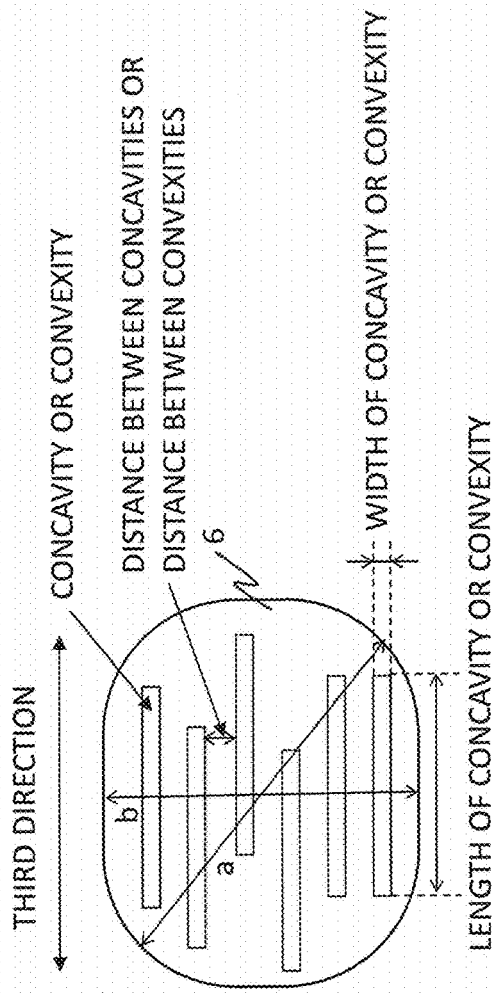
FIG. 6 is a schematic diagram of the flaky magnetic metal particles according to the first embodiment, the particles having concavities or convexities, as viewed from above.

FIG. 5 is a schematic perspective view of the flaky magnetic metal particles having concavities or convexities according to the first embodiment. Meanwhile, in the upper diagram of FIG. 5, only concavities are provided, and in the middle diagram of FIG. 5, only convexities are provided; however, as illustrated in the lower diagram of FIG. 5, one flaky magnetic metal particle may have both concavities and convexities. FIG. 6 is a schematic diagram of a case in which a flaky magnetic metal particle having concavities or convexities according to the first embodiment is viewed from above. The width and length of the concavities or convexities, and the distance between concavities or convexities are illustrated. One flaky magnetic metal particle may have both concavities and convexities. The aspect ratio of a concavity or a convexity is the ratio of the length of the major axis to the length of the minor axis. That is, when the length side of a concavity or a convexity is larger (longer) than the width, the aspect ratio is defined as the ratio of length to width, and when the width is larger (longer) than the length, the aspect ratio is defined as the ratio of width to length. As the aspect ratio is higher, the flaky magnetic metal particle is more likely to have magnetic uniaxial anisotropy (anisotropy), which is more preferable. FIG. 5 and FIG. 6 illustrate concavities 2a, convexities 2b, flaky magnetic metal particles 6, and flaky magnetic metal particles 10.

Furthermore, the phrase "(being) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". Thereby, the flaky magnetic metal particles are likely to exhibit magnetic uniaxial anisotropy in the first direction by a shape magnetic anisotropy effect, which is preferable. It is preferable that the flaky magnetic metal particles have a magnetic anisotropy in one direction within the flat surface, and this will be described in detail. First, in a case in which the magnetic domain structure of the flaky magnetic metal particles is a multi-domain structure, the magnetization process proceeds by domain wall displacement; however, in this case, the coercivity in the easy axis direction within the flat surface becomes lower than that in the hard axis direction, and losses (hysteresis loss) are decreased. Furthermore, magnetic permeability in the easy axis direction becomes higher than that in the hard axis direction. Furthermore, compared to the case of flaky magnetic metal particles that are isotropic, particularly the coercivity in the easy axis direction becomes lower in the case of flaky magnetic metal particles having magnetic anisotropy, and as a result, losses become smaller, which is preferable. Also, magnetic permeability becomes high, and it is preferable. That is, when the flaky magnetic metal particles have magnetic anisotropy in a direction in the flat surface, magnetic characteristics are enhanced as compared to an isotropic material. Particularly, magnetic characteristics are superior in the easy axis direction in the flat surface than in the hard axis direction, which is preferable. Next, in a case in which the magnetic domain structure of the flaky magnetic metal particles is a single domain structure, the magnetization process proceeds by rotation magnetization; however, in this case, the coercivity in the hard axis direction in the flat surface becomes lower than that in the easy axis direction, and losses become small. In a case in which magnetization proceeds completely by rotation magnetization, the coercivity becomes zero, and the hysteresis loss becomes zero, which is preferable. Whether magnetization will proceed by domain wall displacement (domain wall displacement type) or by rotation magnetization (rotation magnetization type) can be determined on the basis of whether the magnetic domain structure becomes a multi-domain structure or a single domain structure. At this time, whether the magnetic domain structure becomes a multi-domain structure or a single domain structure is determined on the basis of the size (thickness or aspect ratio) of the flaky magnetic metal particles, composition, the condition of the magnetic interaction between particles, and the like. For example, as the thickness t of the flaky magnetic metal particles is smaller, the magnetic domain structure is more likely to become a single domain structure, and when the thickness is from 10 nm to 1 μm, and particularly when the thickness is from 10 nm to 100 nm, the magnetic domain structure is likely to become a single domain structure. Regarding the composition, in a composition having high magnetocrystalline anisotropy, even if the thickness is large, it tends to be easy to maintain a single domain structure. In a composition having low magnetocrystalline anisotropy, if the thickness is not small, it tends to be difficult to maintain a single domain structure. That is, the thickness of the borderline between being a single domain structure or a multi-domain structure varies depending also on the composition. Furthermore, when the flaky magnetic metal particles magnetically interact with neighboring particles, and the magnetic domain structure is stabilized, the magnetic domain structure is likely to become a single domain structure. The determination of whether the magnetization behavior is of the domain wall displacement type or of the rotation magnetization type can be made simply as follows. First, within a plane of the material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

As described above, it is preferable that the flaky magnetic metal particles have magnetic anisotropy in one direction within the flat surface; however, more preferably, when the flaky magnetic metal particles have either or both of a plurality of concavities and a plurality of convexities, the concavities or convexities being arranged in a first direction, and each of the concavities and the convexities having a width of 0.1 μm or more, a length of 1 μm or more, and an aspect ratio of 2 or higher, magnetic anisotropy is more easily induced in the first direction, which is more preferable. From this point of view, a width of 1 μm or more and a length of 10 μm or more are more preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles). As a result, mechanical characteristics such as strength and hardness, and thermal stability are enhanced, and therefore, it is preferable.

In regard to the flaky magnetic metal particles, it is preferable that the largest portion of the first directions of either or both of a plurality of concavities and a plurality of convexities is arranged in the direction of the easy magnetization axis. That is, in a case in which there are a large number of directions of arrangement (=first directions) in the flat surface of a flaky magnetic metal particle, it is preferable that the direction of arrangement (=first direction) that accounts for the largest proportion in the large number of directions of arrangement (=first directions) coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are oriented with respect to this direction as the easy magnetization axis, magnetic anisotropy can be easily induced, which is preferable.

Figure 7:
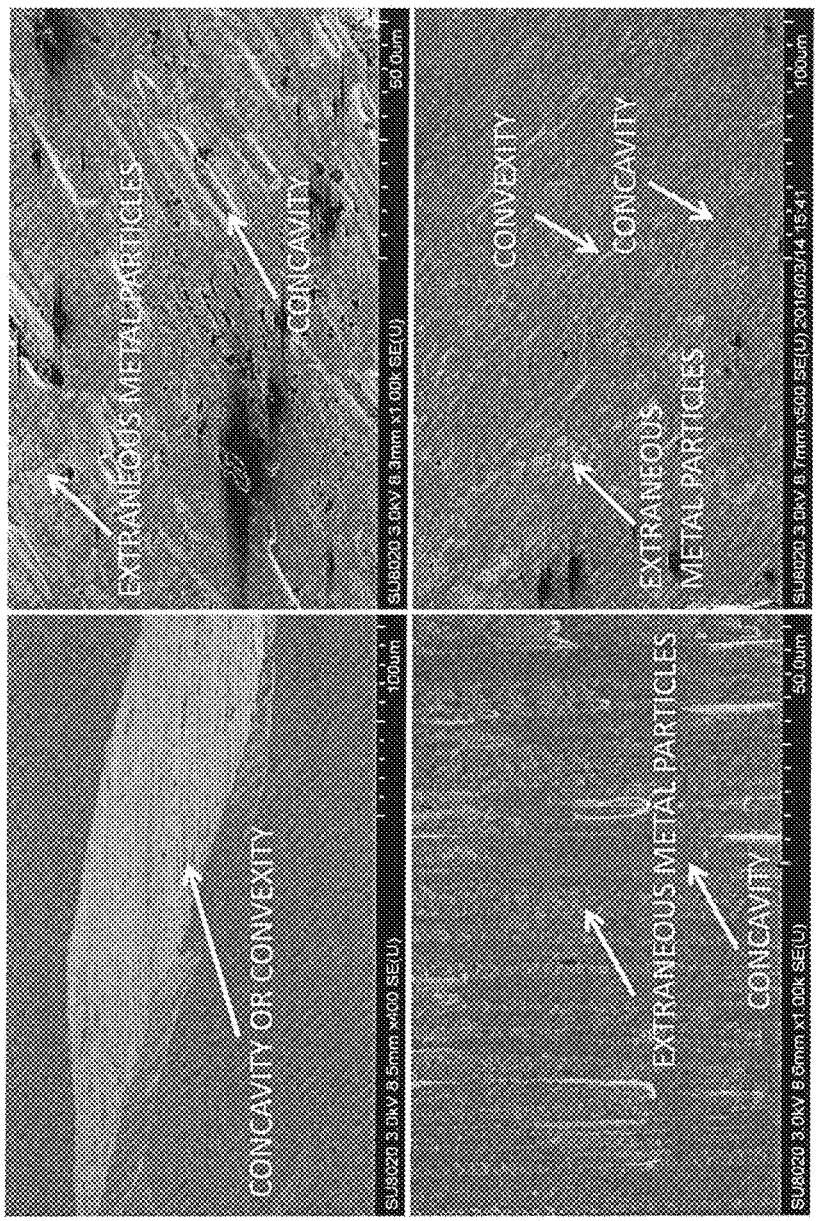
FIG. 7 is a set of scanning electron microscopic photographs of the flaky magnetic metal particles according to the first embodiment, the particles having concavities or convexities.

In regard to either or both of a plurality of concavities and a plurality of convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is from 0.1 μm to 100 μm. It is also desirable that a plurality of extraneous metal particles containing at least one first element selected from the group consisting of Fe, Co and Ni and having an average size of from 1 nm to 1 μm, are arranged along the concavities or convexities. Regarding the method for determining the average size of the extraneous metal particles, the average size is calculated by averaging the sizes of a plurality of extraneous metal particles arranged along the concavities or convexities, based on observation by TEM, SEM, an optical microscope, or the like. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring an anchoring effect of attaching the particles to neighboring particles), and thereby, mechanical characteristics such as strength and hardness, and thermal stability are enhanced, which is preferable. FIG. 7 illustrates a set of scanning electron microscopic photographs of flaky magnetic metal particles having concavities or convexities according to the first embodiment. For example, in the flaky magnetic metal particles illustrated in FIG. 7, the width of a concavity or a convexity is about several micrometers (μm), and the length of a concavity or a convexity is from about several micrometers (μm) to several dozen micrometers (μm). Of course, the width and length of the concavities or convexities are not intended to be limited to these.

It is desirable that each of the flaky magnetic metal particles further comprises a plurality of small magnetic metal particles, that is, five or more particles on the average, on the flat surface. The small magnetic metal particles contain at least one first element selected from the group consisting of Fe, Co, and Ni, and the average particle size is from 10 nm to 1 μm. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an intercalated phase that will be described below, adhesiveness is greatly enhanced. Thereby, thermal stability and mechanical characteristics such as strength and toughness can be easily enhanced. In order to exhibit such effects at the maximum level, it is desirable that the average particle size of the small magnetic metal particles is adjusted to be from 10 nm to 1 μm, and five or more small magnetic metal particles on the average are integrated with the surface, that is, the flat surface, of the flaky magnetic metal particles. When the small magnetic metal particles are unidirectionally arranged within the flat surface, magnetic anisotropy can be easily induced in the flat surface, and high magnetic permeability and low losses can be easily realized. Therefore, it is more preferable. The average particle size of the small magnetic metal particles is determined by observing the particles by TEM, SEM, an optical microscope, or the like.

The variation in the particle size distribution of the flaky magnetic metal particles can be defined by the coefficient of variation (CV value). That is, CV value (%)=[Standard deviation of particle size distribution (μm)/average particle size (μm)]×100. It can be said that as the CV value is smaller, a sharp particle size distribution with less variation in the particle size distribution is obtained. When the CV value defined as described above is from 0.1% to 60%, low coercivity, low hysteresis loss, high magnetic permeability, and high thermal stability can be realized, which is preferable. Furthermore, since the variation is small, it is also easy to realize a high yield. A more preferred range of the CV value is from 0.1% to 40%.

One effective method for inducing the difference in coercivity on the basis of direction within the flat surface of a flaky magnetic metal particle is a method of subjecting the flaky magnetic metal particle to a heat treatment in a magnetic field. It is desirable to perform a heat treatment while a magnetic field is applied unidirectionally within the flat surface. Before the heat treatment is performed in a magnetic field, it is desirable to find the easy axis direction within the flat surface (find the direction in which coercivity is lowest), and to perform the heat treatment while applying a magnetic field in that direction. It is more preferable if the magnetic field to be applied is larger; however, it is preferable to apply a magnetic field of 1 kOe or greater, and it is more preferable to apply a magnetic field of 10 kOe or greater. As a result, magnetic anisotropy can be exhibited in the flat surfaces of the flaky magnetic metal particles, the difference in coercivity on the basis of direction can be induced, and excellent magnetic characteristics can be realized. Therefore, it is preferable. The heat treatment is preferably carried out at a temperature of from 50° C. to 800° C. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane), or the like is preferred. The reason for this is that even if the flaky magnetic metal particles have been oxidized, the oxidized metal can be reduced and restored into simple metal by subjecting the metal particles to a heat treatment in a reducing atmosphere. As a result, flaky magnetic metal particles that have been oxidized and have lowered saturation magnetization can be reduced, and thereby saturation magnetization can also be restored. When crystallization of the flaky magnetic metal particles proceeds noticeably due to the heat treatment, characteristics are deteriorated (coercivity increases, and magnetic permeability decreases). Therefore, it is preferable to select the conditions so as to suppress excessive crystallization.

Furthermore, when flaky magnetic metal particles are synthesized, in a case in which the flaky magnetic metal particles are obtained by synthesizing a ribbon by a roll quenching method or the like and pulverizing this ribbon, either or both of a plurality of concavities and a plurality of convexities can be easily arranged in the first direction at the time of ribbon synthesis (concavities or convexities can be easily attached in the direction of rotation of the roll). As a result, the difference in coercivity on the basis of direction can be easily induced within the flat surface, and it is therefore preferable. That is, the direction in which either or both of a plurality of concavities and a plurality of convexities are arranged in the first direction within the flat surface, is likely to become the direction of the easy magnetization axis, and the difference in coercivity on the basis of direction is effectively induced within the flat surface, which is preferable.

Figure 8:
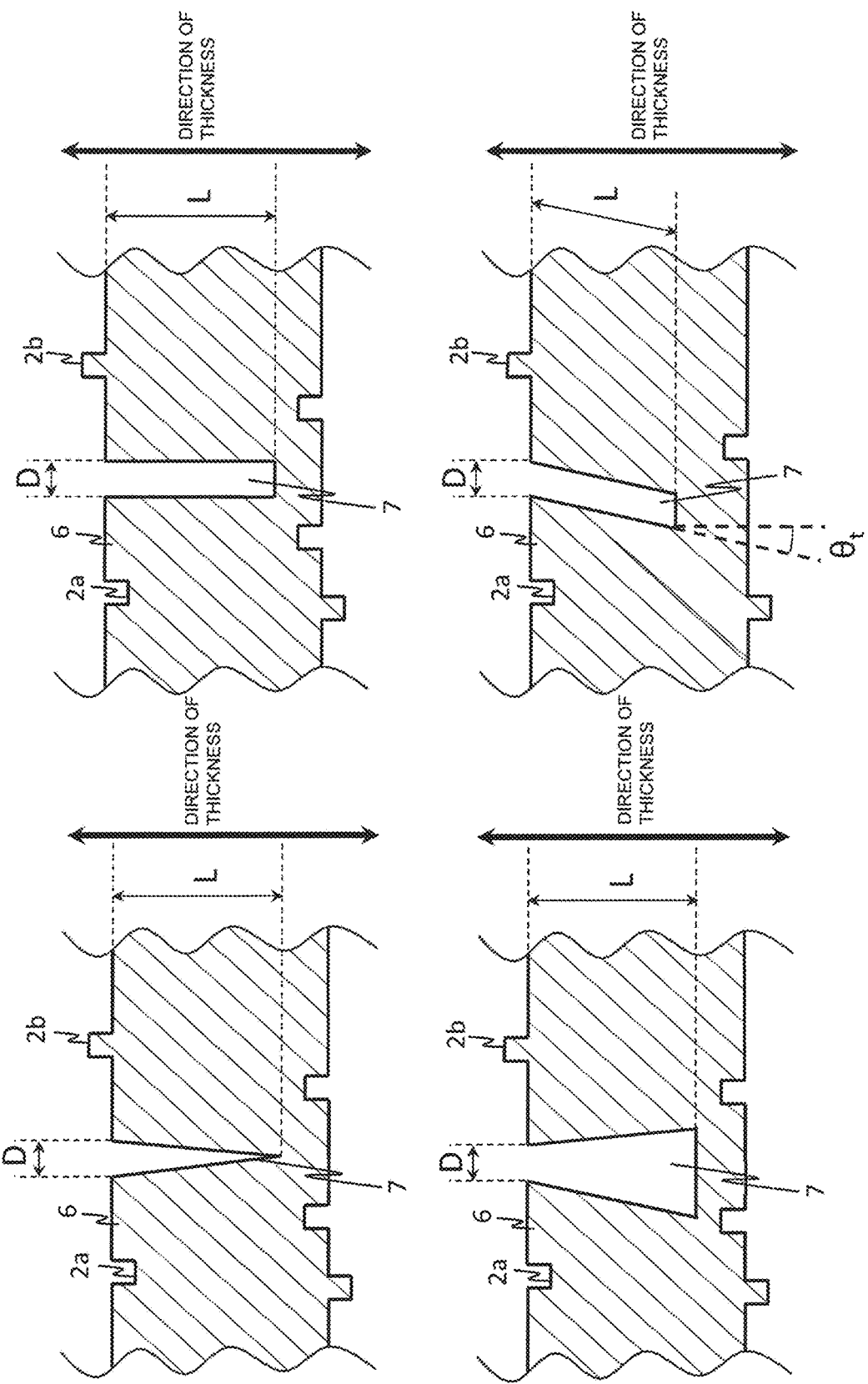
FIG. 8 is a set of schematic cross-sectional views of important parts of the flaky magnetic metal particles according to the first embodiment, the particles having concavities, convexities, and cracks.

FIG. 8 is a set of schematic cross-sectional views of important parts of the flaky magnetic metal particles according to the first embodiment, the particles having concavities, convexities, and cracks. On the flaky magnetic metal particles illustrated in the diagram, concavities and convexities are described; however, these are not necessarily needed. In FIG. 8, concavities 2a, convexities 2b, flaky magnetic metal particles 6, and cracks 7 are illustrated. Furthermore, the widths D and depths L of the cracks 7 are illustrated. In regard to FIG. 8, it is preferable that a flaky magnetic metal particle has a crack in the direction of the thickness of the flaky magnetic metal particle, the crack having a width D shorter than the depth L. Meanwhile, when the phrase "in the direction of the thickness" is used, it is implied as illustrated in FIG. 8 that the direction is a direction parallel to the thickness; however, it is still acceptable that the direction is not perfectly parallel. Within the bounds of common sense, it is desirable that the direction is within the range that generally seems to be parallel (a range of about ±45° or less with respect to parallelism) (hereinafter, the same applies to the provisions on parallelism). More preferably, it is desirable that the angle is from 0° to 30°, and more preferably from 0° to 10° (in a case in which the angle is specified without distinguishing the symbol "±" of the angle). An example in which the angle is shifted by $\theta_t$ with respect to the direction of the thickness is illustrated in the lower right diagram of FIG. 8. It is desirable that this angle $\theta_t$ is preferably from 0° to 45°, more preferably from 0° to 30°, and even more preferably from 0° to 10°. Meanwhile, in a case in which the crack is tilted from the direction of the thickness (lower right diagram of FIG. 8), the length of the depth L is defined as an effective length of the crack (effective length along the direction of the crack), as described in the lower right diagram of FIG. 8. In a case in which the crack is not in the form of a straight line but has a curved shape, depending on the situation, within the bounds of common sense, the length of the depth L is defined as an effective length of the crack (in the case of a crack having a complicated curved shape, the effective length may be determined by approximating the crack as a crack having a simple straight-line shape, depending on the case). Furthermore, it is preferable that the flaky magnetic metal particle has a crack in which the depth L is equivalent to a length of 10% or more of the thickness of the flaky magnetic metal particle. As a more preferable depth L, it is preferable that the flaky magnetic metal particle has a crack having a length of equivalent to a length of 20% or more, and more preferably 50% or more, with respect to the thickness. Furthermore, it is also preferable that the flaky magnetic metal particle has a crack that penetrates through in the direction of the thickness. As a result of these cracks, it is easy to relieve stress, and it is easy to realize low coercivity (consequently, realizing low hysteresis loss) and high magnetic permeability, which is preferable. Furthermore, since stress is also easily relieved by heat, for example, thermal stability and the like are increased, and it is preferable. In FIG. 8, several kinds of crack forms are described as examples of the crack; however, the type is not limited to these. Cracks are not in a straight-line form (having a curved shape), have a distorted form, or include various shapes. Anyways, within the bounds of common sense, when any "cracking" has occurred in a cross-section of a flaky magnetic metal particle, this is identified as a "crack".

As a preferable example of the crack, for example, in a case in which the flaky magnetic metal particle has a thickness of 10 to 20 µm, it is preferable that the flaky magnetic metal particle has a crack having a width of from 0.1 µm to 10 µm and a depth of 1 µm or more in the direction of the thickness. More preferably, it is preferable that the flaky magnetic metal particle has a crack having a width of from 1 µm to 10 µm and a depth of 1 µm or more in the direction of the thickness, and even more preferably, it is preferable that the flaky magnetic metal particle has a crack having a width of from 1 µm to 10 µm and a depth of 5 µm or more in the direction of the thickness. Furthermore, it is preferable that the flaky magnetic metal particle has a crack having a width that is shorter than the length. Thereby, stress can be easily relieved, and it is easy to realize low coercivity (consequently, realizing low hysteresis loss) and high magnetic permeability, which is preferable. Furthermore, since stress can be easily relieved by heat, for example, thermal stability and the like are increased, which is preferable.

Figure 9:
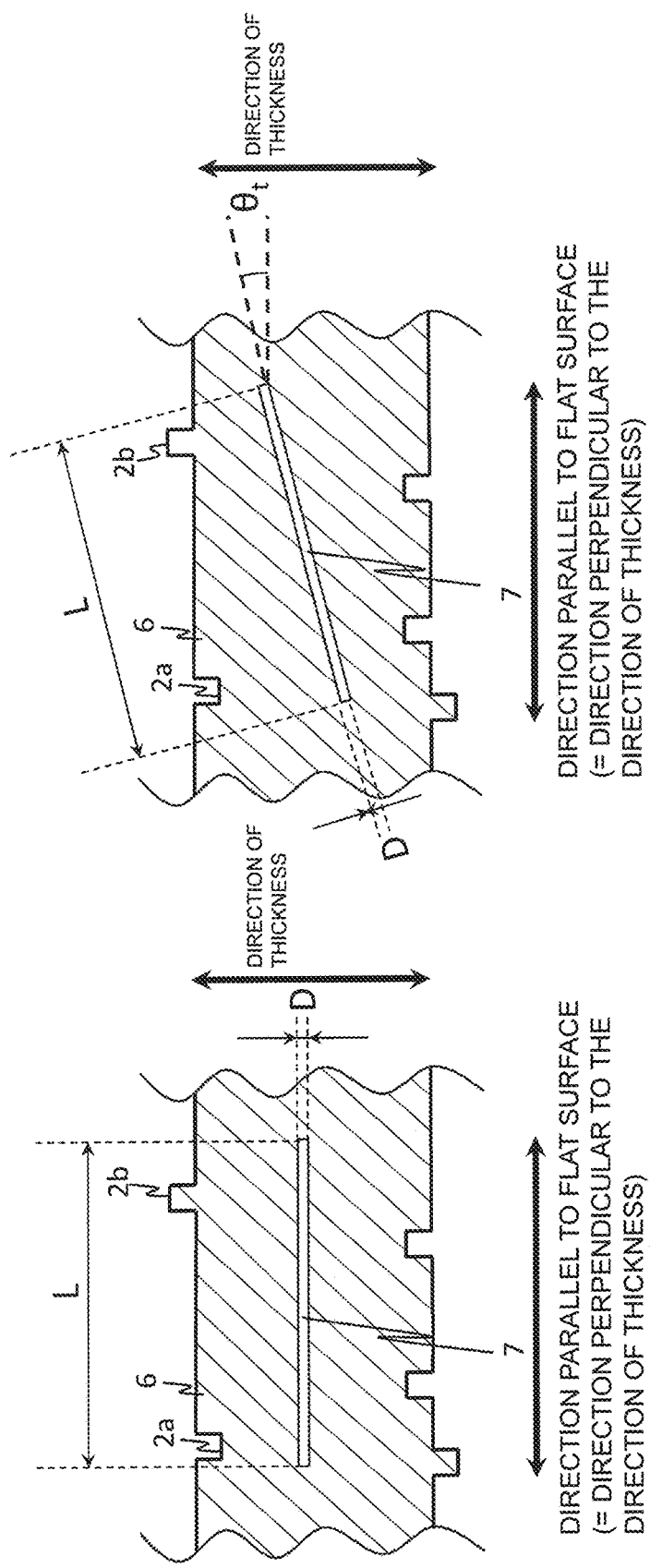
FIG. 9 is a set of schematic cross-sectional views of important parts of the flaky magnetic metal particles according to the first embodiment, the particles having concavities, convexities, and cracks (cracks extending in a direction parallel to the flat surface).

Furthermore, it is preferable that the flaky magnetic metal particle has a crack in a direction parallel to the flat surface (direction perpendicular to the direction of the thickness). In FIG. 9, a set of schematic cross-sectional views of important parts of flaky magnetic metal particles having concavities, convexities, and cracks (cracks in a direction parallel to the flat surface) according to the first embodiment are described. Meanwhile, on the flaky magnetic metal particles illustrated in the diagram, concavities and convexities are described; however, these are not necessarily needed. The "direction parallel to the flat surface" refers to a direction parallel to the flat surface as illustrated in FIG. 9; however, the direction may not be perfectly parallel. Within the bounds of common sense, it is desirable that the direction is in a range that generally seems parallel (a range of about ±45° or less with respect to parallelism) (hereinafter, the same applies to the provisions on parallelism). Meanwhile, it is desirable that the direction is preferably from 0° to 30°, and more preferably from 0° to 10° (in a case in which the angle is specified without distinguishing the symbol "±" of the angle). An example in which the angle is shifted by $\theta_t$ with respect to a direction parallel to the flat surface is illustrated in the right-hand diagram of FIG. 9. It is desirable that this angle $\theta_t$ is preferably from 0° to 45°, more preferably from 0° to 30°, and even more preferably from 0° to 10°. Meanwhile, in a case in which the crack is tilted from a direction parallel to the flat surface (right-hand diagram of FIG. 9), the length L is defined as an effective length of the crack (effective length along the direction of the crack), as described in the right-hand diagram of FIG. 9. In a case in which the crack is not in the form of a straight line but has a curved shape, depending on the situation, within the bounds of common sense, the length L is defined as an effective length of the crack (in the case of a crack having a complicated curved shape, the effective length may be determined by approximating the crack as a crack having a simple straight-line shape, depending on the case). Regarding a preferable size of the crack, it is preferable that the flaky magnetic metal particle has a crack in which the width (corresponding to D in FIG. 9) is shorter than the length (corresponding to L in FIG. 9). Furthermore, it is preferable that the flaky magnetic metal particle has a crack in which the length L is equivalent to a length of 10% or more of the thickness of the flaky magnetic metal particle. As a more preferable length L, it is preferable that the flaky magnetic metal particle has a crack having a length of equivalent to a length of 20% or more, and more preferably 50% or more, with respect to the thickness. Furthermore, as a more preferable size, it is preferable that the flaky magnetic metal particle has a crack in which the length L is a length equivalent to 10% or more of the average length within the flat surface of the flaky magnetic metal particle, more preferably a length equivalent to 20% or more of the average length within the flat surface, and even more preferably a length equivalent to 50% or more. Furthermore, it is also preferable that the flaky magnetic metal particle has a crack that penetrates through in a direction parallel to the flat surface. As a result of these cracks, it is easy to relieve stress, and it is easy to realize low coercivity (consequently, realizing low hysteresis loss) and high magnetic permeability, which is preferable. Furthermore, since stress is also easily relieved by heat, for example, thermal stability and the like are increased, and it is preferable. FIG. 9 describes cracks of very simple form as examples of the crack; however, the type is not limited to these. Cracks are not in a straight-line form (having a curved shape), or have a distorted form, or include various shapes. Anyways, within the bounds of common sense, when any "cracking" has occurred in a cross-section of a flaky magnetic metal particle, this is identified as a "crack".

As a preferable example of the crack in a direction parallel to the flat surface, for example, in a case in which the flaky magnetic metal particle has a thickness of 10 to 20 µm, it is preferable that the flaky magnetic metal particle has a crack having a width of from 0.01 µm to 10 µm and a length of 1 µm or more in a direction parallel to the flat surface. More preferably, it is preferable that the flaky magnetic metal particle has a crack having a width of from 0.1 µm to 10 µm and a length of 1 µm or more. Even more preferably, it is preferable that the flaky magnetic metal particle has a crack having a width of from 0.1 µm to 1 µm and a length of 1 µm or more. Furthermore, it is preferable that the flaky magnetic metal particle has a crack having a width that is shorter than the length. Thereby, stress can be easily relieved, and it is easy to realize low coercivity (consequently, realizing low hysteresis loss) and high magnetic permeability, which is preferable. Furthermore, since stress can be easily relieved by heat, for example, thermal stability and the like are increased, which is preferable.

It is preferable that the flaky magnetic metal particle has either or both of the "crack in the direction of the thickness" and the "crack in a direction parallel to the flat surface"

described above. Particularly, when the flaky magnetic metal particle has both of the cracks, it is easier to relieve stress, and it is easier to realize low coercivity (consequently, realizing low hysteresis loss), and high magnetic permeability, which is preferable. Furthermore, stress can be relieved by heat more easily, and for example, thermal stability and the like are further increased, which is preferable.

Figure 14:
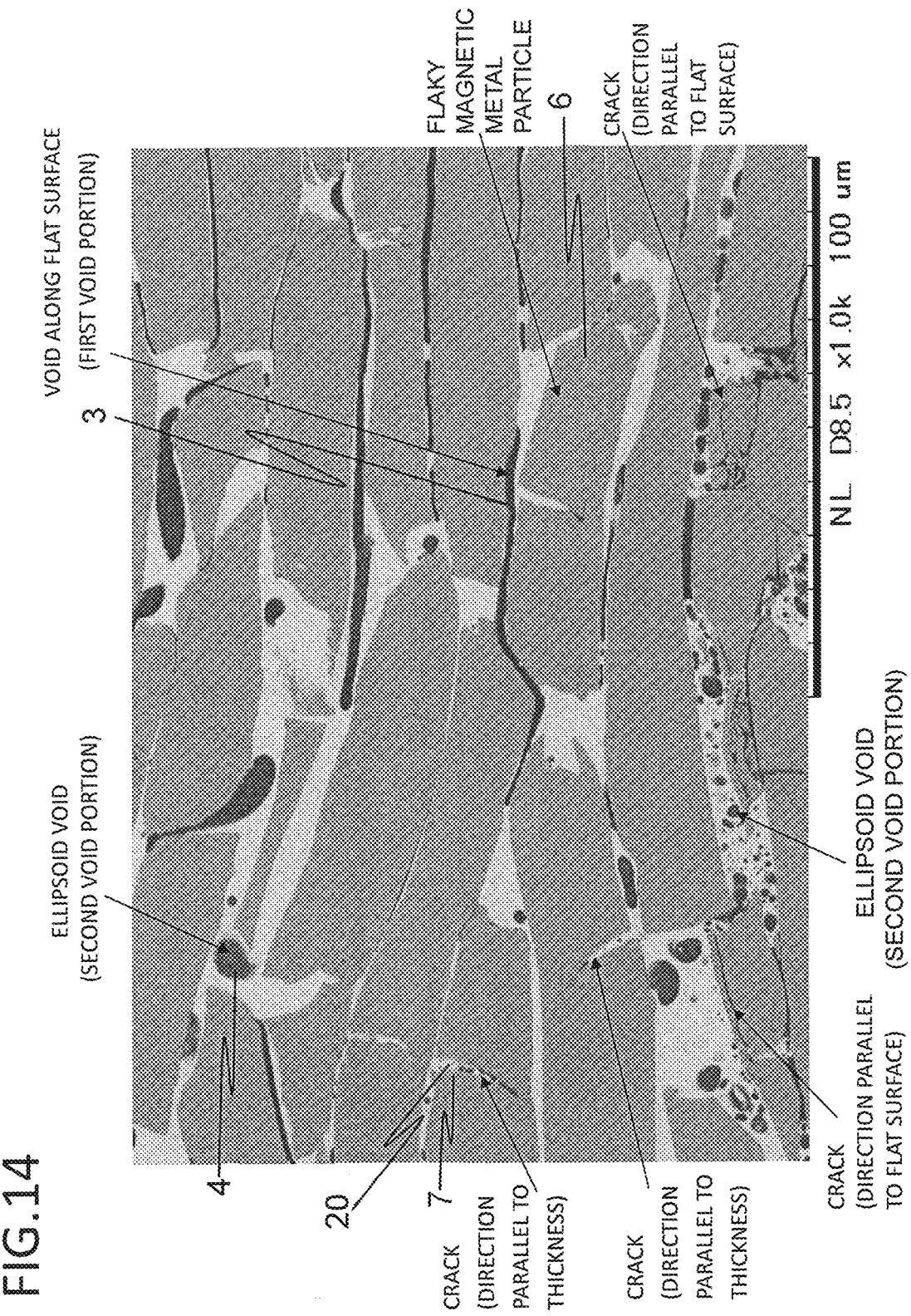
FIG. 14 is a scanning electron microscopic photograph illustrating specific examples of cracks included in the flaky magnetic metal particles and voids included in the pressed powder material in a predetermined cross-section of the pressed powder material according to the third embodiment.
Figure 15:
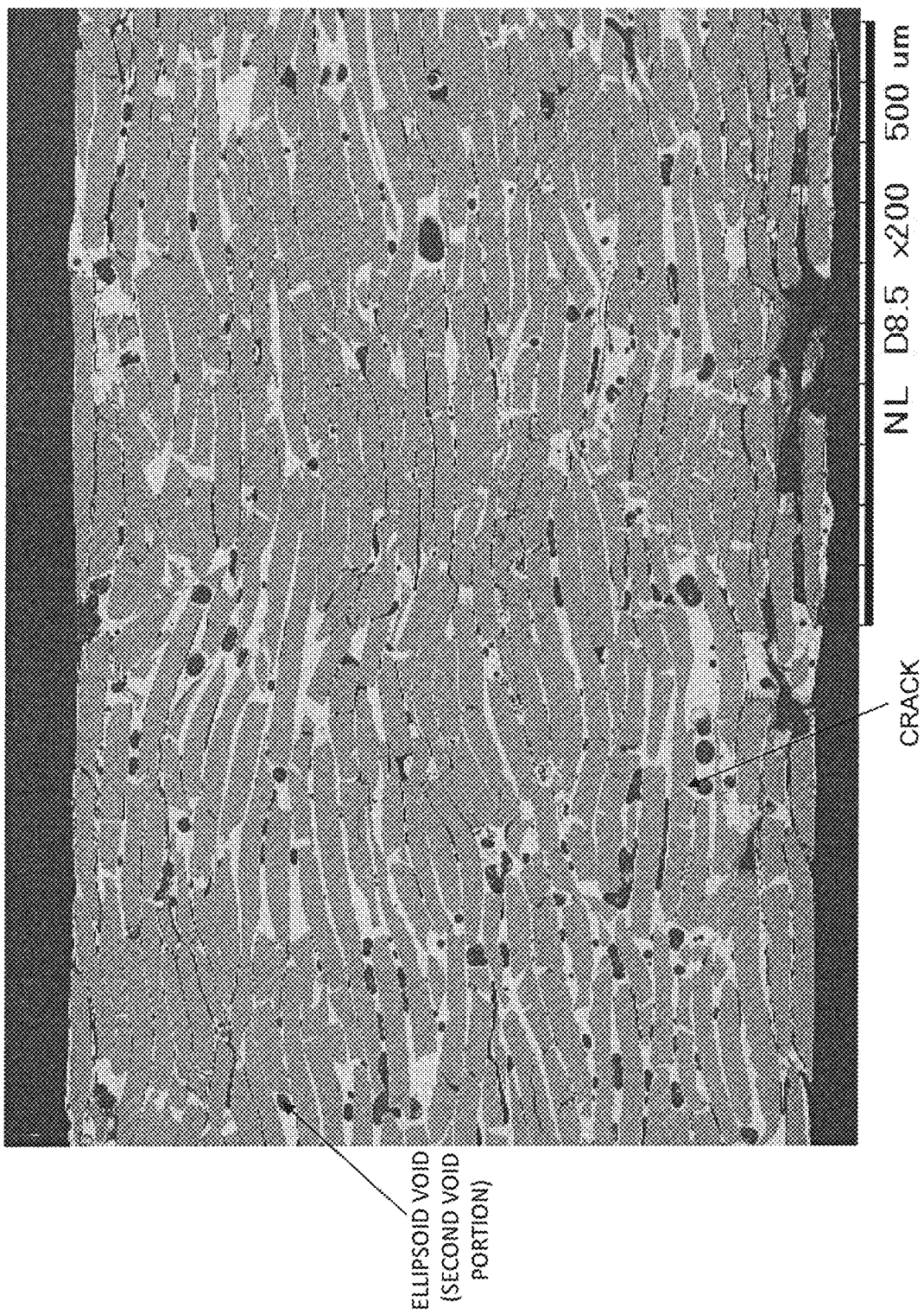
FIG. 15 is a scanning electron microscopic photograph illustrating specific examples of cracks included in the flaky magnetic metal particles and voids included in the pressed powder material in a predetermined cross-section of the pressed powder material according to the third embodiment.

The cracks of the flaky magnetic metal particles are distinguished from the concavities or convexities of the flaky magnetic metal particles (FIG. 8 and FIG. 9). In regard to the concavities of the flaky magnetic metal particles described above, the depth in a cross-section is not defined; however, generally, in many cases, the width and the depth have a length of the same extent, or the depth has a shorter length than the width. In contrast, with regard to the cracks of the flaky magnetic metal particles, since a crack having a depth that is longer than the width is preferred, a crack can be distinguished from a concavity. Furthermore, generally, regarding the concavities of the flaky magnetic metal particles described above, a single flaky magnetic metal particle has a large number of concavities as illustrated in FIG. 7, in many cases. In contrast, regarding the cracks of the flaky magnetic metal particles, a single flaky magnetic metal particle has only several cracks at most as illustrated in FIG. 14 and FIG. 15, and therefore, there is a large difference in the number density. That is, there is a feature that "in the case of concavities, the number is large but the depth is shallow", while "in the case of cracks, the number is small but the depth is deep", and therefore, the two are clearly distinguished. Furthermore, due to these features, in the case of concavities, the strength of the flaky magnetic metal particles themselves is maintained in a fairly strong state; however, the effect of relieving stress is not as large as the effect in the case of cracks in many cases. On the contrary, in the case of cracks, the effect of reliving stress is very large; however, the strength of the flaky magnetic metal particles themselves is not as strong as the strength in the case of concavities (although the particles are strong enough). Therefore, these effects are different and distinguishable.

Furthermore, a plurality of flaky magnetic metal particles according to the present embodiment is "a plurality of flaky magnetic metal particles having an average thickness of from 10 nm to 100 μm, each of the flaky magnetic metal particles comprising: a flat surface; a magnetic metal phase containing at least one first element selected from the group consisting of Fe, Co, and Ni; and the difference in coercivity on the basis of direction within the flat surface, the average value of the ratio of the average length in the flat surface with respect to the thickness being from 5 to 10,000, and the flaky magnetic metal particles including a flaky magnetic metal particle having either a crack in the direction of the thickness of the flaky magnetic metal particle, the crack having a depth equivalent to 10% or more of the thickness of the flaky magnetic metal particle and a width shorter than the depth, or a crack in a direction parallel to the flat surface, the crack having a length equivalent to 10% or more of the thickness of the flaky magnetic metal particle and a width shorter than the length, or the flaky magnetic metal particle having both of the cracks." However, it is preferable that the "flaky magnetic metal particle having either a crack in the direction of the thickness of the flaky magnetic metal particle, the crack having a depth equivalent to 10% or more of the thickness of the flaky magnetic metal particle and a width shorter than the depth, or a crack in a direction parallel to the flat surface, the crack having a length equivalent to 10% or more of the thickness of the flaky magnetic metal particle and a width shorter than the length, or the flaky magnetic metal particle having both of the cracks" is included at a number proportion of 1% or more. More preferably, it is preferable that the flaky magnetic metal particle is included at a number proportion of 10% or more. As a result, when the flaky magnetic metal particles are handled as aggregates, stress can be relived easily and low coercivity (consequently, realizing low hysteresis loss) and high magnetic permeability can be realized easily for the entirety of the aggregates. Thus, it is preferable. Furthermore, since stress can be easily relieved by heat, for example, thermal stability and the like are increased, and it is preferable.

The cracks of the flaky magnetic metal particles can be investigated by, for example, making an observation by cross-sectional SEM, cross-sectional TEM, cross-sectional optical microscopy, or the like.

According to the present embodiment, flaky magnetic metal particles having excellent magnetic characteristics such as low magnetic loss can be provided.

Second Embodiment

The flaky magnetic metal particles of the present embodiment are different from the particles of the first embodiment, from the viewpoint that at least a portion of the surface of the flaky magnetic metal particles is covered with a coating layer that has a thickness of from 0.1 nm to 1 μm and contains at least one second element selected from the group consisting of oxygen (O), carbon (C), nitrogen (N), and fluorine (F).

Meanwhile, any matters overlapping with the contents of the first embodiment will not be described repeatedly.

Figure 10A:
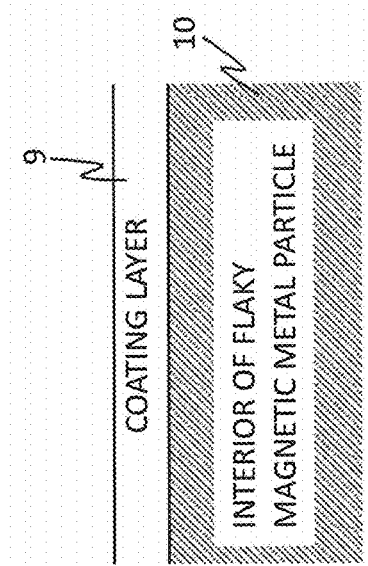
FIGS. 10A and 10B are schematic diagrams of flay magnetic metal particles according to a second embodiment.
Figure 10B:
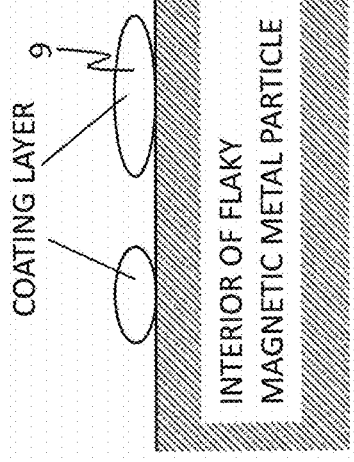

FIGS. 10A and 10B are schematic diagrams of the flaky magnetic metal particles of a second embodiment. The diagrams illustrate a coating layer 9. Meanwhile, depiction of concavities 2a, convexities 2b, and cracks 7 is not illustrated in the diagrams.

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one second element selected from the group consisting of oxygen (O), carbon (C), nitrogen (N), and fluorine (N). The non-magnetic metal is particularly preferably Al or Si, from the viewpoint of thermal stability. In a case in which the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the flaky magnetic metal particles. Among oxygen (O), carbon (C), nitrogen (N), and fluorine (F), it is preferable that the coating layer contains oxygen (O), and it is preferable that coating layer contains an oxide or a composite oxide. This is from the viewpoints of the ease of formation of the coating layer, oxidation resistance, and thermal stability. As a result, the adhesiveness between the flaky magnetic metal particles and the coating layer can be enhanced, and the thermal stability and oxidation resistance of the pressed powder material that will be described below can be enhanced. The coating layer can not only enhance the thermal stability and oxidation resistance of the flaky magnetic metal particles, but can also enhance the electrical resistance of the flaky magnetic metal particles. By increasing the electrical resistance, the eddy current loss can be suppressed, and the frequency characteristics of the magnetic permeability can be enhanced. Therefore, it is preferable that the coating layer 9 is electrically highly resistant, and for example, it is preferable that the coating layer 9 has an electrical resistance value of 1 mΩ·cm or greater.

Furthermore, the presence of the coating layer is preferable also from the viewpoint of magnetic characteristics. In regard to the flaky magnetic metal particles, since the size of the thickness is small relative to the size of the flat surface, the metal particles may be regarded as a pseudo-thin film. At this time, a product obtained by forming the coating layer on the surface of the flaky magnetic metal particles and integrating the coating layer with the particles may be considered to have a pseudo-laminated thin film structure, and the magnetic domain structure is stabilized in terms of energy. As a result, coercivity can be reduced (hysteresis loss is reduced thereby), which is preferable. At this time, the magnetic permeability also becomes high, and it is preferable. From such a viewpoint, it is more preferable that the coating layer is non-magnetic (magnetic domain structure is easily stabilized).

From the viewpoints of thermal stability, oxidation resistance, and electrical resistance, it is more preferable as the thickness of the coating layer is larger. However, if the thickness of the coating layer is too large, the saturation magnetization becomes small, and the magnetic permeability also becomes small, which is not preferable. Furthermore, also from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is from 0.1 nm to 1 μm, and more preferably from 0.1 nm to 100 nm.

Thus, according to the present embodiment, flaky magnetic metal particles having excellent characteristics such as high magnetic permeability, low losses, excellent mechanical characteristics, and high thermal stability can be provided.

Third Embodiment

A pressed powder material of the present embodiment is a pressed powder material comprising a plurality of flaky magnetic metal particles having an average thickness of from 10 nm to 100 μm, each of the flaky magnetic metal particles having a flat surface and a magnetic metal phase containing at least one first element selected from the group consisting of Fe, Co, and Ni, the average value of the ratio of the average length within the flat surface with respect to the thickness being from 5 to 10,000, the flaky magnetic metal particles including a flaky magnetic metal particle having either a crack in the direction of the thickness of the flaky magnetic metal particle, the crack having a depth equivalent to 10% or more of the thickness of the flaky magnetic metal particle and a width shorter than the depth, or a crack in a direction parallel to the flat surface, the crack having a length equivalent to 10% or more of the thickness of the flaky magnetic metal particle and a width shorter than the length, or the flaky magnetic metal particle having both of the cracks; and an intercalated phase existing between the flaky magnetic metal particles and containing at least one second element selected from the group consisting of oxygen (O), carbon (C), nitrogen (N), and fluorine (F), the flat surfaces being oriented in the pressed powder material to be parallel to a plane of the pressed powder material, and the pressed powder material having the difference in coercivity on the basis of direction within the plane.

It is preferable that the flaky magnetic metal particles satisfy the requirements described in the first and second embodiments are satisfied; however, regarding any overlapping matters, further description will not be repeated herein.

FIG. 11 is a schematic diagram of a pressed powder material of a third embodiment. The diagram illustrates an intercalated phase 20, a pressed powder material 100, and a plane 102 of the pressed powder material. The diagram illustrated on the right-hand side of FIG. 11 is a schematic diagram illustrating a state in which the intercalated phase exists partially. Furthermore, depiction of concavities 2a, convexities 2b, and cracks 7 is not illustrated.

An example of predetermined cross-sections 22a and 22b is illustrated in the right-hand diagram of FIG. 11. According to the present embodiment, the flaky magnetic metal particles 6 are oriented to be parallel to the plane 102 of the pressed powder material. The "predetermined cross-sections 22" are cross-sections of the pressed powder material 100, which are perpendicular to this plane 102. Meanwhile, the method of picking the "predetermined cross-sections 22" is definitely not limited to the method illustrated in FIG. 11.

FIG. 12 is a schematic diagram illustrating a disposition example of flaky magnetic metal particles in faces that are parallel to the respective cross-sections according to the third embodiment. The pressed powder material 100 illustrated in FIG. 12 as an example has a rectangular parallelepiped shape having a longitudinal length of a, a horizontal length of b, and a height of c. The plane 102 of the pressed powder material is defined as the top face (or the bottom face) of the pressed powder material 100 in FIG. 12. In this case, since the flaky magnetic metal particles 6 are oriented in parallel to the plane 102 (face ab) of the pressed powder material, the disposition of the flaky magnetic metal particles 6 is, for example, as illustrated in the lower diagram of FIG. 12 (meanwhile, in the case of FIG. 12, elongated flaky magnetic metal particles having a large ratio a/b of the maximum length a to the minimum length b within the flat surface of the flaky magnetic metal particles are used). Then, a face perpendicular to the face ab becomes a "predetermined cross-section". For example, any face parallel to face be or any face parallel to face ac can become the "predetermined cross-section" (in addition to that, a face perpendicular to the face ab can be arbitrarily determined, and the face can be designated as the "predetermined cross-section"). Meanwhile, the method of picking the "face of the pressed powder material" and the "predetermined cross-section" is not limited to this.

Figure 13:
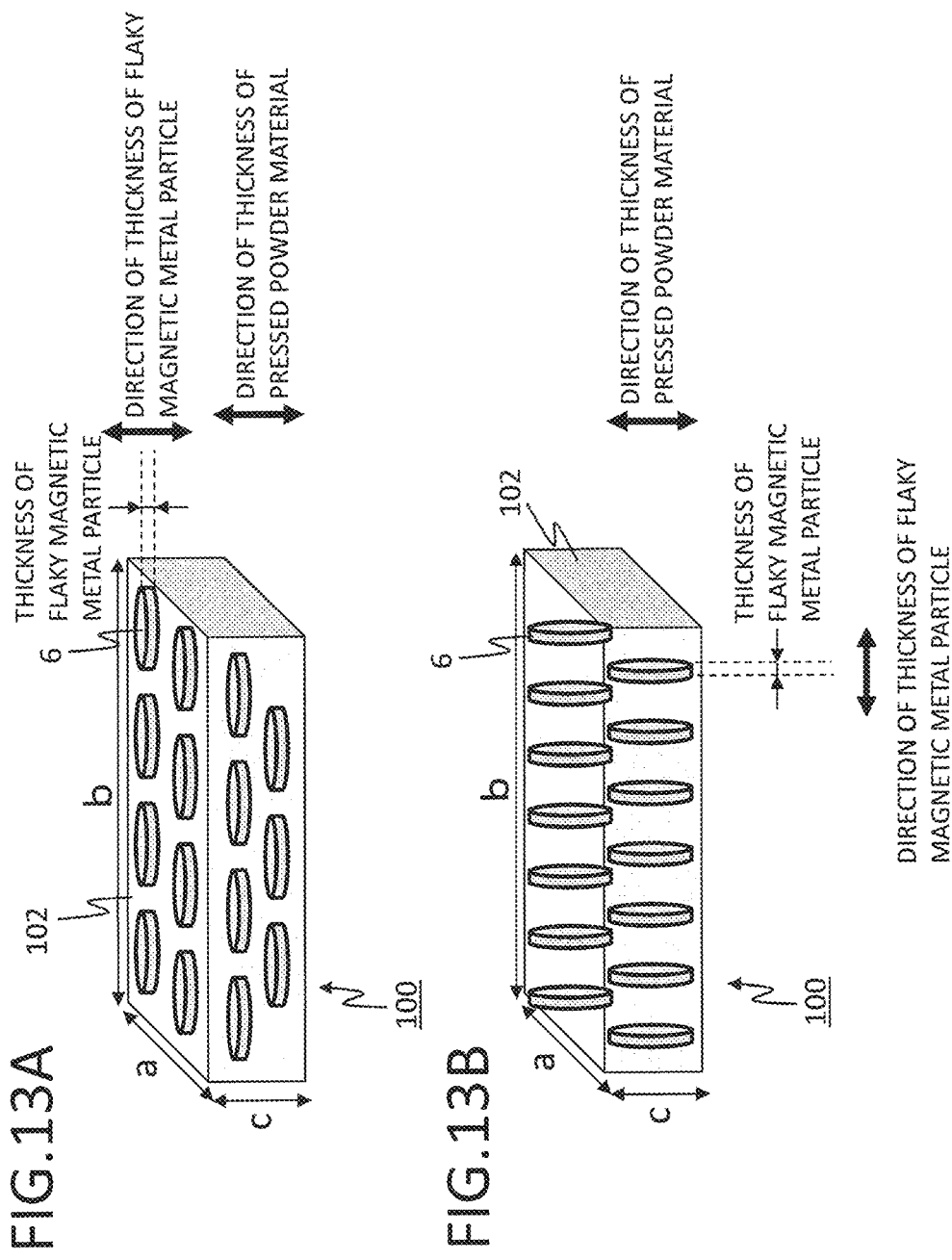
FIGS. 13A and 13B are schematic diagrams illustrating the direction of the thickness of the pressed powder material according to the third embodiment.

FIGS. 13A and 13B are schematic diagrams illustrating the direction of the thickness of a pressed powder material. With regard to the "direction of the thickness of a pressed powder material", in a case in which the shape of the pressed powder material is a rectangular parallelepiped, for example, the direction of a side having the shortest length among the lengths of three sides is referred to as "direction of the thickness of the pressed powder material". Even in a case in which the shape of the pressed powder material is not a simple rectangular parallelepiped (for example, in the case of having a complicated shape or in the case of a polyhedral or the like), similarly, within the bounds of common sense, the direction of a side having the shortest length is referred to as "direction of the thickness of pressed powder material". In FIG. 13A and FIG. 13B, the c-axis direction is the direction of the thickness of the pressed powder material (because among the three sides a, b, and c, c is the shortest side). On the other hand, with regard to the "direction of the thickness of the flaky magnetic metal particle", in FIG. 13A, the c-axis direction is the direction of the thickness of the flaky magnetic metal particles. Furthermore, in FIG. 13B, the b-axis direction is the direction of the thickness of the flaky magnetic metal particles. As such, it should be noted that the direction of the thickness of the pressed powder material and the direction of the thickness of the flaky magnetic metal particles do not necessarily coincide.

FIG. 14 and FIG. 15 are scanning electron microscopic photographs illustrating specific examples of the cracks included in the flaky magnetic metal particles and the voids included in the pressed powder material at predetermined cross-sections according to the third embodiment. Voids (first void portion) 3 present along the flat surfaces of the flaky magnetic metal particles, ellipsoid voids (second void portion) 4, and cracks 7 are illustrated therein.

In regard to a plurality of flaky magnetic metal particles, it can be verified that the particles have cracks in the interior. It can also be verified that a plurality of voids is included in a pressed powder material. When such a structure is adopted, stress can be easily relieved, and low coercivity (consequently, realizing low hysteresis loss) and high magnetic permeability can be easily realized, which is preferable. Furthermore, since stress can also be easily relieved by heat, for example, thermal stability and the like are increased, which is preferable. Since the cracks and the voids respectively have the above-described effects, it is preferable that either cracks or voids exist singly, or it is also preferable that both of them exist together. Furthermore, in the case of cracks, the above-described effects can be exhibited particularly easily, and thus it is preferable. Even in view of strength, it is preferable because the above-described effects can be exhibited while the strength of the pressed powder material is maintained. On the other hand, in the case of voids, as the number of voids is larger, the above-described effects can be easily exhibited, and it is preferable in this point of view. However, when there are too many voids, since the proportion occupied by the flaky magnetic metal particles in the pressed powder material is smaller, magnetization is low, and the magnetic permeability is lowered, which is not preferable. Furthermore, since the pressed powder material is likely to be deteriorated in view of strength, an excessive amount of voids is not preferable. From this point of view, the amount of voids is preferably within the range that will be described below.

It is preferable that the flaky magnetic metal particles included in the pressed powder material have cracks whose width D is shorter than the depth L. Furthermore, it is preferable that the flaky magnetic metal particles have cracks in which the depth L has a length equivalent to 10% or more of the thickness. As a more preferred depth L, it is preferable that the flaky magnetic metal particles have cracks whose depth L has a length equivalent to 20% or more, and even more preferably 50% or more, of the thickness. Furthermore, it is also preferable that the flaky magnetic metal particles have cracks that penetrate through in the direction of the thickness. Thereby, stress can be relieved easily, and low coercivity (consequently, realizing low hysteresis loss) and high magnetic permeability can be realized easily, which is preferable. Furthermore, since stress can be easily relieved by heat, for example, thermal stability and the like are increased, which is preferable.

As a preferred example of the crack, for example, in a case in which a flaky magnetic metal particle has a thickness of 10 to 20 μm, it is preferable that the flaky magnetic metal particle has a crack having a width of from 0.1 μm to 10 μm and a depth of 1 μm or more in the direction of the thickness. More preferably, it is preferable that the flaky magnetic metal particle has a crack having a width of from 1 μm to 10 μm and a depth of 1 μm or more in the direction of the thickness, and even more preferably, it is preferable that the flaky magnetic metal particle has a crack having a width of from 1 μm to 10 μm and a depth of 5 μm or more in the direction of the thickness. Furthermore, it is preferable that the flaky magnetic metal particle has a crack whose width is shorter than the length. Thereby, stress can be relieved easily, and low coercivity (consequently, realizing low hysteresis loss) and high magnetic permeability can be realized easily, which is preferable. Furthermore, since stress can be easily relieved by heat, for example, thermal stability and the like are increased, which is preferable.

Furthermore, it is preferable that the flaky magnetic metal particles have a crack in a direction parallel to the flat surface (a direction perpendicular to the direction of the thickness). In this case as well, regarding a preferred size of the crack, it is preferable that a flaky magnetic metal particle has a crack whose width (corresponding to D in FIG. 9) is shorter than the length (corresponding to L in FIG. 9). Furthermore, it is preferable that the flaky magnetic metal particle has a crack whose length L is a length equivalent to 10% or more of the average length within the flat surface of the flaky magnetic metal particle. As a more preferred length (corresponding to L), it is preferable that the flaky magnetic metal particle has a crack having a length equivalent to 20% or more, and even more preferably 50% or more, of the average length within the flat surface. Furthermore, it is also preferable that the flaky magnetic metal particle has a crack that penetrates through in the direction of the flat surface. Thereby, stress can be easily relieved, and low coercivity (consequently, realizing low hysteresis loss) and high magnetic permeability can be realized easily, which is preferable. Furthermore, since stress can be easily relieved by heat, for example, thermal stability and the like are increased, which is preferable.

Meanwhile, in a predetermined cross-section of the pressed powder material, it is preferable that the flaky magnetic metal particles having the cracks are included at a number proportion of 1% or more with respect to all of the flaky magnetic metal particles (including all of flaky magnetic metal particles having cracks and flaky magnetic metal particles having no cracks) in the pressed powder material, and more preferably, it is preferable that the flaky magnetic metal particles having the cracks are included at a number proportion of 10% or more. It is because as a result, stress can be easily relieved, and low coercivity (consequently, realizing low hysteresis loss) and high magnetic permeability can be realized easily, which is preferable. Furthermore, it is because since stress can be easily relieved by heat, for example, thermal stability and the like are increased, which is preferable.

Meanwhile, regarding the method of making an observation at a predetermined cross-section, the method does not matter as long as it is a method of observing a cross-section of a plurality of flaky magnetic metal particles. For example, a cross-section perpendicular to the flat surfaces of the flaky magnetic metal particles is observed by TEM, SEM, optical microscopy, or the like, and the number proportion is measured with respect to the flaky magnetic metal particles thus observed. Hereinafter, the "observation at a predetermined cross-section" means the same in all occasions.

Furthermore, it is preferable that the intercalated phase is disposed inside the cracks. It is because as a result, the stress applied to the flaky magnetic metal particles at portions where there is no crack is relieved, and low coercivity (consequently, realizing low hysteresis loss) and high magnetic permeability can be realized easily. Furthermore, it is because since stress can be easily relieved by heat, for example, thermal stability and the like are increased, which is preferable.

In the pressed powder material, it is preferable that voids are included at an area ratio of from 1% to 60% in a predetermined cross-section of the pressed powder material. The area ratio is more preferably from 1% to 50%, and even more preferably from 1% to 20%. These voids have an effect of easily relieving stress, similarly to the cracks, and low coercivity (consequently, realizing low hysteresis loss) and high magnetic permeability can be realized easily, which is preferable. Furthermore, since stress can also be easily relieved by heat, for example, thermal stability and the like are increased, which is preferable.

Furthermore, it is preferable that the voids of the pressed powder material include first void portions that exist along the flat surfaces of the flaky magnetic metal particles in the predetermined cross-section. Furthermore, it is preferable that the first void portion is in contact with the flat surfaces. Alternatively, it is preferable that a first void portion that is in contact with at least a portion of the flaky magnetic metal particles is included. The shape of the first void portion is preferably a flat shape. Since flat-shaped voids are easily formed along the flat surfaces of the flaky magnetic metal particles at a predetermined cross-section of the pressed powder material, the shape is likely to be a flat form. Meanwhile, in a case in which there is an intercalated phase attached on the flat surfaces, while it is definitely natural, the first void portion may be in contact with the intercalated phase; however, it is also preferable in this case. Furthermore, it is also preferable that the first void portion is covered with the intercalated phase. When the first void portion is illustrated as a flat shape having a major axis and a minor axis, the ratio of the major axis to the minor axis is preferably 2 or higher, more preferably 3 or higher, even more preferably 5 or higher, and still more preferably 10 or higher. When such a configuration is adopted, stress can be easily relieved, and low coercivity (consequently, realizing low hysteresis loss) and high magnetic permeability can be realized easily, which is preferable. Furthermore, since stress can also be easily relieved by heat, for example, thermal stability and the like are increased, which is preferable.

Furthermore, it is preferable that the voids of the pressed powder material include second void portions, which are ellipsoids (including spheres) having a major axis and a minor axis. At this time, the ratio of the major axis to the minor axis is preferably from 1 to 10, more preferably from 1 to 5, even more preferably from 1 to 3, and even more preferably from 1 to 2. Furthermore, it is preferable that the minor axis is from 0.1 µm to 100 µm. More preferably, it is preferable that the minor axis is from 1 µm to 50 µm, and even more preferably from 1 µm to 50 µm. Furthermore, it is preferable that the second void portion is in contact with the intercalated phase, and more preferably, it is preferable that the second void portion is covered with the intercalated phase at the predetermined cross-section. It is also preferable in a case in which the second void portion is in contact with the flat surfaces at the predetermined cross-section. Alternatively, it is preferable that the second void portion includes a portion that is in contact with at least a portion of the flaky magnetic metal particles. When such a configuration is adopted, stress can be easily relieved, and low coercivity (consequently, realizing low hysteresis loss) and high magnetic permeability can be realized easily, which is preferable. Furthermore, since stress can also be easily relieved by heat, for example, thermal stability and the like are increased, which is preferable. It is preferable that the above-described voids (voids of the first void portion, the second void portion, and the like) include voids that are in contact with at least a portion of the flaky magnetic metal particles at a predetermined cross-section that is perpendicular to a plane of the pressed powder material. Furthermore, it is preferable that the voids include voids that are covered with the intercalated phase at a predetermined cross-section that is perpendicular to a plane of the pressed powder material. When such a configuration is adopted, stress can be easily relieved, and low coercivity (consequently, realizing low hysteresis loss) and high magnetic permeability can be realized easily, which is preferable. Furthermore, since stress can also be easily relieved by heat, for example, thermal stability and the like are increased, which is preferable.

As such, the pressed powder material according to the third embodiment is provided with a first void portion or a second void portion. These voids are formed inside the pressed powder material while reflecting the shape of the flaky magnetic metal particles to a certain extent. It is considered that as a result, the stress exerted on the flaky magnetic metal particles is relieved, and a pressed powder material having low coercivity is obtained.

Meanwhile, it is preferable that at least one predetermined cross-section of the pressed powder material is configured as described above, and it is more preferable that a plurality of predetermined cross-sections is configured as described above. When such a configuration is adopted, stress can be easily relieved, and low coercivity (consequently, realizing low hysteresis loss) and high magnetic permeability can be realized easily, which is preferable. Furthermore, since stress can also be easily relieved by heat, for example, thermal stability and the like are increased, which is preferable.

Figure 16B:
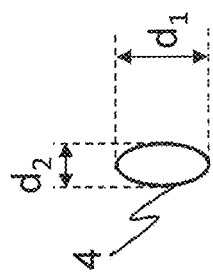
FIGS. 16A to 16C are schematic cross-sectional views of an ellipsoid void and flaky magnetic metal particles disposed around the ellipsoid void according to the third embodiment.
Figure 16A:
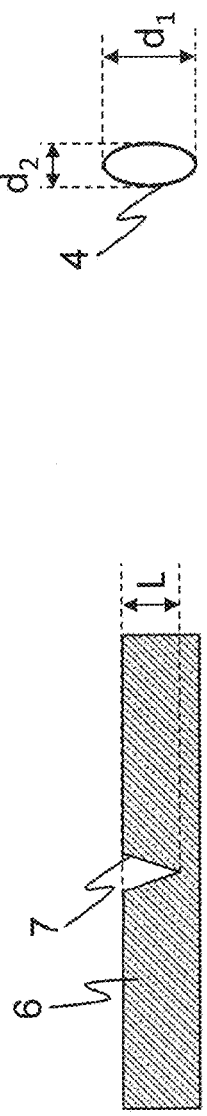
Figure 16C:
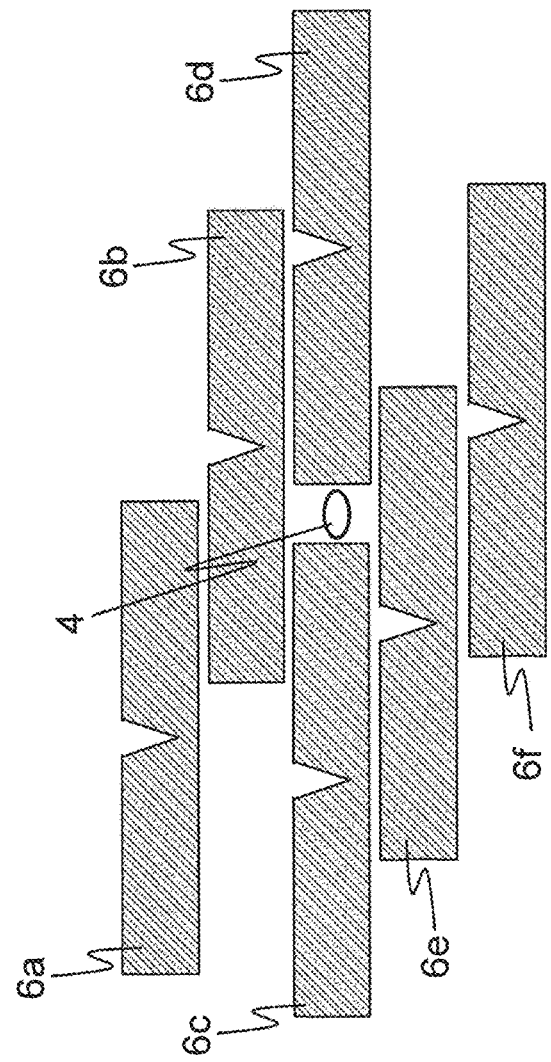

FIGS. 16A to 16C are schematic cross-sectional views of an ellipsoid void and flaky magnetic metal particles according to the third embodiment. FIG. 16A is a schematic cross-sectional view of a flaky magnetic metal particle according to the third embodiment. FIG. 16B is a schematic cross-sectional view of an ellipsoid void according to the third embodiment. FIG. 16C is a schematic cross-sectional view of an ellipsoid void and flaky magnetic metal particles disposed around the ellipsoid void according to the third embodiment. Meanwhile, in regard to FIGS. 16A to 16C, the description of the intercalated phase 20, concavities 2a, and convexities 2b is not abbreviated here (not necessarily needed).

It is preferable that the minor axis of the second void portion has a length less than or equal to the average thickness of the flaky magnetic metal particles present at positions closest (adjacent) to the second void portion in the direction of the flat surfaces, with the intercalated phase being interposed therebetween. It is preferable that the minor axis length of the second void portion is long because stress is relieved; however, on the other hand, when the minor axis length of the second void portion becomes longer than the thickness of the flaky magnetic metal particles, the strength of the pressed powder material tends to deteriorate, and therefore, it is not preferable. Regarding the conditions in which stress can be relieved while high strength is maintained, and low coercivity can be realized, it is preferable that the minor axis of the second void portion has a length less than or equal to the average thickness of the flaky magnetic metal particles that are adjacent to the second void portion, with the intercalated phase interposed therebetween. Here, regarding the "flaky magnetic metal particles adjacent to the second void portion in the direction of the flat surfaces, with the intercalated phase interposed therebetween", flaky magnetic metal particles 6c and 6d correspond to the flaky magnetic metal particles in FIG. 16C, and a plurality of flaky magnetic metal particles 6a, 6b, 6e, and 6f does not correspond to the "flaky magnetic metal particles present at positions closest to the second void portion in the direction of the flat surfaces, with the intercalated phase interposed therebetween" (6a and 6f cannot be said to exist at "positions closest", and are not adjacent to each other. 6b and 6e are adjacent to each other in the direction of the thickness; however, they are not adjacent to each other in the direction of the flat surface. Therefore, they do not correspond to the "positions closest"). Then, the average value of the thicknesses of these adjacent flaky magnetic metal particles 6c and 6d is employed, and this average value is referred to as "average thickness of the adjacent flaky magnetic metal particles".

It is preferable that a portion of the intercalated phase is attached along a first direction. In other words, it is preferable that a portion of the intercalated phase is attached along the direction of concavities or convexities on the flat surface of a flaky magnetic metal particle. Thereby, magnetic anisotropy is likely to be induced in one direction, and thus it is preferable. Furthermore, such attachment of the intercalated phase improves the adhesiveness between the flaky magnetic metal particles, and thereby mechanical characteristics such as strength and hardness or thermal stability is enhanced. Therefore, it is preferable. Furthermore, it is preferable that the intercalated phase includes a particulate intercalated phase. Thereby, the adhesiveness between the flaky magnetic metal particles is appropriately maintained in an appropriate state, strain is reduced (as a result of having a particulate intercalated phase between the flaky magnetic metal particles, the stress applied to the flaky magnetic metal particles is relieved), and coercivity is easily reduced (hysteresis loss is reduced, while magnetic permeability is increased), which is preferable.

It is preferable that the intercalated phase is included in an amount of from 0.01 wt % to 80 wt %, more preferably from 0.1 wt % to 60 wt %, and even more preferably from 0.1 wt % to 40 wt %, with respect to the total amount of the pressed powder material. When the proportion of the intercalated phase is too large, the proportion of the flaky magnetic metal particles that have the role of exhibiting magnetic properties becomes small, and thereby, the saturation magnetization or magnetic permeability of the pressed powder material is lowered, which is not preferable. In contrast, when the proportion of the intercalated phase is too small, bonding between the flaky magnetic metal particles and the intercalated phase is weakened, and it is not preferable from the viewpoints of thermal stability and mechanical characteristics such as strength and toughness. The proportion of the intercalated phase that is optimal from the viewpoints of magnetic characteristics such as saturation magnetization and magnetic permeability, thermal stability, and mechanical characteristics, is from 0.01 wt % to 80 wt %, more preferably from 0.1 wt % to 60 wt %, and even more preferably from 0.1 wt % to 40 wt %, with respect to the total amount of the pressed powder material.

Furthermore, it is preferable that the proportion of lattice mismatch between the intercalated phase and the flaky magnetic metal particles is from 0.1% to 50%. Thereby, appropriately high magnetic anisotropy can be easily induced, and the above-mentioned magnetic characteristics are enhanced, which is preferable. In order to set the lattice mismatch to the range described above, the lattice mismatch can be realized by selecting the combination of the composition of the intercalated phase and the composition of the flaky magnetic metal particles 6. For example, Ni of the fcc structure has a lattice constant of 3.52 Å, and MgO of the NaCl type structure has a lattice constant of 4.21 Å. Thus, the lattice mismatch of the two is $(4.21-3.52)/3.52\times 100=20\%$. That is, the lattice mismatch can be set to 20% by employing Ni of the fcc structure as the main composition of the flaky magnetic metal particles and employing MgO for the intercalated phase 20. As such, the lattice mismatch can be set to the range described above by selecting the combination of the main composition of the flaky magnetic metal particles and the main composition of the intercalated phase.

The intercalated phase contains at least one second element selected from the group consisting of oxygen (O), carbon (C), nitrogen (N), and fluorine (F). It is because the electrical resistance can be increased thereby. It is preferable that the electrical resistivity of the intercalated phase is higher than the electrical resistivity of the flaky magnetic metal particles. It is because the eddy current loss of the flaky magnetic metal particles can be reduced thereby. Since the intercalated phase exists so as to surround the flaky magnetic metal particles, the oxidation resistance and thermal stability of the flaky magnetic metal particles can be enhanced, which is preferable. Above all, it is more preferable that the intercalated phase contains oxygen from the viewpoint of having high oxidation resistance and high thermal stability. Since the intercalated phase also plays a role of mechanically adhering flaky magnetic metal particles to neighboring flaky magnetic metal particles, it is preferable also from the viewpoint of high strength.

The intercalated phase may satisfy at least one of the following three conditions: "being an oxide or an eutectic oxide", "containing a resin", and "containing at least one magnetic metal selected from Fe, Co, and Ni". This will be described below.

First, the first "case in which the intercalated phase is an oxide or an eutectic oxide" will be described. In this case, the intercalated phase contains an oxide containing at least one of a third element selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). More preferably, the intercalated phase contains an eutectic oxide containing at least two of the third element selected from the group described above. Particularly, it is preferable that the intercalated phase contains an eutectic system containing at least two elements from among B, Bi, Si, Zn, and Pb. As a result, the adhesiveness between the flaky magnetic metal particles and the intercalated phase becomes strong (bonding strength increases), and thermal stability and mechanical characteristics such as strength and toughness can be easily enhanced.

Furthermore, the above-described oxide or the eutectic oxide preferably has a softening point of from 200° C. to 600° C., and more preferably from 400° C. to 500° C. Even more preferably, the oxide or the eutectic oxide is an eutectic oxide containing at least two elements from among B, Bi, Si, Zn, and Pb, and preferably an eutectic oxide having a softening point of from 400° C. to 500° C. Thereby, the bonding between the flaky magnetic metal particles and the oxide or the eutectic oxide becomes strong, and the thermal stability and mechanical characteristics such as strength and toughness can be easily enhanced. When the flaky magnetic metal particles are integrated with the oxide or the eutectic oxide, the two components are integrated while performing a heat treatment at a temperature near the softening point of the oxide or the eutectic oxide, and preferably a temperature slightly higher than the softening point. Thereby, the adhesiveness between the flaky magnetic metal particles and the oxide or the eutectic oxide is increased, and mechanical characteristics can be enhanced. Generally, as the temperature of the heat treatment is higher to a certain extent, the adhesiveness between the flaky magnetic metal particles and the oxide or the eutectic oxide increases, and the mechanical characteristics are enhanced. However, when the temperature of the heat treatment becomes too high, the coefficient of thermal expansion is increased, and therefore, the adhesiveness between the flaky magnetic metal particles and the oxide or the eutectic oxide may be decreased on the contrary (when the difference between the coefficient of thermal expansion of the flaky magnetic metal particles and the coefficient of thermal expansion of the oxide or the eutectic oxide becomes large, the adhesiveness may be further decreased). Furthermore, in a case in which the crystallinity of the flaky magnetic metal particles is non-crystalline or amorphous, when the temperature of the heat treatment is high, crystallization proceeds, and coercivity increases. Therefore, it is not preferable. For this reason, in order to achieve both the mechanical characteristics and the coercivity characteristics, it is preferable to adjust the softening point of the oxide or the eutectic oxide to be from 200° C. to 600° C., and more preferably from 400° C. to 500° C., and to integrate the flaky magnetic metal particles and the oxide or the eutectic oxide while performing a heat treatment at a temperature near the softening point of the oxide or the eutectic oxide, and preferably at a temperature slightly higher than the softening point. Furthermore, regarding the temperature at which the integrated material is actually used in a device or a system, it is preferable to set the use temperature of the integrated material to be lower than the softening point.

Furthermore, it is desirable that the oxide or the eutectic oxide has a glass transition temperature. Furthermore, it is desirable that the oxide or the eutectic oxide has a coefficient of thermal expansion of from $0.5 \times 10^{-6}$/° C. to $40 \times 10^{6}$/° C. Thereby, the bonding between the flaky magnetic metal particles 6 and the oxide or the eutectic oxide becomes strong, and thermal stability and mechanical characteristics such as strength and toughness can be easily enhanced.

Furthermore, it is more preferable that at least one or more eutectic particles that are in a particulate form (preferably a spherical form) having a particle size of from 10 nm to 10 µm are included. These eutectic particles contain a material that is the same as the oxide or the eutectic oxide but is not in a particulate form. In a pressed powder material, voids may also exist in some part, and thus, it can be easily observed that a portion of the oxide or the eutectic oxide exists in a particulate form, and preferably in a spherical form. Even in a case in which there are no voids, the interface of the particulate form or spherical form can be easily discriminated. The particle size of the eutectic particles is more preferably from 10 nm to 1 µm, and even more preferably from 10 nm to 100 nm. As a result, when stress is appropriately relieved during the heat treatment while the adhesiveness between the flaky magnetic metal particles is maintained, the strain applied to the flaky magnetic metal particles can be reduced, and coercivity can be reduced. Thereby, the hysteresis loss is also reduced, and the magnetic permeability is increased. Meanwhile, the particle size of the eutectic particles can be measured by making an observation by TEM or SEM.

Furthermore, it is preferable that the intercalated phase has a softening point that is higher than the softening point of the oxide or the eutectic oxide, and it is more preferable that the intercalated phase has a softening point higher than 600° C. and further contains intermediate intercalated particles containing at least one element selected from the group consisting of oxygen (O), carbon (C), nitrogen (N), and fluorine (F). When the intermediate intercalated particles exist between the flaky magnetic metal particles, on the occasion in which the pressed powder material is exposed to high temperature, the flaky magnetic metal particles can be prevented from being thermally fused with one another and undergoing deterioration of characteristics. That is, it is desirable that the intermediate intercalated particles exist mainly for the purpose of providing thermal stability. Furthermore, when the softening point of the intermediate intercalated particles is higher than the softening point of the oxide or the eutectic oxide, and more preferably, the softening point is 600° C. or higher, thermal stability can be further increased.

It is preferable that the intermediate intercalated particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one element selected from the group consisting of O (oxygen), C (carbon), N (nitrogen) and F (fluorine). More preferably, from the viewpoints of high oxidation resistance and high thermal stability, an oxide or composite oxide containing oxygen is more preferred. Particularly, oxides such as aluminum oxide ($Al_2O_3$), silicon dioxide ($SiO_2$), titanium oxide ($TiO_2$), and zirconium oxide ($ZrO_2$); and composite oxides such as Al—Si—O are preferred from the viewpoint of high oxidation resistance and high thermal stability.

Regarding the method for producing a pressed powder material containing intermediate intercalated particles, for example, a method of mixing the flaky magnetic metal particles and the intermediate intercalated particles (aluminum oxide ($Al_2O_3$) particles, silicon dioxide ($SiO_2$) particles, titanium oxide ($TiO_2$) particles, zirconium oxide ($ZrO_2$) particles, and the like) using a ball mill or the like to obtain a dispersed state, and then integrating the flaky magnetic metal particles and the intermediate intercalated particles by press molding or the like, may be used. The method of dispersing the particles is not particularly limited as long as it is a method capable of appropriately dispersing particles.

Next, the second "case in which the intercalated phase contains a resin" will be described. In this case, the resin is not particularly limited, and a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or copolymers of those resins are used. Particularly, in order to realize high thermal stability, it is preferable that the intercalated phase includes a silicone resin or a polyimide resin, both of which have high heat resistance. As a result, the bonding between the flaky magnetic metal particles and the intercalated phase becomes strong, and thermal stability and mechanical characteristics such as strength and toughness can be easily enhanced.

Regarding the resin, it is preferable that the weight reduction percentage after heating for 3,000 hours at 180° C. in an air atmosphere is 5% or less, more preferably 3% or less, even more preferably 1% or less, and still more preferably 0.1% or less. Furthermore, the weight reduction percentage after heating for 200 hours at 220° C. in an air atmosphere is preferably 5% or less, more preferably 3% or less, even more preferably 1% or less, and still more preferably 0.1% or less. Furthermore, the weight reduction percentage after heating for 200 hours at 250° C. in an air atmosphere is preferably 5% or less, more preferably 3% or less, even more preferably 1% or less, and still more preferably 0.1% or less. An evaluation of these weight reduction percentages is carried out using a material in an unused state. An unused state refers to a state that can be used after molding, and is a state in which the usable state has not been exposed to heat (for example, heat at a temperature of 40° C. or higher), chemicals, sunlight (ultraviolet radiation), or the like. The weight reduction percentage is calculated by the following formula from the masses obtained before and after heating: weight reduction percentage (5)=[mass (g) before heating−mass (g) after heating]/mass (g) before heating×100. It is also preferable that the strength after heating for 20,000 hours at 180° C. in an air atmosphere is a half or more of the strength before heating. It is more preferable that the strength after heating for 20,000 hours at 220° C. in an air atmosphere is a half or more of the strength before heating. Furthermore, it is preferable that the resin satisfies the area division H defined by the Japanese Industrial Standards (JIS). Particularly, it is preferable that the resin satisfies the heat resistance condition of enduring a maximum temperature of 180° C. More preferably, it is preferable that the resin satisfies the area division H defined by the Japanese National Railways Standards (JRE). Particularly, it is preferable that the resin satisfies the heat resistance condition of enduring a temperature increase of 180° C. with respect to the ambient temperature (standard: 25° C., maximum: 40° C.). Examples of a resin preferable for these conditions include a polysulfone, a polyether sulfone, polyphenylene sulfide, polyether ether ketone, an aromatic polyimide, an aromatic polyamide, an aromatic polyamideimide, polybenzoxazole, a fluororesin, a silicone resin, and a liquid crystal polymer. These resins have high intermolecular cohesive power, and therefore, the resins have high heat resistance, which is preferable. Among them, an aromatic polyimide and polybenzoxazole have higher heat resistance and are preferable, because the proportions occupied by rigid units in the molecule are high. Furthermore, it is preferable that the resin is a thermoplastic resin. The specifications about the weight reduction percentage upon heating, the specifications about strength, and the specifications about resin type as described above are respectively effective for increasing the heat resistance of the resin. Due to these, when a pressed powder material comprising a plurality of flaky magnetic metal particles and an intercalated phase (herein, a resin) is formed, the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above), are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, in regard to the pressed powder material, it is preferable that the weight reduction percentage after heating for 3,000 hours at 180° C. is 5% or less, more preferably 3% or less, even more preferably 1% or less, and still more preferably 0.1% or less. Furthermore, the pressed powder material is such that the weight reduction percentage after heating for 3,000 hours at 220° C. is preferably 5% or less, more preferably 3% or less, even more preferably 1% or less, and still more preferably 0.1% or less. Furthermore, the weight reduction percentage of the pressed powder material after heating for 200 hours at 250° C. in an air atmosphere is preferably 5% or less, more preferably 3% or less, even more preferably 1% or less, and still more preferably 0.1% or less. The evaluation of the weight reduction percentage is similar to the case of the resin as described above. Furthermore, preferably, it is preferable that the strength of the pressed powder material after heating for 20,000 hours at 180° C. in an air atmosphere is a half or more of the strength before heating. It is more preferable that the strength of the pressed powder material after heating for 20,000 hours at 220° C. in an air atmosphere is a half or more of the strength before heating. Furthermore, it is preferable that the pressed powder material satisfies the area division H defined by the Japanese Industrial Standards (JIS). Particularly, it is preferable that the pressed powder material satisfies the heat resistance condition of enduring a maximum temperature of 180° C. More preferably, it is preferable that the pressed powder material satisfies the area division H defined by the Japanese National Railways Standards (JRE). Particularly, it is preferable that the pressed powder material satisfies the heat resistance condition of enduring a temperature increase of 180° C. with respect to the ambient temperature (standard: 25° C., maximum: 40° C.). The specifications about the weight reduction percentage upon heating, the specifications about strength, and the specifications about resin type as described above are respectively effective for increasing the heat resistance of the pressed powder material, and a material having high reliability can be realized. Since the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above), are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, it is preferable that the pressed powder material includes a crystalline resin that does not have a glass transition point up to the thermal decomposition temperature. It is also preferable that the pressed powder material includes a resin having a glass transition temperature of 180° C. or higher, and it is more preferable that the pressed powder material includes a resin having a glass transition temperature of 220° C. or higher. It is even more preferable that the pressed powder material includes a resin having a glass transition temperature of 250° C. or higher. Generally, the flaky magnetic metal particles have a larger crystal grain size as the temperature of the heat treatment is higher. Therefore, in a case in which there is a need to make the crystal grain size of the flaky magnetic metal particles small, it is preferable that the glass transition temperature of the resin used is not too high, and specifically, it is preferable that the glass transition temperature is 600° C. or lower. Furthermore, it is preferable that the crystalline resin that does not have a glass transition point up to the thermal decomposition temperature includes a resin having a glass transition temperature of 180° C. or higher, and it is more preferable that the crystalline resin includes a resin having a glass transition temperature of 220° C. or higher. Specifically, it is preferable that the crystalline resin includes a polyimide having a glass transition temperature of 180° C. or higher, it is more preferable that the crystalline resin includes a polyimide having a glass transition temperature of 220° C. or higher, and it is even more preferable that the crystalline resin includes a thermoplastic polyimide. As a result, fusion of the resin to the magnetic metal particles is likely to occur, and the resin can be suitably used particularly for powder-compacting molding. The thermoplastic polyimide is preferably a polyimide having an imide bond in the polymer chain of a thermoplastic aromatic polyimide, a thermoplastic aromatic polyamideimide, a thermoplastic aromatic polyetherimide, a thermoplastic aromatic polyesterimide, a thermoplastic aromatic polyimidesiloxane, or the like. Among them, when the glass transition temperature is 250° C. or higher, superior heat resistance is obtained, and thus it is preferable.

An aromatic polyimide and polybenzoxazole exhibit high heat resistance since an aromatic ring and a heterocyclic ring are directly bonded to each other and adopt a planar structure, and those planar structures are immobilized by π-π stacking. Thereby, the glass transition temperature can be increased, and thermal stability can be enhanced. Furthermore, the glass transition temperature can be easily adjusted to a desired glass transition point by appropriately introducing a curved unit such as an ether bond into the molecular structure, and thus it is preferable. Above all, when the benzene ring structure of a unit derived from an acid anhydride that constitutes the imide polymer is any one of a biphenyl structure, a triphenyl structure, and a tetraphenyl structure, it is preferable from the viewpoint of strength. Since the symmetric structure between imide groups, which affects heat resistance, is not damaged, and the orientation property also extends over a long distance, the material strength is also increased. An aromatic polyimide structure preferable for this is expressed by the following Chemical Formula (1). In other words, the polyimide resin of the present embodiment includes a repeating unit expressed by the following Chemical Formula (1):

[Chemical Formula 1]

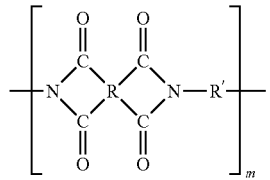

In Chemical Formula (1), R represents anyone of a biphenyl structure, a triphenyl structure, and a tetraphenyl structure; and R' represents a structure having at least one or more aromatic rings in the structure.

When the characteristics (weight reduction percentage, resin type, glass transition temperature, molecular structure, and the like) of an intercalated phase (herein, a resin), which is a constituent component of the pressed powder material, are determined from the pressed powder material, only a portion of resin is cut out from the pressed powder material, and evaluation of various characteristics is carried out. In a case in which it cannot be determined by visual inspection whether the portion is formed from a resin or not, the resin and the magnetic metal particles are distinguished by using an elemental analysis based on EDX, or the like.

When the content of the resin contained in the pressed powder material as a whole is larger, the space between the polymer wetting (covering) a flaky magnetic metal particle and the polymer wetting (covering) an adjacent flaky magnetic metal particle can be filled with a polymer without difficulty, and thus mechanical characteristics such as strength are enhanced. Furthermore, the electrical resistivity is also increased, and the eddy current loss of the pressed powder material can be reduced, which is preferable. Meanwhile, as the content of the resin is larger, the proportion of the flaky magnetic metal particles is decreased. Therefore, the saturation magnetization of the pressed powder material decreases, and the magnetic permeability is also decreased, which is not preferable. In order to realize a well-balanced material by comprehensively considering the mechanical characteristics such as strength, and characteristics such as electrical resistivity, eddy current loss, saturation magnetization, and magnetic permeability, it is preferable to adjust the content of the resin in the entire pressed powder material to 93 wt % or less, more preferably to 86 wt % or less, even more preferably to from 2 wt % to 67 wt %, and still more preferably to from 2 wt % to 43 wt %. Furthermore, the content of the flaky magnetic metal particles is preferably 7 wt % or more, more preferably 14 wt % or more, even more preferably from 33 wt % to 98 wt %, and still more preferably from 57 wt % to 98 wt %. The flaky magnetic metal particles are such that when the particle size decreases, the surface area increases, and the amount of the resin required is dramatically increased. Therefore, it is preferable that the flaky magnetic metal particles have an appropriately large particle size. As a result, the pressed powder material can be subjected to high saturation magnetization, the magnetic permeability can be made high, and this is advantageous for size reduction and power output increase of a system.

Next, the third "case in which the intercalated phase contains at least one magnetic metal selected from Fe, Co, and Ni and has magnetic properties" will be described. In this case, it is preferable because, as the intercalated phase has magnetic properties, the flaky magnetic metal particles can readily interact magnetically with neighboring particles, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the issue of whether the intercalated phase has magnetic properties, an evaluation can be made using a vibrating sample magnetometer (VSM) or the like. In regard to the fact that the intercalated phase contains at least one magnetic metal selected from Fe, Co, and Ni and has magnetic properties, an investigation can be performed conveniently by using EDX or the like.

Thus, three conditions of the intercalated phase have been described, and it is preferable that at least one of these three conditions is satisfied; however, it is still acceptable that two or more, or all of the three conditions are satisfied. The "case in which the intercalated phase is an oxide or an eutectic oxide" (first case) exhibits slightly inferior mechanical characteristics such as strength as compared to a case in which the intercalated phase is a resin (second case); however, on the other hand, the first case is highly excellent from the viewpoint that strain can be easily relieved, and particularly, lowering of coercivity can easily occur. Therefore, it is preferable (as a result, low hysteresis loss and high magnetic permeability can be easily realized, which is preferable). Furthermore, oxides and eutectic oxides have higher heat resistance compared to resins in many cases, and oxides and eutectic oxides also have excellent thermal stability, which is preferable. In contrast, the "case in which the intercalated phase contains a resin" (second case) has a defect that since the adhesiveness between the flaky magnetic metal particles and the resin is high, stress is likely to be applied (strain is likely to enter), and as a result, coercivity tends to increase. However, since a resin is highly excellent, particularly in view of mechanical characteristics such as strength, a resin is preferable. The "case in which the intercalated phase contains at least one magnetic metal selected from Fe, Co, and Ni and has magnetic properties" (third case) is preferable because the flaky magnetic metal particles can easily interact magnetically with neighboring particles, and particularly because the intercalated phase becomes highly excellent in view of high magnetic permeability and low coercivity (consequently, low hysteresis loss). An intercalated phase that achieves a good balance can be produced by using the three conditions appropriately, or by combining some of the three conditions, based on the above-described advantages and disadvantages.

In the following description, the production method will be specifically explained. The production method is not particularly limited and will be explained as example.

A first step is a step for producing a magnetic metal ribbon containing at least one first element selected from the group consisting of Fe, Co, and Ni. The present step is a step of producing a ribbon or a thin film using, for example, a film-forming apparatus such as a roll quenching apparatus or a sputtering apparatus. At this time, regarding the film-forming method of producing a ribbon or a thin film using a film-forming apparatus, it is desirable that a film having uniaxial anisotropy induced within the film plane is formed by film forming in a magnetic field, rotary film forming, or the like. Furthermore, in the case of using a film-forming apparatus, the thickness can be made small, a refined texture is likely to be obtained, and rotation magnetization is easily induced. Therefore, it is desirable to use a film-forming method in a case in which a rotation magnetization type magnetic material. A roll quenching apparatus is adequate for synthesis in large quantities, and therefore, it is desirable when a bulk material is synthesized. In the case of a roll quenching apparatus, a single roll quenching apparatus is convenient and preferable. Furthermore, by maintaining the roughness of the roll surface in an appropriately controlled state, concavities or convexities can be easily transferred and attached onto the face of the ribbon to be synthesized, and therefore, it is very important to control the roughness of the roll surface. It is preferable that the roughness of the roll surface is wiped unidirectionally (in the longitudinal direction of the ribbon) with a polishing paper of from #80 to #4000. More preferably it is preferable to wipe the surface with a polishing paper of from #80 to #2000, even more preferably from #80 to #600, and still more preferably near #180. Thereby, flaky magnetic metal particles having concavities or convexities can be synthesized easily, and thus it is preferable.

A second step is a step for heat-treating the magnetic metal ribbon at a temperature of from 50° C. to 800° C. In the present step, the ribbon may be cut into pieces having an appropriate size in order to make it easy to place the ribbon in an electric furnace for heat treatment. For example, the ribbon may be cut into pieces having an appropriate size using a mixer apparatus or the like. When the present step is carried out, in a subsequent pulverization step as a third step, pulverizability is easily enhanced, and thus it is desirable. The atmosphere for the heat treatment is preferably a vacuum atmosphere with a low oxygen concentration, an inert atmosphere, or a reducing atmosphere, and more preferably, a reducing atmosphere of $H_2$ (hydrogen), CO (carbon monoxide), or $CH_4$ (methane) is preferred. The reason for this is that even if the magnetic metal ribbon is oxidized, when the magnetic metal ribbon is subjected to a heat treatment in a reducing atmosphere, the oxidized metal can be reduced and thereby restored into metal. As a result, the magnetic metal ribbon that has been oxidized and has reduced saturation magnetization can be reduced, and saturation magnetization can be restored. When crystallization of the magnetic metal ribbon proceeds noticeably as a result of the heat treatment, characteristics are deteriorated (coercivity increases, and magnetic permeability decreases). Therefore, it is preferable to select conditions so as to suppress excessive crystallization. Furthermore, more preferably, it is more desirable that the magnetic metal ribbon is subjected to a heat treatment in a magnetic field. It is more preferable that the magnetic field to be applied is larger; however, it is preferable to apply a magnetic field of 1 kOe or greater, and more preferably, it is more preferable to apply a magnetic field of 10 kOe or greater. Thereby, magnetic anisotropy can be exhibited within the plane of the magnetic metal ribbon, and excellent magnetic characteristics can be realized, which is preferable.

A third step is a step for producing flaky magnetic metal particles by pulverizing the heat-treated magnetic metal ribbon. In the present step, the magnetic metal ribbon or thin film may be cut into an appropriate size using a mixer apparatus or the like, before this pulverization. In the present step, for example, pulverization is carried out using a pulverizing apparatus such as a bead mill or a planetary mill. Regarding the pulverizing apparatus, the type is not particularly selected. Examples include a planetary mill, a bead mill, a rotary ball mill, a vibratory ball mill, a stirring ball mill (attriter), a jet mill, a centrifuge, and techniques combining milling and centrifugation. At the time of pulverization, when pulverization is carried out while the magnetic metal ribbon or thin film is cooled to a temperature of 0° C. or lower, pulverization can proceed easily, and thus it is preferable. Particularly, it is preferable to cool the magnetic metal ribbon or thin film to the liquid nitrogen temperature (77 K), the dry ice temperature (194 K), or the like, and above all, particularly, it is more desirable to cool the magnetic metal ribbon or thin film to the liquid nitrogen temperature. As a result, the magnetic metal ribbon is likely to have low temperature brittleness, and pulverization is carried out easily. That is, since the magnetic metal ribbon can be efficiently pulverized without applying excessive stress or strain to the magnetic metal ribbon, which is preferable. However, in many cases, the magnetic metal ribbon can be sufficiently pulverized without cooling, and in those cases, it is acceptable not to perform cooling.

In the third step, the thickness of the flaky magnetic metal particles can be made small not only by simply pulverizing the flaky magnetic metal particles but also by combining pulverization with rolling. In a case in which a predetermined thickness has been obtained up to the second step, the treatment for rolling can be omitted. Here, rolling may be carried out simultaneously, or rolling may be carried out after pulverization, or pulverization may be carried out after rolling. In this case, an apparatus that can apply strong gravitational acceleration is preferable, and the treatment can be carried out using, for example, a planetary mill, a bead mill, a rotary ball mill, a vibrating ball mill, a stirring ball mill (attriter), a jet mill, a centrifuge, or a technique of combining milling and centrifugation. For example, a high-power planetary mill apparatus is preferable because a gravitational acceleration of several dozen G can be applied conveniently. In the case of a high-power planetary mill apparatus, an inclined type planetary mill apparatus in which the direction of the rotation gravitational acceleration and the direction of the revolution gravitational acceleration are not in directions on the same straight line but are in directions having an angle, is more preferred. In a conventional planetary mill apparatus, the direction of the rotation gravitational acceleration and the direction of revolution gravitational acceleration are directions on the same straight line; however, in an inclined type planetary mill apparatus, since rotational movement is performed in a state in which the container is inclined, the direction of rotation gravitational acceleration and the direction of revolution gravitational acceleration are not on the same straight line but are directions having an angle. As a result, power is efficiently transferred to the sample, and pulverization and rolling proceeds efficiently, which is therefore preferable. Furthermore, when mass producibility is considered, a bead mill apparatus that can easily process high throughput is preferable.

Cutting and pulverization/rolling as described above are carried out (rolling is carried out as necessary. If not needed, rolling is not carried out), and in some cases, it is desirable to repeat cutting and pulverization/rolling and to treat the flaky magnetic metal particles 10 so as to obtain flaky magnetic metal particles 10 having a predetermined thickness and a predetermined aspect ratio. At this time, when pulverization and rolling are carried out so as to obtain a thickness of from 10 nm to 100 µm, more preferably from 10 nm to 1 µm, and even more preferably from 10 nm to 100 nm, particles that can easily undergo rotation magnetization are obtained, which is preferable.

Furthermore, it is desirable to remove lattice strain appropriately from the flaky magnetic metal particles thus obtained, through a heat treatment. It is preferable that the heat treatment at this time is carried out at a temperature of from 50° C. to 800° C., similarly to the second step, and the atmosphere for the heat treatment is preferably a vacuum atmosphere with a low oxygen concentration, an inert atmosphere, or a reducing atmosphere. More preferably, a reducing atmosphere of $H_2$, CO, $CH_4$, or the like is preferred. Also, more preferably, it is more desirable to apply a heat treatment in a magnetic field. The reason for this or the details are similar to those in the case of the second step, and therefore, further explanation will not be given here.

Next, as a fourth step, the above-described intercalated phase and the magnetic metal particles are mixed, and a mixed powder of the intercalated phase and the flaky magnetic metal particles is formed. Next, as a fifth step, a mixed powder of the intercalated phase and the magnetic metal particles is molded. Thereby, a pressed powder material according to the third embodiment is obtained. The pressed powder material thus obtained can be processed into various shapes (a shape of a magnetic wedge for a motor, a shape of a motor core, and the like) and used as appropriate. Furthermore, the pressed powder material may be appropriately subjected to a heat treatment before or after the process described above. That is, a heat treatment may be carried out before or after molding, or simultaneously with molding. A heat treatment may also be carried out before or after processing. The conditions for the heat treatment are as described above. Furthermore, more preferably, it is more desirable to apply a heat treatment in a magnetic field. The reason for this or the details are similar to those in the case of the second step, and therefore, further explanation will not be given here.

Meanwhile, when the flaky magnetic metal particles and the pressed powder material of the present embodiments are obtained, this fifth step is very important. This step is usually carried out using uniaxial press molding, CIP molding (Cold Isostatic Pressing), hot press molding, or HIP (Hot Isostatic Pressing). At this time, a method of performing uniaxial press molding and CIP molding and then further performing an appropriate heat treatment is desirable; an especially preferred method is hot press molding or HIP molding. That is, it is preferable to perform molding while heat and pressure are simultaneously applied. At this time, it is very important to appropriately control the treatment conditions. The details will be explained below.

FIG. 17 is a set of scanning electron microscopic photographs of pressed powder materials in the predetermined cross-sections according to the third embodiment, which are produced as a result of differences in the pressure and temperature of the fifth step. Here, a $Bi_2O_3$—$B_2O_3$—ZnO-based material as an inorganic binder (intercalated phase) has been added in an amount of 30 wt % with respect to the flaky magnetic metal particle powder. The softening temperature of this inorganic binder (intercalated phase) is 425° C. Meanwhile, the $Bi_2O_3$—$B_2O_3$—ZnO-based material is an example of the intercalated phase containing an oxide including at least one of a third element selected from the group consisting of B, Si, Cr, Mo, Nb, Li, Ba, Zn, La, P, Al, Ge, W, Na, Ti, As, V, Ca, Bi, Pb, Te, and Sn.

In a case in which hot press molding was carried out by setting the temperature to be 490° C. and the pressure to be 1,800 kgf/cm$^2$, the minimum coercivity obtained after performing a heat treatment for removing strain after the hot press molding was 0.7 Oe. On the other hand, in a case in which hot press molding was carried out by setting the temperature to be 435° C. and the pressure to be 1,800 kgf/cm$^2$, the minimum coercivity after a heat treatment was a very low coercivity, such as 0.2 Oe. From FIG. 17, it was found that in the case of setting the hot press molding temperature to 435° C., a large number of cracks occurred in the flaky magnetic metal particles, and the pressed powder material has many voids. On the other hand, in the case of setting the hot press molding temperature to 490° C., it was found that cracks were hardly seen in the flaky magnetic metal particles, and the pressed powder material has fewer voids.

Figure 18:
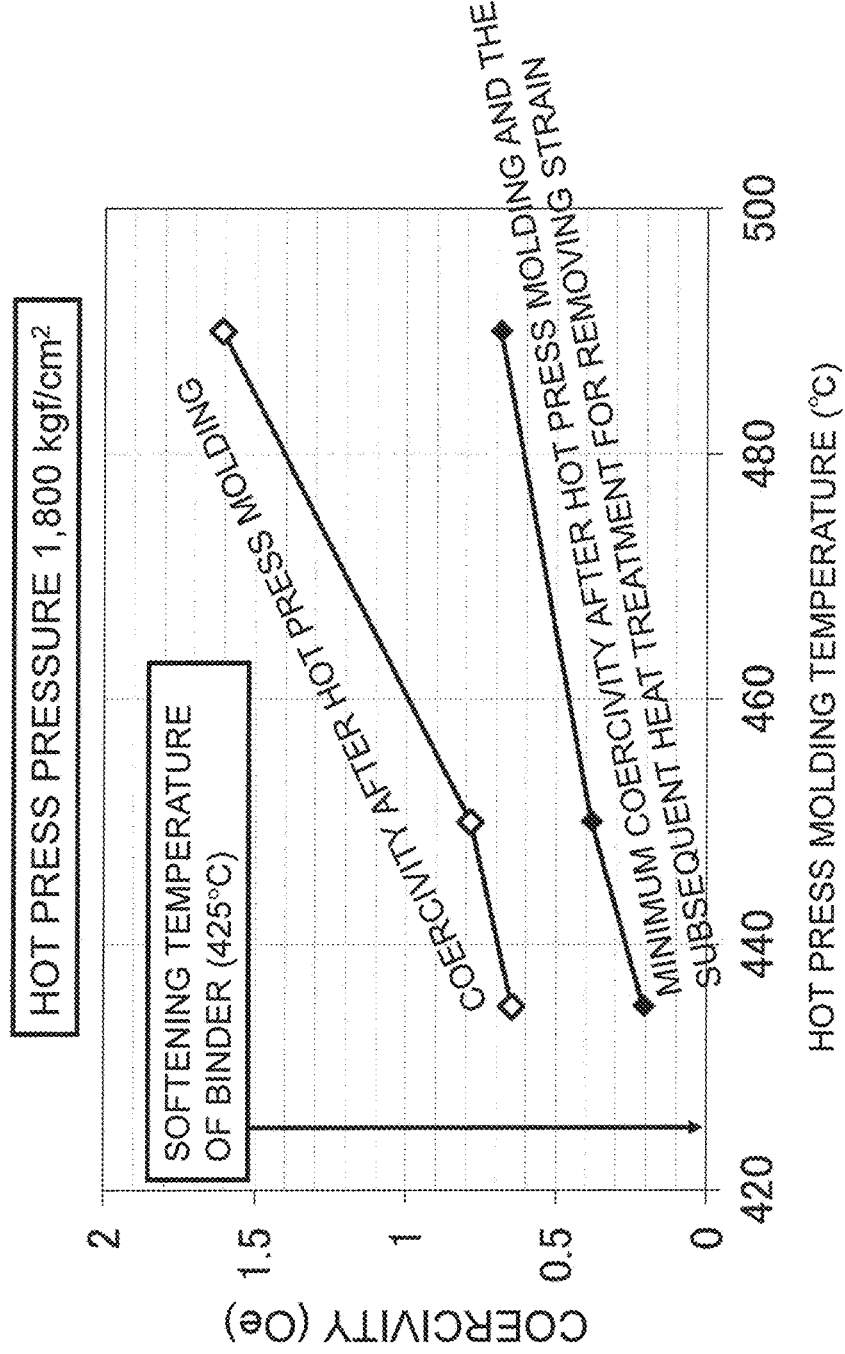
FIG. 18 is a graph illustrating the relation between the hot press molding temperature and coercivity of the pressed powder material according to the third embodiment.

FIG. 18 is a graph illustrating the relationship between the hot press molding temperature and coercivity of the pressed powder material according to the third embodiment. The data represented by open squares are data of the coercivity after hot press molding, and it can be seen that the coercivity increases with an increase in the hot press molding temperature. On the other hand, the data represented by closed squares are data of the coercivity that becomes smallest after a heat treatment for removing strain after hot press molding has been carried out. The coercivity increases with an increase in the hot press molding temperature. Furthermore, it can be seen that on the whole, with regard to the data represented by closed squares, the coercivity is lower than the coercivity obtained when a heat treatment for removing strain was not carried out, which is represented by open squares. From this graph, it can be seen that low coercivity can be easily realized by producing the pressed powder material at a temperature slightly higher than the softening temperature of the intercalated phase, more preferably in a temperature range of from the "softening temperature" to the "softening temperature+100° C.", even more preferably in a temperature range of from the "softening temperature" to the "softening temperature+50° C.", and still more preferably in a temperature range of from the "softening temperature" to the "softening temperature+20° C.".

Generally, when many defects such as cracks are included in the magnetic particles, coercivity increases (deteriorates). However, in regard to the pressed powder material according to the third embodiment, coercivity is decreased despite being in a state containing cracks, that is, coercivity is decreased despite being in a state containing many defects when cracks are regarded as defects. This result is completely opposite to the conventional general knowledge. From this fact, it is considered that in the pressed powder material according to the third embodiment, cracks of the flaky magnetic metal particles and voids in the pressed powder material rather work effectively on stress relief and lowering of coercivity. That is, generally, when a magnetic material includes many defects, the defects tend to interrupt the proceeding of magnetization and increase coercivity; however, as long as the specified scope of the flaky magnetic metal particles and the specific scope of cracks and voids as described above are satisfied, coercivity is rather decreased (consequently, realizing low hysteresis loss), and high magnetic permeability can be realized easily, which is preferable (effects that are completely different from the conventional effects are exhibited). That is, when the material configuration and production conditions described above are satisfied, the special cracks and voids described above are effectively produced, and low coercivity (consequently, realizing low hysteresis loss), high magnetic permeability, and high thermal stability can be achieved.

Meanwhile, the cracks of the flaky magnetic metal particles or the voids included in the pressed powder material as described above are effectively produced when certain particular production conditions are satisfied. Particularly, in "a case in which the intercalated phase is an oxide or an eutectic oxide" or in "a case in which the intercalated phase contains a resin", the cracks and voids are effectively produced. Above all, in "a case in which the intercalated phase is an oxide or an eutectic oxide", the cracks and voids are particularly effectively produced. When the pressed powder material is produced using such an intercalated phase at a temperature near the softening temperature of the intercalated phase, preferably at the softening temperature or a temperature slightly higher than the softening temperature, more preferably in a temperature range of from the "softening temperature" to the "softening temperature+100° C.", even more preferably in a temperature range of from the "softening temperature" to the "softening temperature+50° C.", and still more preferably in a temperature range of from the "softening temperature" to the "softening temperature+20° C.", cracks and voids are produced efficiently. Furthermore, when a production process of adding pressure while applying a temperature as in the case of hot press (or HIP or the like) molding, is adopted, cracks and voids are produced more effectively. A preferred pressure is in the range of 10 to 10,000 $kgf/cm^2$, more preferably in the range of 100 to 5,000 $kgf/cm^2$, and even more preferably in the range of 100 to 2,000 $kgf/cm^2$. When such production conditions are satisfied, cracks and voids are effectively produced, as illustrated in FIG. 14 and FIG. 15. As a result, stress can be easily relieved, and low coercivity (consequently, realizing low hysteresis loss) and high magnetic permeability can be realized easily, which is preferable. Furthermore, since stress can be easily relieved by heat, for example, thermal stability and the like are increased, which is preferable.

Incidentally, in the case of not a pressed powder material including an intercalated phase but of flaky magnetic metal particles alone, it is effective to apply the production method described above in order to produce the cracks of the first embodiment. In this case, cracks can be produced effectively by subjecting the magnetic metal particles to a heat treatment at a temperature of from 50° C. to 800° C. while a pressure in the range of 10 to 10,000 $kgf/cm^2$, more preferably in the range of 100 to 5,000 $kgf/cm^2$, and even more preferably in the range of 100 to 2,000 $kgf/cm^2$, is applied (by adding heat and pressure simultaneously). Alternatively, flaky magnetic metal particles having the cracks according to the first embodiment can be obtained by synthesizing the pressed powder material described above and then eliminating (crushing) the intercalated phase.

It is preferable that the saturation magnetization of the pressed powder material is higher, and the saturation magnetization is preferably 0.2 T or higher. More preferably, it is preferable that the saturation magnetization is 0.5 T or higher, 1.0 T or higher, and even more preferably 1.8 T or higher, and still more preferably, it is preferable that the saturation magnetization is 2.0 or higher. Thereby, magnetic saturation is suppressed, and magnetic characteristics can be sufficiently exhibited in the system, which is preferable. However, depending on the use application (for example, a magnetic wedge of a motor), the pressed powder material can be sufficiently used even in a case in which the saturation magnetization is relatively small, and there are occasions in which it is rather preferable for the pressed powder material to be specialized for low losses. Therefore, it is important to select the composition according to the use application.

Figure 19:
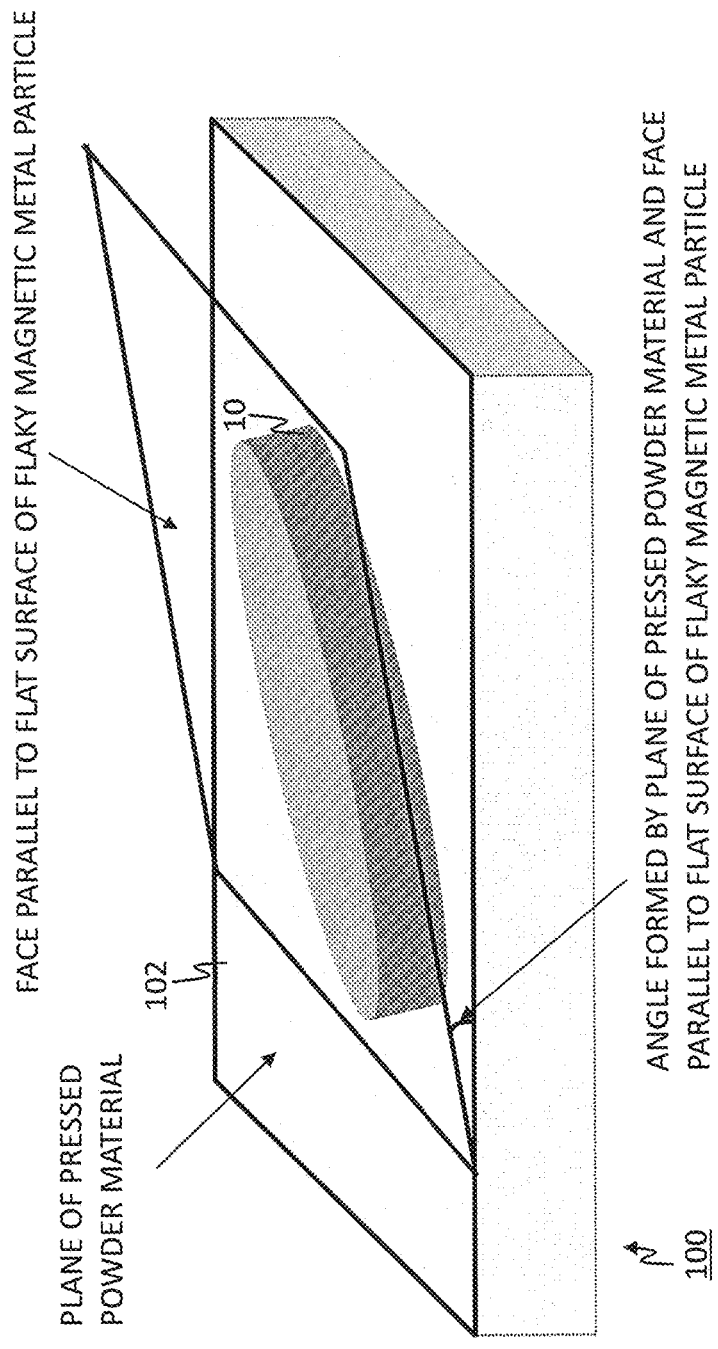
FIG. 19 is a schematic diagram illustrating the angle formed by a face parallel to the flat surface of a flaky magnetic metal particle and a plane of a pressed powder material, according to the third embodiment.

As the angle formed by a face parallel to the flat surface of a flaky magnetic metal particle and a plane of the pressed powder material is closer to 0°, it is defined that the flaky magnetic metal particle is oriented. FIG. 19 is a schematic diagram illustrating the angle formed by a face parallel to the flat surface of a flaky magnetic metal particle and a plane of the pressed powder material in the third embodiment. The above-mentioned angle is determined for a large number, that is, ten or more, of flaky magnetic metal particles, and it is desirable that the average value of the angles is preferably from 0° to 45°, more preferably from 0° to 30°, and even more preferably from 0° to 10°. That is, in regard to a pressed powder material, it is preferable that the flat surfaces of the flaky magnetic metal particles are oriented into a layered form such that the flat surfaces are parallel to one another or approximately parallel to one another. Thereby, the eddy current loss of the pressed powder material can be reduced, which is preferable. Furthermore, since the diamagnetic field can be made small, the magnetic permeability of the pressed powder material can be made high, which is preferable. Furthermore, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized.

In a case in which coercivity is measured by varying the direction within the above-mentioned plane of a pressed powder material (within the plane parallel to the flat surface of a flaky magnetic metal particle), coercivity is measured by, for example, varying the direction at an interval of 22.5° over the angle of 360° within the plane.

By having the difference in coercivity within the above-mentioned plane of a pressed powder material, the minimum coercivity value becomes small compared to an isotropic case where there is almost no difference in coercivity, and thus it is preferable. A material having magnetic anisotropy within the plane has the difference in coercivity on the basis of direction within the plane, and the minimum coercivity value becomes small compared to a magnetically isotropic material. As a result, the hysteresis loss is reduced, and the magnetic permeability is increased, which is preferable.

In the above-mentioned plane of a pressed powder material (in the plane parallel to the flat surface of a flaky magnetic metal particle), it is more preferable as the proportion of the difference in coercivity on the basis of direction is larger, and the proportion is preferably 1% or greater. More preferably, the proportion of the difference in coercivity is 10% or greater; even more preferably, the proportion of the difference in coercivity is 50% or greater; and still more preferably, the proportion of the difference in coercivity is 100% or greater. The proportion of the difference in coercivity as used herein is defined by the formula: $(Hc(max)-Hc(min))/Hc(min) \times 100(\%)$, by using the maximum coercivity, $Hc(max)$, and the minimum coercivity, $Hc(min)$, within a flat surface.

Coercivity can be evaluated simply by using a vibrating sample magnetometer (VSM) or the like. When the coercivity is low, even a coercivity of 0.1 Oe or less can be measured using a low magnetic field unit. Measurement is made by varying the direction within the above-mentioned plane of a pressed powder material (in the plane parallel to the flat surface of a flaky magnetic metal particle) with respect to the direction of the magnetic field to be measured.

When coercivity is calculated, a value obtained by dividing the difference between the magnetic fields at two points that intersect with the axis of abscissas (magnetic fields H1 and H2 where magnetization is zero) by 2 can be employed (that is, coercivity can be calculated by the formula: coercivity=|H2−H1|/2).

From the viewpoint of induced magnetic anisotropy, it is preferable that the magnetic metal particles are arranged so as to have the maximum length directions aligned. Whether the maximum length directions are aligned is determined by making an observation of the magnetic metal particles included in the pressed powder material by TEM or SEM or with an optical microscope or the like, determining the angle formed by the maximum length direction and an arbitrarily determined reference line, and judging the state according to the degree of variation. Preferably, it is preferable to determine the average degree of variation for twenty or more flaky magnetic metal particles; however, in a case in which an observation of twenty or more flaky magnetic metal particles cannot be made, it is preferable that as many flaky magnetic metal particles as possible are observed, and an average degree of variation is determined for those particles. According to the present specification, it is said that the maximum length directions are aligned when the degree of variation is in the range of ±30°. It is more preferable that the degree of variation is in the range of ±20°, and it is even more preferable that the degree of variation is in the range of ±10°. As a result, magnetic anisotropy can be easily induced in the pressed powder material, which is desirable. More preferably, it is desirable that the first directions of either or both of a plurality of concavities and a plurality of convexities in the flat surface are arranged in the maximum length direction. Significant magnetic anisotropy can be induced thereby, and thus it is desirable.

In regard to the pressed powder material, it is preferable that the "proportion of arrangement" at which an approximate first direction is arranged in a second direction is 30% or higher. The "proportion of arrangement" is more desirably 50% or higher, and even more desirably 75% or higher. As a result, the magnetic anisotropy becomes appropriately high, and the magnetic characteristics are enhanced as described above, which is preferable. First, for all of the flaky magnetic metal particles to be evaluated in advance, the direction in which the direction of arrangement of the concavities or convexities carried by various flaky magnetic metal particles accounts for the largest proportion is defined as a first direction. The direction in which the largest number of the first directions of the various flaky magnetic metal particles will be arranged in the pressed powder material as a whole is defined as a second direction. Next, directions obtained by dividing the angle of 360° into angles at an interval of 45° with respect to the second direction are determined. Next, the first directions of the various flaky magnetic metal particles are sorted according to the direction of angle, to which the first directions are arranged most closely, and that direction is defined as the "approximate first direction". That is, the first directions are sorted into four classes, that is, the direction of 0°, the direction of 45°, the direction of 90°, and the direction of 135°. The proportion in which the approximate first directions are arranged in the same direction with respect to the second direction is defined as the "proportion of arrangement". When this "proportion of arrangement" is evaluated, four consecutive neighboring flaky magnetic metal particles are selected, and the four particles are evaluated. This is carried out repeatedly for at least three or more times (the more the better; for example, five or more times is desirable, and ten or more times is more desirable), and thereby, the average value is employed as the proportion of arrangement. Meanwhile, flaky magnetic metal particles in which the directions of the concavities or the convexities cannot be determined are excluded from the evaluation, and an evaluation of the flaky magnetic metal particles immediately adjacent thereto is performed. For example, in many of flaky magnetic metal particles obtained by pulverizing a ribbon synthesized with a single roll quenching apparatus, concavities or convexities attach only on one of the flat surfaces, and the other flat surface does not have any concavities or convexities attached thereto. When such flaky magnetic metal particles are observed by SEM, the situation in which the flat surface without any concavities or convexities attached thereto is illustrated on the image of observation may also occur at a probability of about 50% (in this case, too, actually there may be concavities or convexities attached to the flat surface on the rear side; however, these flaky magnetic metal particles are excluded from the evaluation).

Furthermore, it is preferable that the most numerous approximate first directions are arranged in the direction of the easy magnetization axis of the pressed powder material. That is, it is preferable that the easy magnetization axis of the pressed powder material is parallel to the second direction. Since the length direction in which the concavities or convexities are arranged is likely to become the easy magnetization axis due to the effect of shape magnetic anisotropy, it is preferable to align the directions by taking this direction as the easy magnetization axis, since magnetic anisotropy is easily induced.

In regard to the flaky magnetic metal particles included in the pressed powder material, it is desirable that the particles satisfy the requirements described in the first and second embodiments. Here, description of overlapping matters will not be repeated.

In regard to the pressed powder material, it is preferable that the flat surfaces of the flaky magnetic metal particles described above are oriented in a layered form so as to be parallel to each other. The eddy current loss of the pressed powder material can be reduced thereby, and thus, it is preferable. Furthermore, since the diamagnetic field can be made small, the magnetic permeability of the pressed powder material can be made high, which is preferable. Also, since the ferromagnetic resonance frequency can be made high, the ferromagnetic resonance loss can be made small, which is preferable. Such a laminated structure is preferable because the magnetic domain structure is stabilized, and low magnetic loss can be realized. Here, as the angle formed by a face parallel to the flat surface of a flaky magnetic metal particle and a plane of the pressed powder material is closer to 0°, it is defined that the flaky magnetic metal particle is oriented. Specifically, the aforementioned angle is determined for a large number of flaky magnetic metal particles 6, that is, ten or more particles, and it is desirable that the average value is preferably from 0° to 45°, more preferably from 0° to 30°, and even more preferably from 0° to 10°.

The pressed powder material may have a laminated type structure composed of a magnetic layer containing the flaky magnetic metal particles, and an intermediate layer containing any of O, C, and N. In regard to the magnetic layer, it is preferable that the flaky magnetic metal particles are oriented (oriented such that the flat surfaces are parallel to one another). Furthermore, it is preferable that the magnetic permeability of the intermediate layer is made lower than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer lower than the magnetic permeability of the intercalated phase (intercalated phase within the magnetic layer). Thereby, the magnetic permeability in the layer direction can be made even higher in a pseudo thin film laminated structure, and therefore, it is preferable. Also, since the ferromagnetic resonance frequency can be made even higher, the ferromagnetic resonance loss can be made small, which is preferable.

In addition, the voids included in the pressed powder material or the cracks of the flaky magnetic metal particles can be investigated for example by making an observation by cross-sectional SEM, cross-sectional TEM, optical microscopy, or the like.

Thus, according to the present embodiment, a pressed powder material having excellent magnetic characteristics such as low magnetic loss can be provided.

Fourth Embodiment

A system and a device apparatus of the present embodiment have the pressed powder material of the third embodiment. Therefore, any matters overlapping with the contents of the first to third embodiments will not be described repeatedly. Examples of the component parts of the pressed powder material included in these system and device apparatus include cores for rotating electric machines such as various motors and generators (for example, motors and generators), potential transformers, inductors, transformers, choke coils, and filters; and magnetic wedges for a rotating electric machine. FIG. 20 is a conceptual diagram of a motor system according to the fourth embodiment. A motor system is an example of the rotating electric machine system. A motor system is one system including a control system for controlling the rotational frequency or the electric power (output power) of a motor. Regarding the mode for controlling the rotational frequency of a motor, there are control methods that are based on control by a bridge servo circuit, proportional current control, voltage comparison control, frequency synchronization control, and phase locked loop (PLL) control. As an example, a control method based on PLL is illustrated in FIG. 20. A motor system that controls the rotational frequency of a motor based on PLL comprises a motor; a rotary encoder that converts the amount of mechanical displacement of the rotation of the motor into electrical signals and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 20. A motor system that controls the electric power of the motor using an inverter comprises an alternating current power supply; a rectifier that converts the output of the alternating current power supply to a direct current; an inverter circuit that converts the direct current to an alternating current based on an arbitrary frequency; and a motor that is controlled by this alternating current.

Figure 21:
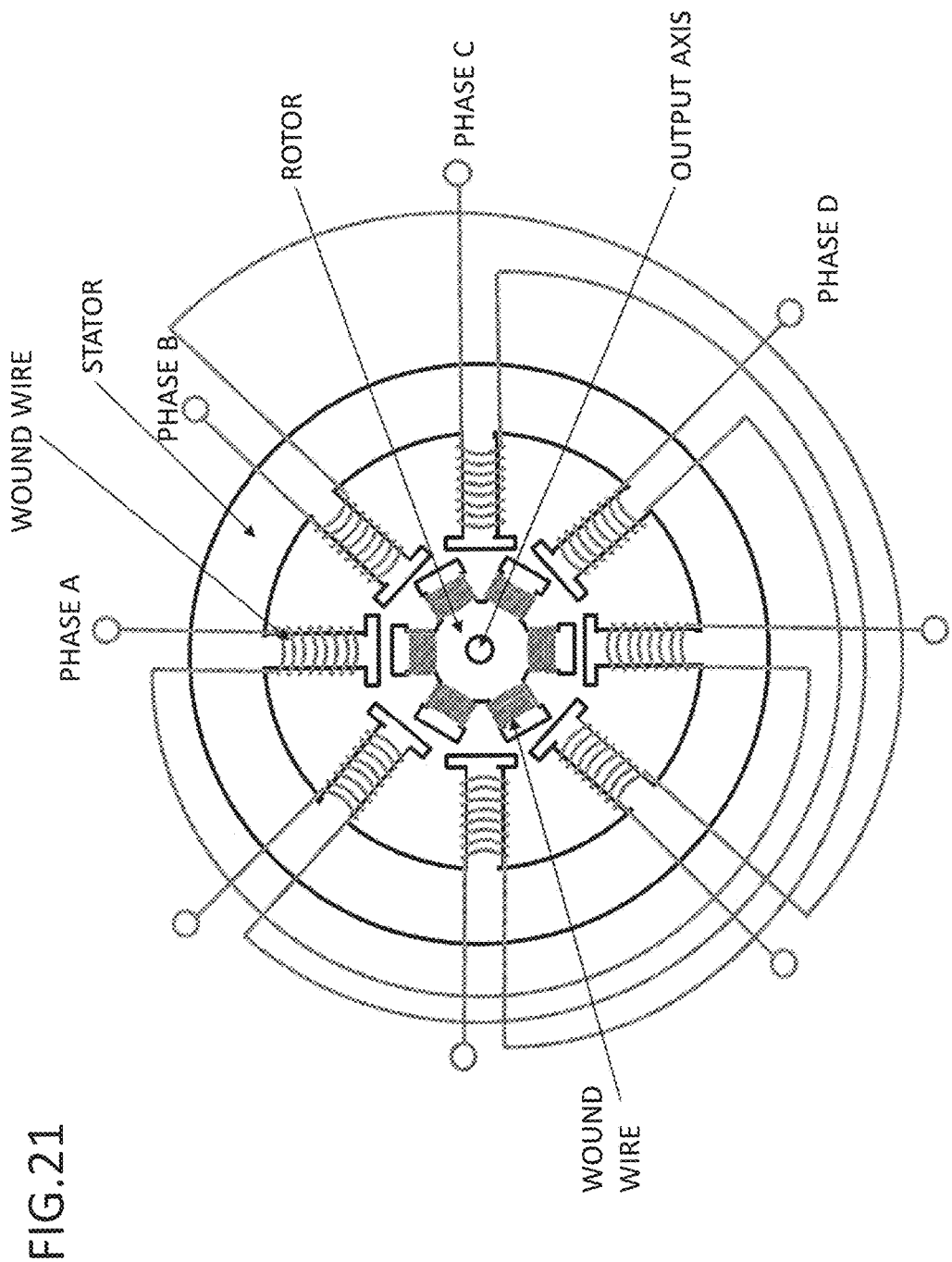
FIG. 21 is a conceptual diagram of a motor of the fourth embodiment.

FIG. 21 illustrates a conceptual diagram of a motor according to the fourth embodiment. A motor 200 is an example of the rotating electric machine. In the motor 200, a first stator (stator) and a second rotor (rotor) are disposed. The diagram illustrates an inner rotor type motor in which a rotor is disposed on the inner side of a stator; however, an outer rotor type in which the rotor is disposed on the outer side of the stator may also be used.

Figure 22:
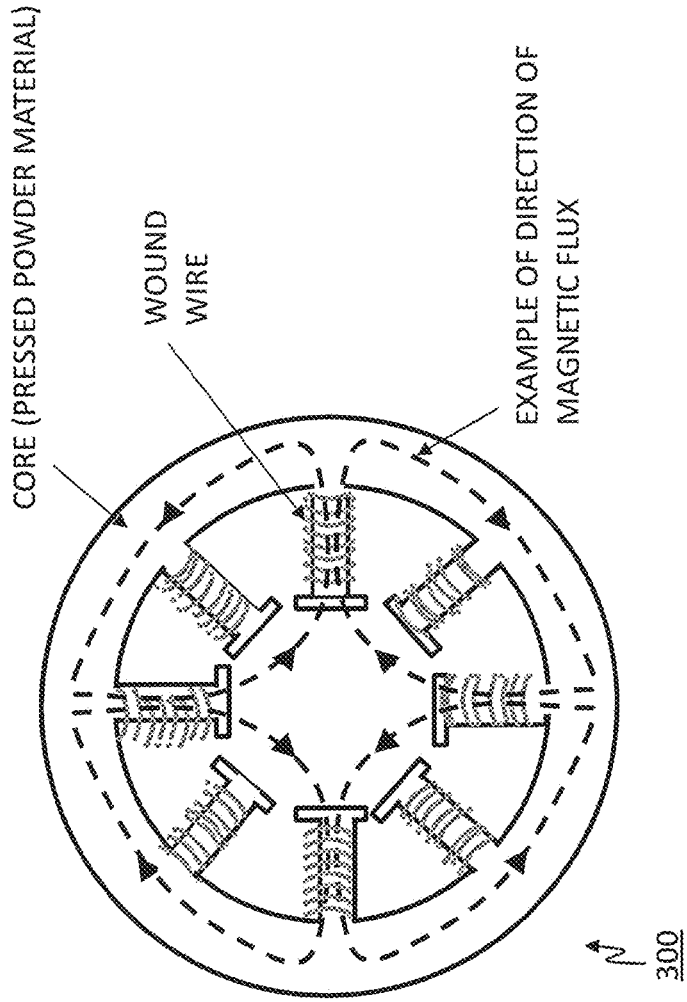
FIG. 22 is a conceptual diagram of a motor core (stator) according to the fourth embodiment.
Figure 23:
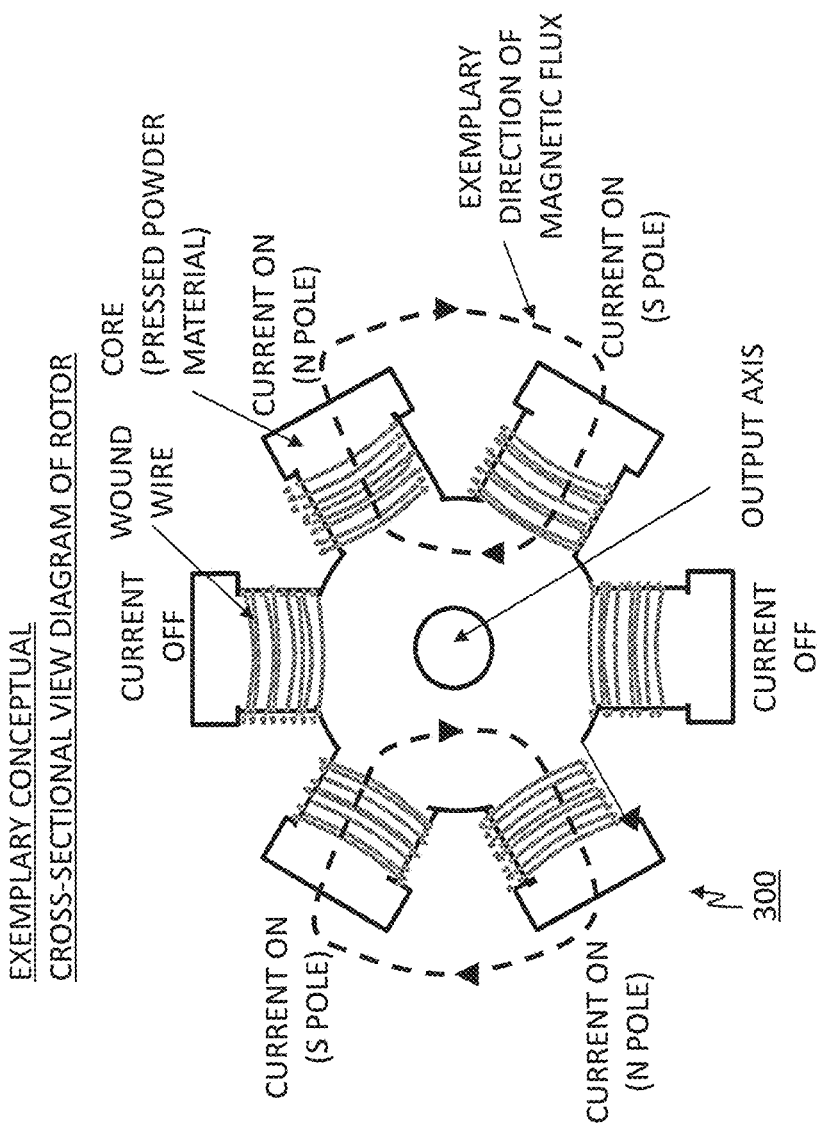
FIG. 23 is a conceptual diagram of a motor core (rotor) according to the fourth embodiment.

FIG. 22 illustrates a conceptual diagram of a motor core (stator) according to the fourth embodiment. FIG. 23 is a conceptual diagram of a motor core (rotor) according to the fourth embodiment. Regarding the motor core 300 (core of a motor), the cores of a stator and a rotor correspond to the motor core. This will be described below. FIG. 22 is an exemplary conceptual cross-sectional diagram of a first stator. The first stator has a core and coils. The coils are wound around some of the protrusions of the core, which are provided on the inner side of the core. In this core, the pressed powder material of the third embodiment can be disposed. FIG. 23 is an exemplary conceptual cross-sectional diagram of the first rotor. The first rotor has a core and coils. The coils are wound around some of the protrusions of the core, which are provided on the outer side of the core. In this core, the pressed powder material of the third embodiment can be disposed.

FIG. 22 and FIG. 23 are intended only for illustrative purposes to describe examples of motors, and the applications of the pressed powder material are not limited to these. The pressed powder material can be applied to all kinds of motors as cores for making it easy to lead the magnetic flux.

Figure 24:
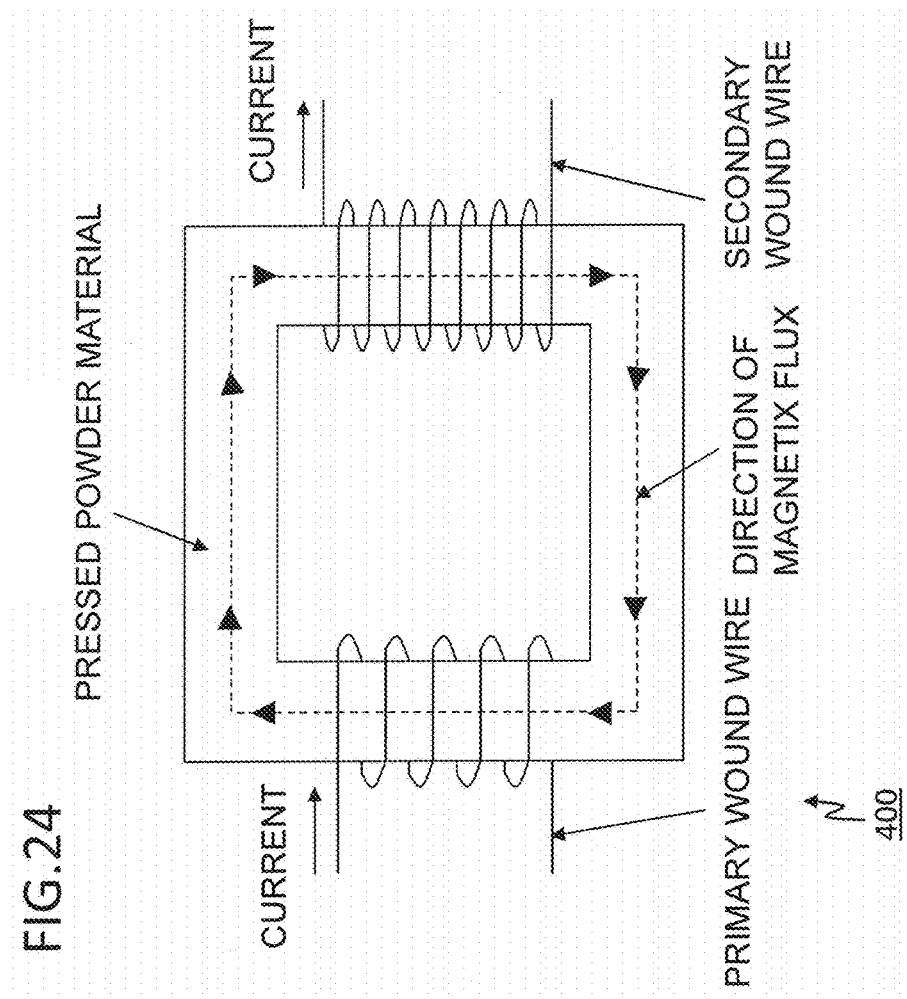
FIG. 24 is a conceptual diagram of a potential transformer or a transformer according to the fourth embodiment.
Figure 25:
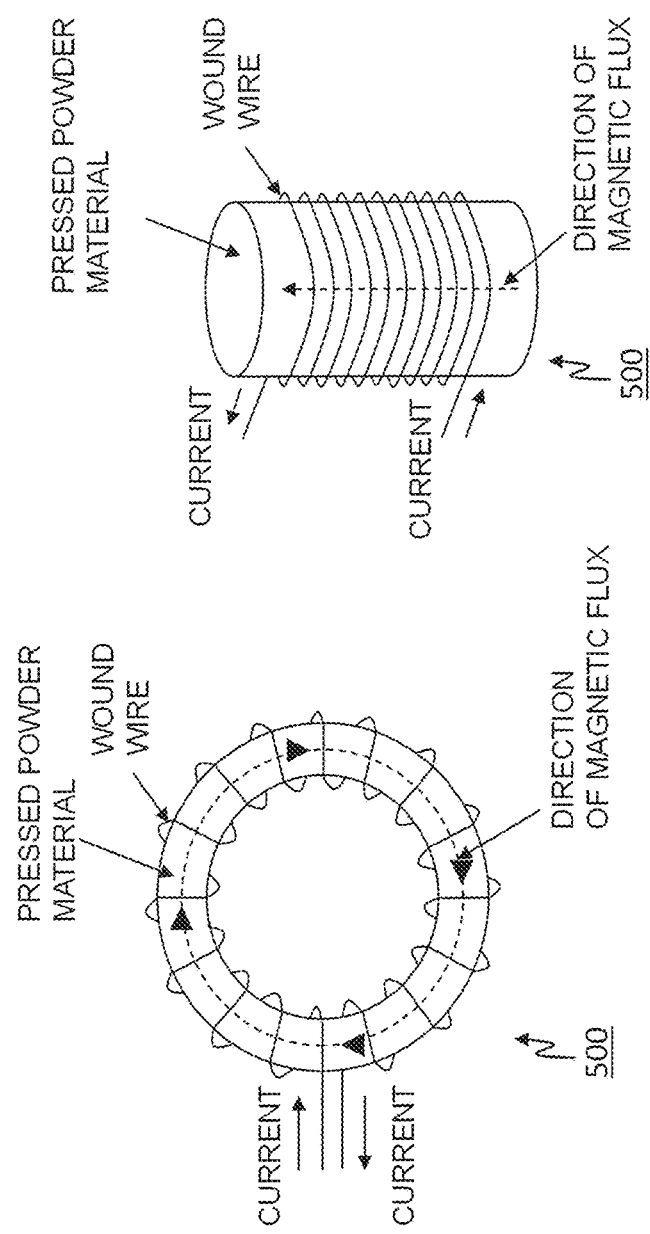
FIG. 25 is a conceptual diagram of inductors (ring-shaped inductor and rod-shaped inductor) according to the fourth embodiment.
Figure 26:
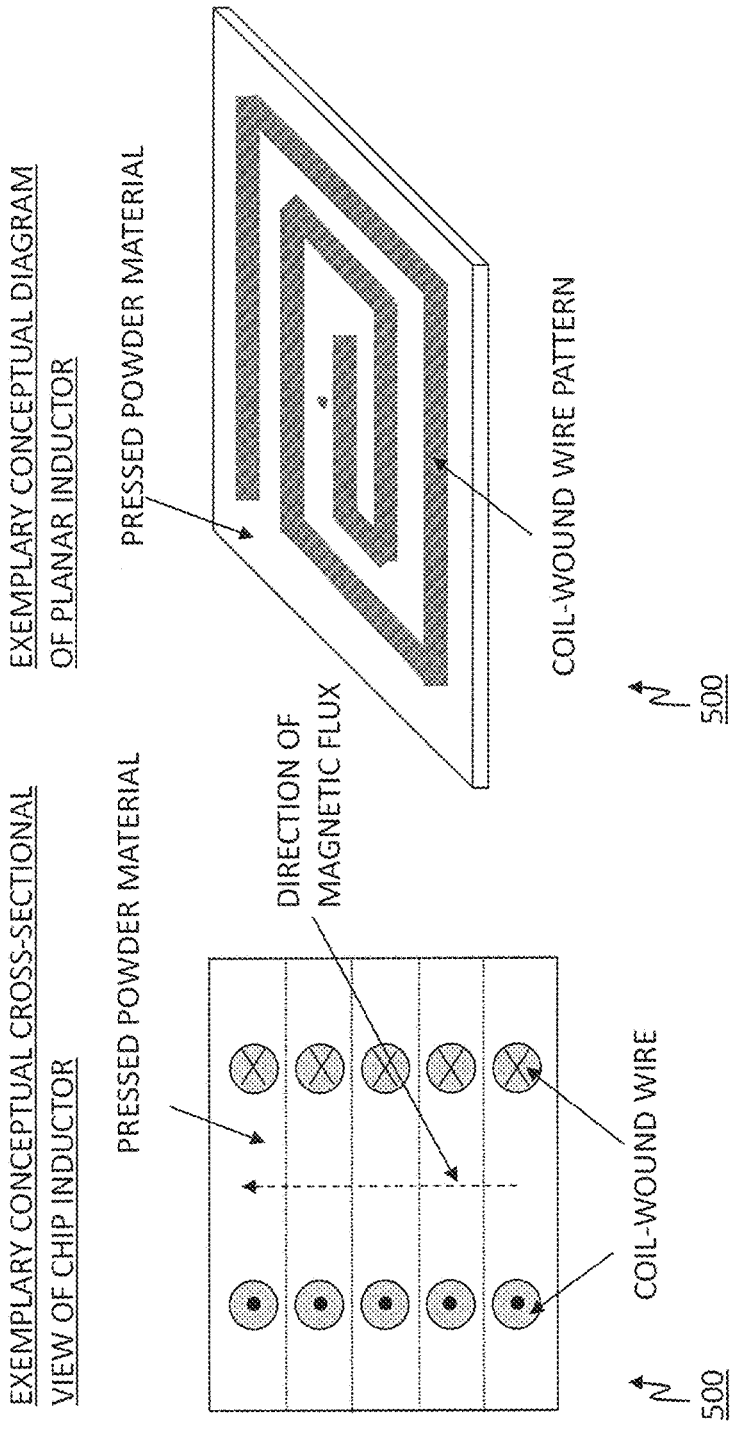
FIG. 26 is a conceptual diagram of inductors (chip inductor and planar inductor) according to the fourth embodiment.

Furthermore, FIG. 24 is a conceptual diagram of a potential transformer according to the fourth embodiment. FIG. 25 is a conceptual diagram of inductors (ring-shaped inductor and rod-shaped inductor) according to the fourth embodiment. FIG. 26 is a conceptual diagram of inductors (chip inductor and planar inductor) according to the fourth embodiment. These diagrams are also intended only for illustrative purposes. Also for the potential transformer 400 and the generator 500, similarly to the motor core, the pressed powder materials can be applied to all kinds of potential transformers and inductors in order to make it easy to lead the magnetic flux, or to utilize high magnetic permeability.

Figure 27:
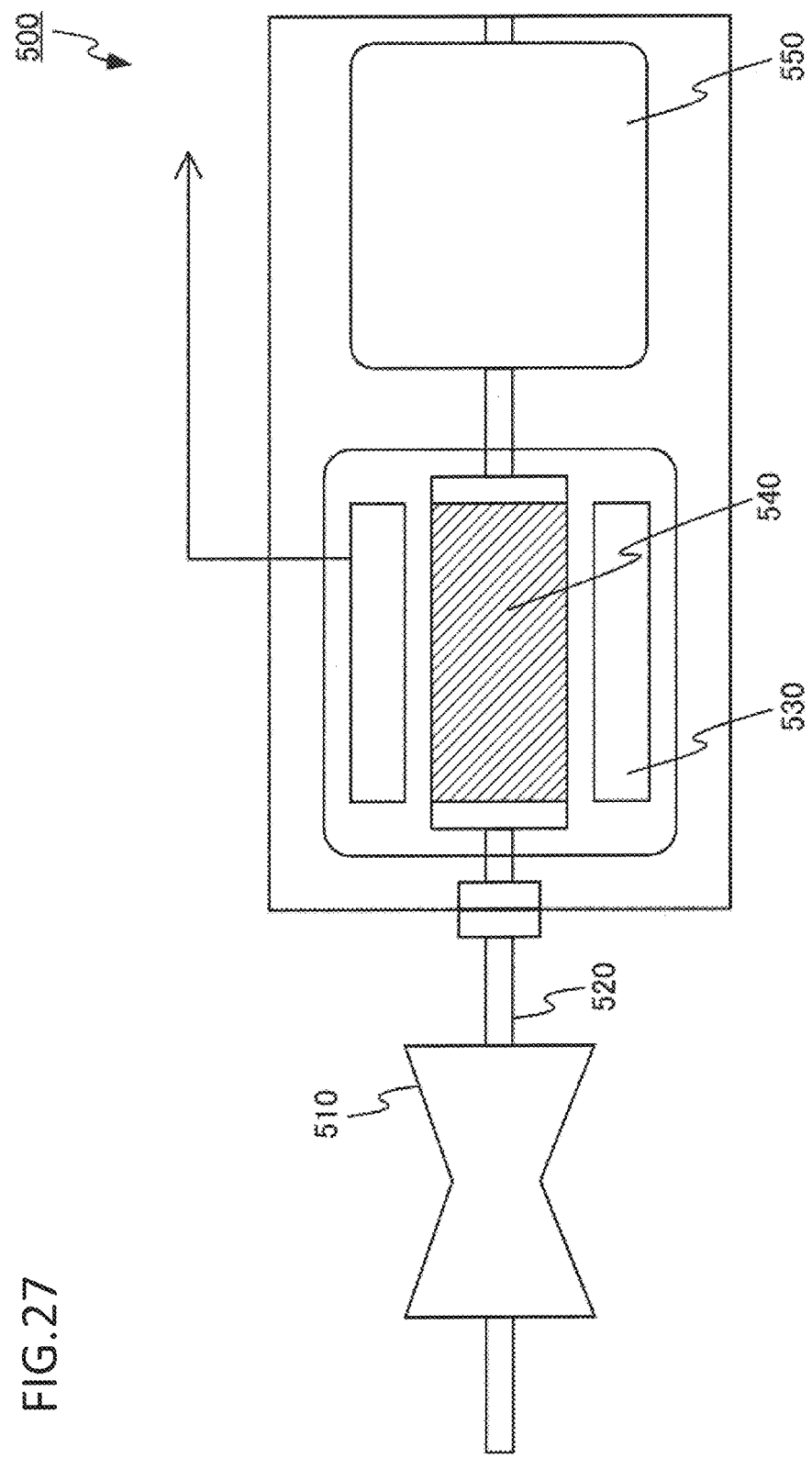
FIG. 27 is a conceptual diagram of a generator according to the fourth embodiment.

FIG. 27 is a conceptual diagram of a generator 500 according to the fourth embodiment. The generator 500 is an example of the rotating electric machine. The generator 500 comprises either or both of a second stator (stator) 530 that uses the pressed powder material of the first, second, or third embodiment as the core; and a second rotor (rotor) 540 that uses the pressed powder material of the first, second, or third embodiment as the core. In the diagram, the second rotor (rotor) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not illustrated in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator (not illustrated in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not illustrated in the diagram, and a main transformer that is not illustrated in the diagram. Meanwhile, in the second rotor, an electrostatic charge is generated due to an axial current resulting from the static electricity from the turbine or from power generation. Therefore, the generator comprises a brush intended for discharging the electrostatic charge of the second rotor.

The rotating electric machine of the present embodiment can be preferably used in railway vehicles. For example, the rotating electric machine can be preferably used in the motor 200 that drives a railway vehicle, or the generator 500 that generates electricity for driving a railway vehicle.

Figure 28:
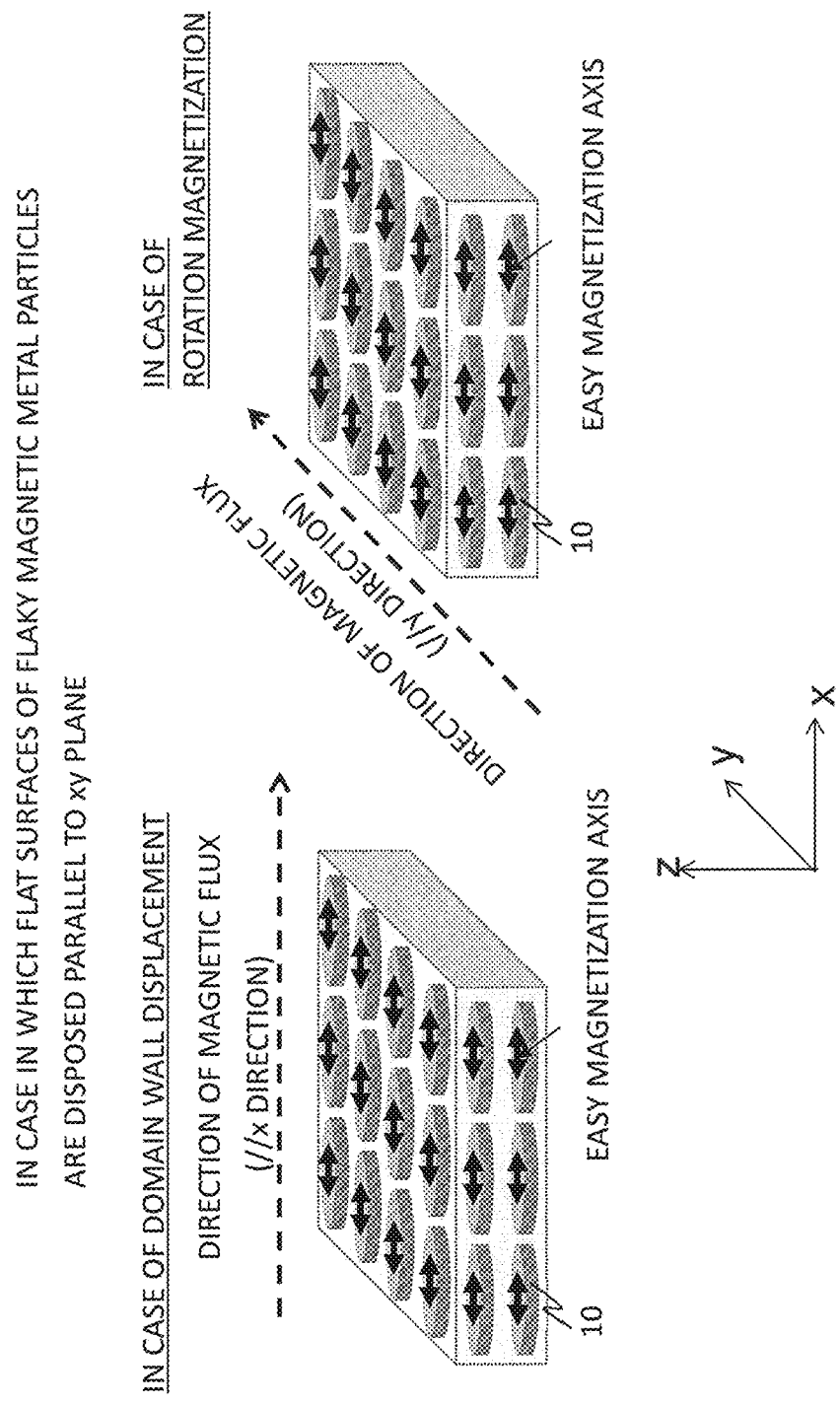
FIG. 28 is a conceptual diagram illustrating the relation between the direction of the magnetic flux and the direction of arrangement of the pressed powder material.

Furthermore, FIG. 28 is a conceptual diagram illustrating the relation between the direction of the magnetic flux and the direction of disposition of a pressed powder material. First, for both of the domain wall displacement type and the rotation magnetization type, it is preferable that the flat surfaces of the flaky magnetic metal particles included in a pressed powder material are disposed in a direction in which the flat surfaces are parallel to one another as far as possible are aligned in a layered form, with respect to the direction of the magnetic flux. This is because the eddy current loss can be reduced by making the cross-sectional area of the flaky magnetic metal particles that penetrate through the magnetic flux, as small as possible. Furthermore, in regard to the domain wall displacement type, it is preferable that the easy magnetization axis (direction of the arrow) in the flat surface of a flaky magnetic metal particle is disposed parallel to the direction of the magnetic flux. Thereby, the system can be used in a direction in which coercivity is further decreased, and therefore, the hysteresis loss can be reduced, which is preferable. Furthermore, the magnetic permeability is also made high, and it is preferable. In contrast, in regard to the rotation magnetization type, it is preferable that the easy magnetization axis (direction of the arrow) in the flat surface of a flaky magnetic metal particle is disposed perpendicularly to the direction of the magnetic flux. Thereby, the system can be used in a direction in which coercivity is further decreased, and therefore, the hysteresis loss can be reduced, which is preferable. That is, it is preferable to understand the magnetization characteristics of a pressed powder material, determine whether the pressed powder material is of the domain wall displacement type or the rotation magnetization type (method for determination is as described above), and then dispose the pressed powder material as illustrated in FIG. 28. In a case in which the direction of the magnetic flux is complicated, it may be difficult to dispose the pressed powder material perfectly as illustrated in FIG. 28; however, it is preferable to dispose the pressed powder material as illustrated in FIG. 28 as far as possible. It is desirable that the method for disposition described above is applied to all of the systems and device apparatuses of the present embodiment (for example, cores for rotating electric machines such as various motors and generators (for example, motors and generators), potential transformers, inductors, transformers, choke coils, and filters; and magnetic wedges for a rotating electric machine).

In order for a pressed powder material to be applied to these systems and device apparatuses, the pressed powder material is allowed to be subjected to various kinds of processing. For example, in the case of a sintered body, the pressed powder material is subjected to mechanical processing such as polishing or cutting; and in the case of a powder, the pressed powder material is mixed with a resin such as an epoxy resin or polybutadiene. If necessary, the pressed powder material is further subjected to a surface treatment. Also, if necessary, a coil treatment is carried out.

When the system and device apparatus of the present embodiment are used, a motor system, a motor, a potential transformer, a transformer, an inductor, and a generator, all having excellent characteristics (high efficiency and low losses), can be realized.

EXAMPLES

Hereinafter, the invention will be described in more detail by comparing Examples 1 to 8 with Comparative Examples 1 and 2. For the flaky magnetic metal particles obtainable by Examples and Comparative Examples described below, a summary of the average thickness of the flaky magnetic metal particles, the average value of the ratio of the average length in the flat surface to the thickness, the number proportion of flaky magnetic metal particles having cracks, and the proportion of voids included in the pressed powder material, is presented in Table 1.

Example 1

First, a ribbon of Fe—Co—Si—B (Co/(Fe+Co)=30 at %) is produced using a single roll quenching apparatus. Next, the ribbon thus obtained is subjected to a heat treatment at 400° C. in a $H_2$ atmosphere. Next, this ribbon is cut into an appropriate size using a mixer apparatus, and then the cut ribbon pieces are collected and are subjected to pulverization/rolling at about 1,000 rpm in an Ar atmosphere by means of a bead mill using $ZrO_2$ balls and a $ZrO_2$ container to thereby convert the ribbon pieces into a flaky powder. Thus, flaky magnetic metal particles are obtained. By repeating the operations of the pulverization/rolling and heat treatment described above, the flaky magnetic metal particles are treated so as to obtain a predetermined size. Subsequently, the flaky magnetic metal particles are mixed together with an inorganic oxide intercalated phase ($B_2O_3$—$Bi_2O_3$—ZnO: softening temperature 425° C.), and molding in a magnetic field is performed (the flaky particles are oriented). While a pressing pressure of 1,800 kgf/cm$^2$ is applied using a hot press apparatus, a heat treatment is carried out for one hour at 435° C. in a vacuum. Subsequently, the molded product is subjected to a heat treatment in a magnetic field, and thereby a pressed powder material is obtained. In the heat treatment in a magnetic field, a magnetic field is applied in the direction of the easy magnetization axis, and a heat treatment is carried out. The flaky magnetic metal particles thus obtained are such that flaky magnetic metal particles having cracks in the direction of the thickness of the particles, each crack having a depth equivalent to 10% or more of the average thickness and a width shorter than the depth, are present at a number proportion of 1% or more of the total number of particles. Furthermore, the pressed powder material includes voids at a proportion of 12% as the area ratio. Furthermore, the flaky magnetic metal particles have the difference in coercivity on the basis of direction within the flat surface of the flaky magnetic metal particles, and the pressed powder material has the difference in coercivity on the basis of direction within the plane of the pressed powder material.

Example 2

A pressed powder material is obtained in almost the same manner as in Example 1, except that the thickness of the flaky magnetic metal particles is 1 μm, and the average value of the ratio of the average length within the flat surface with respect to the thickness is 100.

Example 3

A pressed powder material is obtained in almost the same manner as in Example 1, except that the thickness of the flaky magnetic metal particles is 10 μm, and the average value of the ratio of the average length within the flat surface with respect to the thickness is 20.

Example 4

A pressed powder material is obtained in almost the same manner as in Example 1, except that the thickness of the flaky magnetic metal particles is 100 μm, and the average value of the ratio of the average length within the flat surface with respect to the thickness is 5.

Example 5

A pressed powder material is obtained in almost the same manner as in Example 1, except that the thickness of the flaky magnetic metal particles is 10 nm, and the average value of the ratio of the average length within the flat surface with respect to the thickness is 1,000.

Example 6

A pressed powder material is obtained in almost the same manner as in Example 1, except that the thickness of the flaky magnetic metal particles is 10 nm, and the average value of the ratio of the average length within the flat surface with respect to the thickness is 10,000.

Example 7

A pressed powder material is obtained in almost the same manner as in Example 3, except that the proportion of voids included in the pressed powder material is 1% as the area ratio.

Example 8

A pressed powder material is obtained in almost the same manner as in Example 3, except that the proportion of voids included in the pressed powder material is 60% as the area ratio.

Comparative Example 1

A pressed powder material is obtained in almost the same manner as in Example 3, except that number proportion of flaky magnetic metal particles having cracks in the direction of the thickness of the flaky magnetic metal particles, each crack having a depth equivalent to 10% or more of the average thickness and a width shorter than the depth, is almost 0%, and the proportion of voids included in the pressed powder material is 0.3% as the area ratio.

Comparative Example 2

A pressed powder material is obtained in almost the same manner as in Comparative Example 1, except that the proportion of voids included in the pressed powder material is 65% as the area ratio.

Next, for the materials for evaluation of Examples 1 to 8 and Comparative Examples 1 and 2, the magnetic permeability, tan δ, the core loss, and the proportion of change over time in the real part of magnetic permeability (μ') are evaluated by the following methods. Furthermore, the core loss and the proportion of change over time in the real part of magnetic permeability (μ') are evaluated by the following methods. The evaluation results are presented in Table 2.

(1) Core loss: The core loss under the operating conditions of 100 Hz and 1 T is measured using a B—H analyzer. In a case in which the core loss cannot be directly measured under the conditions of 100 Hz and 1 T, the dependence of the core loss on frequency and the dependence of the core loss on the magnetic flux density are measured, and the core loss at 100 Hz and 1 T is estimated from the data (then, this estimated value is employed).

(2) Proportion of change over time in real part of magnetic permeability, μ': The real part of magnetic permeability, μ', of a ring-shaped sample is measured at 100 Hz using an impedance analyzer. Subsequently, the sample for evaluation is heated in air at a temperature of 100° C. for 100 hours, and then the real part of magnetic permeability, μ', is measured again. Thus, the change over time (real part of magnetic permeability, μ', after standing for 100 hours/real part of magnetic permeability, μ', before standing) is determined.

TABLE 1

|  | Average thickness | Average value of ratio of average length within flat surface with respect to thickness | Number proportion of flaky magnetic metal particles having crack | Void proportion |
| --- | --- | --- | --- | --- |
| Example 1 | 10 nm | 200 | ≥1% | 12% |
| Example 2 | 1 μm | 100 | ≥1% | 8% |
| Example 3 | 10 μm | 20 | ≥1% | 10% |
| Example 4 | 100 μm | 5 | ≥1% | 13% |
| Example 5 | 10 nm | 1000 | ≥1% | 10% |
| Example 6 | 10 nm | 10000 | ≥1% | 12% |
| Example 7 | 10 μm | 20 | ≥1% | 1% |
| Example 8 | 10 μm | 20 | ≥1% | 60% |
| Comparative Example 1 | 10 μm | 20 | ≈0% | 0.3% |
| Comparative Example 2 | 10 μm | 20 | ≈0% | 65% |

TABLE 2

|  | μ' (100 Hz) | tanδ(%) (100 Hz) | Core loss (kW/m$^3$) | Proportion of change over time in μ' (%) |
| --- | --- | --- | --- | --- |
| Example 1 | 160 | ≈0 | 30 | 93 |
| Example 2 | 150 | ≈0 | 35 | 92 |
| Example 3 | 150 | ≈0 | 32 | 92 |
| Example 4 | 160 | ≈0 | 33 | 92 |
| Example 5 | 140 | ≈0 | 30 | 93 |
| Example 6 | 150 | ≈0 | 33 | 92 |
| Example 7 | 160 | ≈0 | 32 | 92 |
| Example 8 | 150 | ≈0 | 34 | 93 |
| Comparative Example 1 | 110 | ≈0 | 50 | 84 |
| Comparative Example 2 | 120 | ≈0 | 55 | 85 |

As is obvious from Table 1, the flaky magnetic metal particles according to Examples 1 to 8 have an average thickness of from 10 nm to 100 μm and an average value of the ratio of the average length within the flat surface with respect to thickness of from 5 to 10,000. Furthermore, the flaky magnetic metal particles have the difference in coercivity on the basis of direction within the flat surface of a flaky magnetic metal particle, and also have the difference in coercivity on the basis of direction within a plane of the pressed powder material. Furthermore, the flaky magnetic metal particles thus obtained are such that flaky magnetic metal particles having cracks in the direction of the thickness of the flaky magnetic metal particles, each crack having a depth equivalent to 10% or more of the average thickness and a width shorter than the depth, are present at a number proportion of 1% or more with respect to the total number of the particles. The pressed powder material includes voids at a proportion of from 1% to 60% as the area ratio. On the other hand, regarding the flaky magnetic metal particles obtained in both of Comparative Examples 1 and 2, there is almost no flaky magnetic metal particle having a crack in the direction of the thickness of the flaky magnetic metal particle, the crack having a depth equivalent to 10% or more of the average thickness and a width shorter than the depth, and the number proportion of such flaky magnetic metal particles is less than 1% with respect to the total number of particles. The proportion of voids included in the pressed powder material is less than 1% or more than 60% as the area ratio.

As is obvious from Table 2, it is understood that pressed powder materials that use the flaky magnetic metal particles of Examples 1 to 8 are excellent in terms of the magnetic permeability, core loss, and the proportion of change over time in μ', compared to the pressed powder materials of Comparative Examples 1 and 2. In this regard, in regard to Examples 1 to 8, particularly, since the number proportion of flaky magnetic metal particles having cracks in the direction of the thickness of the flaky magnetic metal particles, each crack having a depth equivalent to 10% or more of the average thickness and a width shorter than the depth, is 1% or more, and the pressed powder material includes voids at a proportion of from 1% to 60% as the area ratio, low coercivity (thereby realizing low hysteresis loss, that is, low core loss), high magnetic permeability, and high thermal stability can be achieved. That is, it is understood that a material having excellent magnetic characteristics and excellent thermal stability can be realized. Furthermore, since the materials of the Examples are pressed powder materials, the materials can be applied to complex shapes.

While certain embodiments have been described, these embodiments have been presented by way of example only, and are not intended to limit the scope of the inventions. Indeed, a plurality of flaky magnetic metal particles, a pressed powder material, and a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A plurality of flaky magnetic metal particles having an average thickness of from 10 nm to 100 μm,
    each of the plurality of flaky magnetic metal particles comprising: a flat surface; a magnetic metal phase containing at least one first element selected from the group consisting of iron (Fe), cobalt (Co), and nickel (Ni); and a difference in coercivity on a basis of direction within the flat surface,
    the average value of a ratio of an average length within the flat surface with respect to the thickness being from 5 to 10,000, and
    multiple ones of the plurality of flaky magnetic metal particles having either a crack in the direction of the thickness of the flaky magnetic metal particle, the crack having a depth equivalent to 10% or more of the thickness of the flaky magnetic metal particle and a width shorter than the depth, or a crack in a direction parallel to the flat surface, the crack having a length equivalent to 10% or more of the thickness of the flaky magnetic metal particle and a width shorter than the length, or the multiple ones of the flaky magnetic metal particles having both of the cracks,
    wherein the multiple ones of the plurality of flaky magnetic metal particles having cracks are included at a number proportion of 1% or more.

2. The plurality of flaky magnetic metal particles according to claim 1, wherein in the multiple ones of the plurality of flaky magnetic metal particles having cracks, a proportion of the difference in coercivity on the basis of direction within the flat surface is 1% or more.

3. The plurality of flaky magnetic metal particles according to claim 1, wherein in the multiple ones of the plurality of flaky magnetic metal particles having cracks, the flat surface has either or both of a plurality of concavities and a plurality of convexities, the concavities and the convexities being arranged in a first direction within the flat surface, and each of the concavities and the convexities having a width of 0.1 µm or more, a length of 1 µm or more, and an aspect ratio of 2 or higher.

4. The plurality of flaky magnetic metal particles according to claim 1, wherein in the multiple ones of the plurality of flaky magnetic metal particles having cracks, at least a portion of the surface of the multiple ones of the flaky magnetic metal particles is covered with a coating layer having a thickness of from 0.1 nm to 1 µm and containing at least one second element selected from the group consisting of oxygen (O), carbon (C), nitrogen (N) and fluorine (F).

5. A pressed powder material, comprising a plurality of flaky magnetic metal particles and an intercalated phase,
the plurality of flaky magnetic metal particles having an average thickness of from 10 nm to 100 µm,
each of the plurality of flaky magnetic metal particles having a flat surface and a magnetic metal phase containing at least one first element selected from the group consisting of Fe, Co, and Ni,
the average value of a ratio of an average length within the flat surface with respect to the thickness being from 5 to 10,000,
multiple ones of the plurality of flaky magnetic metal particles having either a crack in the direction of the thickness of the flaky magnetic metal particle, the crack having a depth equivalent to 10% or more of the thickness of the flaky magnetic metal particle and a width shorter than the depth, or a crack in a direction parallel to the flat surface, the crack having a length equivalent to 10% or more of the thickness of the flaky magnetic metal particle and a width shorter than the length, or the multiple ones of the flaky magnetic metal particle having both of the cracks,
the intercalated phase being present between the plurality of flaky magnetic metal particles and containing at least one second element selected from the group consisting of oxygen (O), carbon (C), nitrogen (N), and fluorine (F),
the flat surface being oriented in the pressed powder material to be parallel to a plane of the pressed powder material and having a difference in coercivity on a basis of direction within the plane,
wherein in a predetermined cross-section perpendicular to a plane of the pressed powder material, the multiple ones of the plurality of flaky magnetic metal particles having cracks are included at a number proportion of 1% or more with respect to all of the plurality of flaky magnetic metal particles present in the predetermined cross-section perpendicular to the plane of the pressed powder material.

6. The pressed powder material according to claim 5, wherein the intercalated phase is disposed inside the cracks.

7. The pressed powder material according to claim 5, wherein the proportion of the difference in coercivity on the basis of direction is 1% or more within the plane of the pressed powder material.

8. The pressed powder material according to claim 5, wherein the flat surface in the multiple ones of the plurality of flaky magnetic metal particles having cracks includes either or both of a plurality of concavities and a plurality of convexities, the concavities and the convexities being arranged in a first direction within the flat surface, and each of the concavities and the convexities having a width of 0.1 µm or more, a length of 1 µm or more, and an aspect ratio of 2 or higher.

9. The pressed powder material according to claim 5, wherein the intercalated phase contains an oxide containing at least one third element selected from the group consisting of B, Si, Cr, Mo, Nb, Li, Ba, Zn, La, P, Al, Ge, W, Na, Ti, As, V, Ca, Bi, Pb, Te, and Sn.

10. The pressed powder material according to claim 5, wherein the intercalated phase contains a resin.

11. The pressed powder material according to claim 5, wherein a weight reduction percentage of the pressed powder material after heating for 3,000 hours at 180° C. is 5% or less.

12. The pressed powder material according to claim 5, wherein the pressed powder material includes voids at a proportion of from 1% to 60% as an area ratio in a predetermined cross-section perpendicular to the plane of the pressed powder material.

13. The pressed powder material according to claim 12, wherein the voids include first void portions present along the flat surfaces of the flaky magnetic metal particles in the predetermined cross-section perpendicular to the plane of the pressed powder material, and include a first void portion having a ratio of the major axis to the minor axis of 2 or higher.

14. The pressed powder material according to claim 12, wherein the voids include a void being in contact with at least a portion of the flaky magnetic metal particles in the predetermined cross-section perpendicular to the plane of the pressed powder material.

15. The pressed powder material according to claim 12, wherein the voids include a void being covered with the intercalated phase in the predetermined cross-section perpendicular to the plane of the pressed powder material.

16. The pressed powder material according to claim 12, wherein the voids include ellipsoid second void portions in the predetermined cross-section perpendicular to the plane of the pressed powder material, and include a second void portion having a ratio of the major axis to the minor axis of from 1 to 10.

17. The pressed powder material according to claim 16, wherein the second void portions including a second void portion having a minor axis with a length less than or equal to the thickness of the flaky magnetic metal particles present at the closest positions in the direction of the flat surface, in the predetermined cross-section perpendicular to the plane of the pressed powder material.

18. A rotating electric machine, comprising the pressed powder material according to claim 5.

* * * * *